(12) United States Patent
Khoury et al.

(10) Patent No.: US 12,505,472 B2
(45) Date of Patent: *Dec. 23, 2025

(54) SYSTEMS, DEVICES, AND METHODS FOR DYNAMICALLY GENERATING, DISTRIBUTING, AND MANAGING ONLINE COMMUNICATIONS

(71) Applicant: SOCI, Inc., San Diego, CA (US)

(72) Inventors: Afif Khoury, San Diego, CA (US); Alo Sarv, San Diego, CA (US); Matthew William Maybeno, San Diego, CA (US)

(73) Assignee: Soci, Inc., San Diego, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 18/226,095

(22) Filed: Jul. 25, 2023

(65) Prior Publication Data

US 2024/0086975 A1   Mar. 14, 2024

Related U.S. Application Data

(63) Continuation of application No. 17/742,338, filed on May 11, 2022, now Pat. No. 11,710,156, which is a
(Continued)

(51) Int. Cl.
*G06Q 30/0241*    (2023.01)
*G06F 16/951*    (2019.01)
(Continued)

(52) U.S. Cl.
CPC ....... *G06Q 30/0276* (2013.01); *G06F 16/951* (2019.01); *G06F 16/953* (2019.01);
(Continued)

(58) Field of Classification Search
CPC ............. G06Q 30/0276; G06Q 10/103; G06Q 30/0203; G06Q 30/0205; G06Q 30/0246;
(Continued)

(56) References Cited

U.S. PATENT DOCUMENTS 8,626,575 B1    1/2014  Gong
9,420,121 B2 *  8/2016  Grosz ................... G06F 3/1272
(Continued)

FOREIGN PATENT DOCUMENTS

WO    2015126043 A1    8/2015

OTHER PUBLICATIONS

Jodi Harris, How to Create a Better Distribution Plan to Get Your Content Seen, 2019 (Year: 2019).*
(Continued)

*Primary Examiner* — Tarek Elchanti
(74) *Attorney, Agent, or Firm* — James Scott Nolan

(57) ABSTRACT

This document describes the collection, generation, distribution, and management of online web content. The devices, systems, and methods described herein can be used to collect and generate online web content and communications. Specifically, the disclosed devices and systems may be employed to produce one or more marketing and/or advertising campaigns, as well as for monitoring, managing, defining the efficiency, effectiveness, and workability of the campaign with respect to generating user engagement, thereby accurately determining the cost benefits of the campaign. The analytic results provided may then be used to guide the generation of original web content, such as for the purposes of enhancing customer or follower experience, driving business, and for driving advertising campaigns. Alternatively, web content that is in the public domain, and determined to perform well, can be reproduced, referenced, or otherwise referred to, in the context of promoting or presenting the user's web content.

20 Claims, 29 Drawing Sheets

Related U.S. Application Data continuation of application No. 16/986,193, filed on Aug. 5, 2020, now Pat. No. 11,379,883.

(60) Provisional application No. 62/941,680, filed on Nov. 27, 2019, provisional application No. 62/885,177, filed on Aug. 9, 2019.

(51) Int. Cl.

| | | |
|---|---|---|
| *G06F 16/953* | (2019.01) | |
| *G06N 20/00* | (2019.01) | |
| *G06Q 10/10* | (2023.01) | |
| *G06Q 30/0203* | (2023.01) | |
| *G06Q 30/0204* | (2023.01) | |
| *G06Q 30/0242* | (2023.01) | |
| *G06Q 30/0251* | (2023.01) | |
| *G06Q 30/0272* | (2023.01) | |
| *G06Q 30/0282* | (2023.01) | |
| *G06Q 50/00* | (2024.01) | |

(52) U.S. Cl.
CPC ........... *G06N 20/00* (2019.01); *G06Q 10/103* (2013.01); *G06Q 30/0203* (2013.01); *G06Q 30/0205* (2013.01); *G06Q 30/0246* (2013.01); *G06Q 30/0249* (2013.01); *G06Q 30/0254* (2013.01); *G06Q 30/0267* (2013.01); *G06Q 30/0272* (2013.01); *G06Q 30/0277* (2013.01); *G06Q 30/0282* (2013.01); *G06Q 50/01* (2013.01)

(58) Field of Classification Search
CPC ........... G06Q 30/0249; G06Q 30/0254; G06Q 30/0267; G06Q 30/0272; G06Q 30/0277; G06Q 30/0282; G06Q 50/01; G06F 16/951; G06F 16/953; G06N 20/00; G06N 5/022; G06N 5/025
USPC ............... 705/7.32, 14.16, 14.41; 725/40, 35
See application file for complete search history.

(56) References Cited

U.S. PATENT DOCUMENTS

| | | | |
|---|---|---|---|
| 2007/0130015 A1 | 6/2007 | Starr et al. | |
| 2008/0060003 A1* | 3/2008 | Nocifera ................ | G06Q 30/02 725/35 |
| 2010/0036970 A1 | 2/2010 | Sidi et al. | |
| 2011/0093453 A1 | 4/2011 | Frayman et al. | |
| 2012/0130800 A1* | 5/2012 | Pradeep ................ | G06Q 30/02 705/14.41 |
| 2013/0346172 A1* | 12/2013 | Wu ..................... | G06Q 30/0214 705/14.16 |
| 2014/0280556 A1 | 9/2014 | Kazi et al. | |
| 2015/0382068 A1* | 12/2015 | Shimy ................ | H04N 21/4788 725/40 |
| 2018/0012253 A1 | 1/2018 | Gavlovski et al. | |
| 2018/0018907 A1 | 1/2018 | Kim et al. | |
| 2018/0189074 A1 | 7/2018 | Kulkarni et al. | |
| 2021/0058666 A1* | 2/2021 | Kim ................... | H04N 21/4184 |

OTHER PUBLICATIONS

Gil, Alberto et al. Personalized multimedia touristic services for hybrid broadcast broadband mobile receivers, 211-219 (2010).

Haupt, Johannes et al. Robust identification of email tracking a machine learning approach, School of Business and Economics, Humboldt University of Berlin, 33 pages (2018).

Kardan, Ahman A. et al. Targeted advertisement in social networks using recommender system, IEEE, 13 pp. 2013.

* cited by examiner

Distribution (happens after Storage)

Localized Audiences (part of Storage –phase)

Centralized Ad Account Model

Decentralized Ad Account Model

Publishing – 1:Many social media Page to SOCi Locations (Single Corporate social media Page)

| Manage Ad Accounts for Locations | | |
|---|---|---|
| Search for a Location | Available Accounts | Assigned Accounts |
| Filter: All Assigned Unassigned | Search for available accounts | Search for assigned accounts |
| Cafe - Seattle (0) | Home Communities [Add] No. 1 | *No Ad Accounts available to add.* |
| Cafe – Los Angeles (0) | | |
| Cafe – San Francisco (0) | Senior Living [Add] Living No. 2 | |
| Cafe – Anaheim (0) | | |
| Cafe – New York (0) | Diana [Add] No. 3 | |
| Cafe – Miami (0) | | |
| [Close] | | |

FIG. 10B

SYSTEMS, DEVICES, AND METHODS FOR DYNAMICALLY GENERATING, DISTRIBUTING, AND MANAGING ONLINE COMMUNICATIONS

CROSS REFERENCE TO RELATED APPLICATIONS

The present application is a continuation of U.S. patent application Ser. No. 17/742,338, filed May 11, 2022, which is a continuation of U.S. patent application Ser. No. 16/986, 193, filed Aug. 5, 2020, now U.S. Pat. No. 11,379,883, granted Aug. 5, 2020, which claims priority from U.S. Provisional Patent Application No. 62/885,177, filed Aug. 9, 2019, and U.S. Provisional Patent Application No. 62/941, 680, filed Nov. 27, 2019, entitled "Systems, Devices, and Methods for Generating, Distributing, and Managing Online Communications", the disclosures of which are incorporated herein by reference in their entirety.

TECHNICAL FIELD

The subject matter described herein relates to the generating and distributing of online, e.g., web, content, autonomously and automatically.

BACKGROUND

Online content may include emails, websites, messages, blogs, articles, posts, images, animations, and all forms of social media content, as well as other forms of communication posted to internet pages. Such online content often contain information relevant to the commercial activities, social standing, reputation, and/or general interests of companies, organizations, their consumers, advertisers, and other internet influencers and users (herein collectively "Users"). It is, therefore, important for growing businesses to reach potential consumers by publishing online content. However, it is no longer enough to simply publish content on a social media platform. Today, brands need to engage with consumers in a meaningful way, and thus, are beginning to invest in promoting more personalized content to more efficiently reach their top-performing locations and audiences in order to drive reach, engagement, and revenue.

Particularly, with the decline of organic social reach and engagement, brands are investing in paid social to get in front of their most engaged audiences in a more meaningful manner so as to drive growth. However, there is a problem in that the national ad campaigns of brands are having difficulty reaching their local audiences in a meaningful way. With a majority of buying decisions happening online and at the local level, it's more important than ever for multi-location brands and agencies to reach local audiences with localized messaging if they want to effectively grow and scale, and appropriately manage their communications as they do so.

Even when adept at online communications, it is extremely difficult and cost prohibitive in terms of time and resources for large brands to individually manage hundreds or thousands of local ad accounts. As an example, if a medium sized brand having 15,000 locations desires to spend $300 in ad spend to generate and deploy individualized advertisements for each location, they would need to generate 15,000 individualized advertisements at a cost of 4.5 million, and if they wanted to run a new ad each month the cost would be 54 million. The sheer size and cost of such a venture is a practical problem in need of a solution.

Designing and running such an advertising campaign is problematic for the most adept of brand managers, but for small business owners it is a herculean task.

In view of these difficulties, the digital advertising industry has become a huge industry that continues to grow. Particularly, in view of the decline of organic social reach and engagement, and in light of these absorbent costs, businesses are turning to a variety of social media modalities that have become an essential foundation for brands and businesses to drive growth through paid social media advertisements. However, it is simply not enough to publish content on various publisher's webpages, sellers of goods and services must now advertise on social media platforms, in a manner that is relevant to the diverse interests of their consumers, in their local markets, if they wish to remain competitive in the market place.

For these purposes, many social media platforms provide powerful management tools that allow brands to manage their media engagement. However, these tools are difficult to use, often requiring specially trained skill sets, and are costly to employ. Hence, such management tools for optimizing brand reach require paid professionals and large advertisement campaign budgets, and even then, the tools and their use can be overwhelming for a large amount of users. More importantly, many social media platforms do not offer localized ad solutions for multi-location brands and businesses, which produces a previously unrecognized problem in need of a solution.

Consequently, in adapting to this new online market place, today's brands have allocated large budgets for investing in targeted, paid social media advertising so as to more efficiently reach their top audiences and locations in order to drive reach, engagement, and revenue. More particularly, in one estimate, FACEBOOK® has generated $23 billion in U.S. ad revenue in 2018 (and $54.4 billion globally, an increase of 36.3% from 2017). GOOGLE® is projected to generate nearly $42 billion in U.S. advertising spend. Combined, the two companies are projected to account for about 57.7% of all money spent on digital advertising in 2018. Further, AMAZON® and other social media platforms, such as SNAPCHAT®, other tech companies, including APPLE® and MICROSOFT®, are exploring advertising. Streaming television services, including services like NETFLIX®, which hasn't relied on advertising, are predicted to jump into the game in 2019. All of these platforms, therefore, represent huge advertising possibilities for the sellers of goods and services by which to increase their reach and ability to meaningfully connect with potential consumers.

However, there are several further difficulties inherent to employing these platforms for performing advertising. For instance, one such difficulty is managing content across several different platforms. Specifically, it is difficult to generate consistent advertising across modalities, and with respect to all of the different local markets a given brand may service. More specifically, it is typical in the industry to employ several brand representatives whereby each representative is responsible for the messaging posted to a single social media platform, but because different team members manage different platforms, often times the messaging becomes inconsistent and sometimes contradictory.

Likewise, when a brand, such as a nationwide brand, is servicing a multiplicity of regions having a plurality of local markets, then a larger number of representatives are necessary to manage all of these different markets, and the problem of inconsistent messaging becomes exponentially more difficult. But even still, even with a large number of representatives, it is unlikely that they will be able to generate advertisements directed to each particular location servicing each particular geographic region and with respect to each social media modality. More specifically, it would be extremely cumbersome to log into each local social media modality of each specific location so as to generate and distribute a unique advertisement for each regional location, and each localized consumer therein, and this cannot be done by logging into a unitary interface at the corporate and/or local level. Particularly, given the fact that many national brands have hundreds to thousands of offices, or franchises, spread out over the entire nation, and even globally, there is a tension between the centralized national objectives of the organization, as a whole, and the objectives of each local franchise.

For instance, the home office may be concerned with increasing reach and driving overall sales, whereas each local office may be concerned with establishing more substantial connections to their local communities, and because of this the messaging to be advanced by the central office, especially with respect to sales, may at times be diametrically opposed to the messaging sought to be advanced by one of the dispersed local offices. However, it is a practical impossibility for a brand to effectively control the messaging of the entire organization, so as to meet the demands of the central office, while at the same time as meeting the particular needs of each individual local office.

For example, major brands typically don't have a problem setting up and deploying a nationwide advertisement campaign. What is problematic, however, is determining how to deploy hundreds to thousands of unique locally focused advertisements at a reasonable cost. In such instances, even spending $100-$200 per advertisement can amount to hundreds of thousands of dollars of advertising spend, such as where the brand has a thousand or more locations servicing a thousand or more local communities. This becomes even more expensive when the corporate brand, e.g., promoter of the sales of goods or services, desires to send out new and individualized advertisements on a monthly basis. Accordingly, it is expensive to generate such advertising, and even more so when such advertising needs to be generated manually and particularized to each local market. In fact, to do so is so labor intensive as to be cost prohibitive.

Specifically, the cost of generating advertising that is relevant to each local market, and consistent across platforms, would be so expensive that any revenues generated thereby would simply not justify the spend. To help minimize costs corporate brands attempt to employ software to create and promote advertisements, but typically, they only use a single account, e.g., the corporate account, to conduct messaging nationwide. In such instances, the messaging is not catered to any given particular location. Rather, the advertisements they create are deployed at the nation-wide, e.g., group level. In such instances, corporate franchises and local offices may be granted access to the corporate account, and may be instructed to follow corporate advertising guidelines so as to promote consistency in messaging. However, these decentralized franchises often times cater the corporate messaging to their particular localities and in doing so the messaging becomes inconsistent and can often times be contradictory, especially, when the advertisements are promoted at the group level, but are paid for at the local level.

An additional problem is that such a multi-social media advertising regime may in some form be employed by the bigger consumer brands, but for the large majority of sellers, the complexity and expense of generating and distributing online advertising is so great as to limit their access to the online market place, and thus, poses a substantial barrier to market entry, thereby, reducing their competitiveness and overall competition. Particularly, local business owners simply cannot handle devising and running a comprehensive advertising campaign, such as with regard to creating an audience, writing copy, building a creative, e.g., an advertisement, setting up a targeted distribution regime, and determining results, especially where each of these steps is performed individually and manually. Specifically, what they desire is an automated system, whereby they can set their budget, and have each of the forgoing steps happen automatically and/or autonomously.

What is needed, therefore, and provided herein is a platform by which the above referenced problems may be resolved, and namely, solves the problems that nationwide and local sellers face when managing advertisement budgets for multiple locations, and for empowering decentralized locations to more easily cater and promote advertisements set up by their centralized corporate offices or agencies. Particularly, the present technologies are directed to solving the gap in message management across social media platforms so as to make it possible and easy for multi-location brands and their agencies to create dynamic localized ads, store, and share ad creative across teams, and instantly promote localized ads to hundreds or thousands of locations or local social media pages and/or other interfaces.

Accordingly, what is needed is an intuitive, easy to use platform for advertisement generation and deployment across social media modalities and throughout the various divisions of global brands. Hence, provided herein is an advertisement generation platform that includes unique templated and containerized configurations for specialized advertisement generation that can be catered to local markets, but scalable globally. In various iterations, the platform may be implemented in association with a robust artificial intelligence module that is adapted for executing an automated process for dynamic and automatic advertisement generation and distribution. In particular instances, the presented platform functions to ensure message consistency, vastly increasing reach across social media modalities, while reducing production cost, thereby allowing a greater portion of advertising spend to be allocated to increasing reach and lift while reducing production costs.

SUMMARY

As set forth above, there exist a pernicious problem faced by nation wide brands attempting to reach potential consumers. Particularly, decisions to purchase goods and services are made locally. Hence, even for megalithic worldwide brands, their consuming audience is local. For instance, from browsing an online offering, clicking on a company's website or walking into the local store, buying decisions typically happen at a local level. However, despite this unrecognized fact, national ad campaigns are not reaching local audiences with local messaging. Further, given the complexity of generating and running an advertisement campaign across a variety of social media platforms, many small independent goods and service sellers are simply not capable of effectively competing with major brands in local markets.

The present technology recognizes that local messaging can prove to be more effective at driving demand, leading to greater sales, higher prices, and better advertising results. But current agency practice cannot manage the tens to hundreds or thousands of local ad accounts, as it would be too labor and cost prohibitive. For example, it is simply too costly even for most major brands to deploy even $100 per location, such as where there are 15,000 locations such as on a monthly basis, let alone local business owners who simply cannot generate and run an advertising campaign for themselves.

Particularly, the vast majority of small, and even big business owners, do not have the technical expertise required for generating ad creatives, creating audiences, setting up a targeted distribution methodology, writing copy, and/or determining results manually. Accordingly, what is needed is an intuitive, automated system that is capable of autonomous advertisement campaign generation, workflow implementation, and maintenance, especially with respect to the generation of media rich advertisements and the running and evaluating of an advertisement campaign form a centralized and/or decentralized platform.

This disclosure, therefore, includes implementations of methods, apparatuses, systems, and computer program products related to facilitating the evaluation, generation, and distribution of web content, such as for the implementation of an advertisement campaign. Particularly, this disclosure is directed to implementations of apparatuses, systems, their methods of use, and computer program products related to generating online content, facilitating its efficient distribution, the tracking, monitoring, and evaluating of its effectiveness. The methods disclosed herein and the apparatuses for performing the disclosed methods may include the scoring of such web content, the reporting of the same, as wells the assessment and maintenance of the online presence of web-based content providers, such as commercial entities, publishers, advertisers, market influencers, and other interested third parties. Some of the advantages of such a platform is that it solves many of the gaps that presently plague sellers and advertisers in the market place, thereby making it easier for non-sophisticated sellers to implement a comprehensive advertising campaign as well as an advertising regime that services a variety of locations so as to drive growth and reach.

Specifically, the present platform simplifies local social advertising for multi-location brands and agencies. More specifically, the present technologies solve the problem of employing a social media platform for deploying a large number of advertisements across a wide variety of locations while not requiring specialized training and without being cost prohibitive, e.g., minimizing the cost per ad spend per location across all locations, such as from tens to thousands of locations. Consequently, employing the present platform, national and local business owners and/or marketing teams can efficiently manage their social media accounts, e.g., FACEBOOK®, INSTAGRAM®, and other social media ad campaigns across hundreds or thousands of local business pages, while staying on-brand. By using the platform to invest in their growth, brands can more easily get in front of their local audiences with relevant and timely ads that cater to their local business objectives. A unique feature of the platform is an intuitive generating, distributing, tracking, and reporting dashboard that allows a user to generate, deploy, and regulate ad spend and performance at the national, regional, and local levels so as to gain key insights, develop, and elevate advertising strategies.

Particularly, such growth may be advanced by the devices and systems disclosed herein as well as by their methods of use, which provide for the generation and distribution of highly individualized communications and advertisements to specifically targeted audiences so as to reach local consumers with advertisements that are catered to them individually. More particularly, the use of the template based generation system allows for ad creatives to be both shared across an organization, but also customized so as to be highly relevant to each local market, this allows for both consistency in messaging but individualization across the marketplace thereby meeting the needs of both national and local representatives.

Likewise, in this manner, advertising spend can be amplified and spread over a greater proportion of the company, while at the same time being more specifically tailored to each location's particular social environments. Further, because of the layered and containerized manner by which the advertisement architectures are distributed, the system is configured to both generate and broadcast advertisements dynamically, on the fly, and substantially real-time, which advertisements may be distributed to hundreds and thousands or even hundreds of thousands or more of recipients, such as simultaneously, and can be easily editable and updated in a one to many context.

Accordingly, in one aspect, provided herein is a system for executing an advertisement generation pipeline for generating an advertisement from one or more media elements, such as a template and a media component, for instance, where the media components includes a text component and/or an image component. For example, the present system may be configured for collecting media elements, which media elements once collected may then be scored and stored in a memory, such as a media repository, which in various embodiments, may be a structured library. Hence, the system may include a memory that is configured for storing the plurality of media elements including a collection of media templates and a collection of media components, such as where the media components include a text and/or an image component, which may be integrated together to form the advertisement, such as by the processes of a computing device, for example, implemented by a central processing unit, graphics processing unit, and/or a server including one or more of the same.

For instance, the system and devices herein described may be configured for producing and implementing a dynamic text and/or imaging protocol, such as for employing dynamic text and images, including stills and video, for the generation and distribution of advertisements. In such an instance, the content collected, e.g., texts and images, can be general in nature, such as collected from an organization's corporate webpages, e.g., generic corporate content, and/or may be localized content, such as collected from a local company's webpage, or from a social media, or other modality's website, where content of interest may be collected. In this manner, advertisements may be generated from scratch.

Particularly, such advertisement generation may be implemented as an automated process for creating a variety of unique, global advertisements where each ad has a local look and feel, such as where the advertisement is generated automatically and/or autonomously, e.g., at one time by the system, and thus, has a global appearance, but where each advertisement includes individual and unique text and/or images that gives each ad a unique local look, without having to make hundreds or thousands of iterations. For instance, in various embodiments, the advertisement may be generated from a collection of layers having a variety of containers therein, whereby one container can be a universal container that is adapted such that a change to the content of the universal container gets propagated to one or more subservient containers, such as substantially simultaneously.

In a manner such as this, a corporate brand can create, promote, and distribute advertisements to and from all of its locations, such as by using one, centralized global account, such as at the group level, where the advertising spend is paid for at the group level. Likewise, a plurality of localized accounts may be employed, such as at the local franchisee level, for instance, where the franchisee is granted access to the brand's ad accounts and follows their advertisement guidelines set by the brand to create and promote ads for their independent locations. These de-centralized franchises promote ads at the group level and may pay for them at the location level. In either of these instances, the content across the brand can be controlled such as in a cascading manner whereby changes made to universal templates get automatically made to all associated local templates.

Further, with respect to brand agencies, and the like, advertisements may be created, reviewed, approved, promoted, and distributed to hundreds of locations for the same brand. Agencies can share and reuse ad creative architectures, which have a proven success rate, e.g., with respect to lead, impression, and/or conversion generation, may employ centralized or de-centralized dynamic texts and images, and promote ads to any location. In various instances, vertical and/or horizontal agencies, such as ad agencies, may create and promote ads to hundreds or thousands of locations for multiple brands. Agencies can dynamically insert images relevant to each industry/vertical, use dynamic text, and promote ads to any of their brands' locations. Since they manage multiple brands across different verticals, horizontal agencies need the flexibility to access a broad range of creatives for their dynamic advertisement generation needs (e.g., texts, imagery, budget, centralized or decentralized, etc.). However, in various other embodiments, advertisements and/or the templates and media components of which they are made may be stored in one or more libraries of the media repository and may be prefabricated, such as having been built manually prior to storage in the repository.

The system, therefore, may include a CPU, GPU, or the like, which have a memory interface configured to access the memory, and further includes a set of processing engines, where each processing engine is configured to perform one or more steps in a content collection and advertisement generation, evaluation, and/or distribution pipeline, such as on the collected and/or scored media elements. For instance, the set of processing engines may be configured as one or more processing modules, such as a data collection module, a media component evaluation module, an advertisement generation module, and the like. Particularly, the system may include a data collection module configured for collecting the media elements including the plurality of media components, such as where the plurality of media components include one or more of a text element, an image element, and/or metadata pertaining to the media elements and/or the websites and webpages from where the media elements were collected.

Likewise, the system may include a media element evaluation module that is configured for evaluating, e.g., scoring, the plurality of media elements, e.g., media components, where the evaluation is based on one or more metric data so as to produce scored media elements. The media evaluation module may also be configured for transmitting the scored media elements, e.g., components, to the memory for storage thereby. Additionally, an advertisement generation module may be included, such as where the advertisement generation module is configured for accessing the memory and selecting both a media template and a media component for integration within the media component. In various embodiments, the integration may be performed by an integration module. In such an instance, the advertisement generation and/or integration module may include one or more of a project dashboard, an advertisement builder, a compiler, a formatter, and a distributor.

For instance, the advertisement generation module may include a server for constructing a project dashboard that is configured for producing a graphical user interface that may be presented at a display of a client computing device of a system user, such as a system at an advertiser or company seeking to generate and distribute advertisements. In such an instance, the project dashboard may include controls for allowing the user to view and select the media template and the media component for integration therewith. An advertisement builder for accessing the memory and building the advertisement may also be included, such as based on the media template and media component selected by the user, or by the system itself. The advertisement generation module may further include a compiler for integrating the selected media component into the selected media template so as to generate the advertisement, and may include a formatter for formatting the advertisement for display at a graphical user interface of either or both of a stationary and a mobile computing device. The system may additionally include a distributor, e.g., a distribution program, configured for distributing and/or broadcasting the formatted advertisement to one or more of social media modalities in a format capable of being viewed by a user in one or more formats, en masse without being subjected to filtering. The system may also include an advertisement evaluation module for evaluating the effectiveness of the distributed advertisement.

Accordingly, an advantage of the present system is that it allows for the global administration and/or generation of advertisements, while at the same time providing for local contexts, looks, and feels. Particularly, presented herein is a powerful advertisement generation platform for generating and distributing advertisements both locally and globally. More particularly, the present system allows a single user to create and deploy advertisements across a wide variety of social media modalities and amongst a large number of social media accounts with customized language and images, e.g., with just a few clicks of a button.

For instance, using the template, layered, and/or containerized system, a global company can generate advertisements to be deployed at global scale but with a local contexts, and then can distribute the advertisements to targeted local audiences via a large number of social media pages, all from a single interface. Likewise, using the devices, systems, and methods disclosed herein, advertisements cannot only be generated and deployed, e.g., autonomously and on the fly, but given the layered and containerized nature of the building, the distributed advertisements can also be edited and updated real time and on the fly. In a manner such as this, national advertisement campaigns can be uniquely catered to reach local audiences, e.g., with local messaging, which messaging has been shown to drive higher sales rates.

Provided herein, therefore, is a device, a system, and a method of their use for generating and distributing advertisements, such as social ads, real-time, and on the fly, in a manner to reflect both national corporate as well as localized business interests. Specifically, the social advertisement platforms disclosed herein provide the ability for a single, or multiple users, e.g., from a common interface, to promote a business through one or more social networks. Such social media modalities are important because they provide one of the quickest and most effective ways to specifically target a large number of consumers who use social media modalities as their primary interface with others. Particularly, advertising represents a massive part of the economic market whereby companies allocate ever increasing budgets to the implementation of advertising campaigns.

However, such advertising is typically performed through an external advertising exchange involving a bidding process, whereby content providers dictate the bidding process. The present systems and processes described herein, on the other hand, put advertising directly back in the hands of the producers and sellers of goods and services, as well as their advertisers, by providing them a platform that allows them to generate and distribute advertisements directly to consumers without having to go through an advertisement exchange and/or bidding process. While suitable for use in conjunction with a typical advertisement exchange system, in various embodiments, the present advertisement generation and distribution system may be employed so as to transmit advertisement directly to end users via a social media platform. However, in various other embodiments, the system may be used to submit generated advertisement to an advertisement exchange, such as where having recourse to the structured libraries of media components described herein, the advertisements may be generated on the fly and catered to the direct needs of the advertisement bid requests of an advertisement exchange.

Accordingly, the present system extremely reduces the cost of advertisement production and distribution, as compared to the traditional ad exchange process. As an example of the cost implications, a single dollar spent on implementing advertising directly on any given social media modality, could result in a return on investment of about four website visits, two page likes, eleven engagements, and over a hundred impressions. Likewise, five hundred dollars spent on implementing advertising directly on any given social media modality, could result in a return on investment of about a few thousand website visits, a thousand page likes, thousands of engagements, and over tens and tens of thousands of impressions. Consequently, the social advertisements disclosed herein are extremely inexpensive in comparison to traditional ad-exchange advertising methods.

So being, provided herein is a system that includes one or more client computing devices that are configured for communicating over a suitably configured internet network connection to one or more servers, whereby a graphical user interface showing a dashboard may be presented at the client computing device for the configuring of an advertisement campaign and/or for the generation of an advertisement and/or one or more elements to be included therein. Specifically, in one aspect, provided herein is an apparatus for executing an advertisement generation pipeline for generating an advertisement from one or more collected and scored media elements. For instance, a system may be provided wherein the system includes an apparatus, such as a server that may be associated with a memory, such as a structured library of a database, which is configured for storing the collected and/or otherwise generated media elements, such as a media template and a media component. In various instances, metadata related to the collected content and/or the process of collecting it, as well as data pertaining to the websites and webpages from which the data is collected may also be retrieved and stored in the memory.

Particularly, the apparatus may include one or more central or graphics processing unit (CPU or GPU), such as a server containing the same. For example, a CPU or GPU may be provided where the CPU or GPU is configured for collecting and scoring the media components, which are to be stored in the memory, e.g., either an onboard or off board memory. Further, the CPU and/or GPU may be configured for employing one or more of the stored media components in generating the advertisement, such as where the CPU or GPU includes a set of set of processing engines.

More particularly, the set of processing engines may include a first processing engine that is configured for collecting a plurality of media components, such as a plurality of media components that include one or more of a text element, an image element, an animation element, a carousel element, a video element, and the like. A second processing engine may also be included whereby the processing engine is configured for evaluating the plurality of media components so as to produce scored media components, such as scored with respect to their ability to effectuate a given outcome, such as increased user, e.g., consumer, approval and engagement, increased user activity, increased lift, increased impressions, conversions, views, likes, upvotes, posts, reposts, forwards, and the like. A third processing engine may be included and be configured for generating and/or selecting a template and a scored media component, and/or for integrating the scored media component into the template so as to generate the advertisement. A fourth processing engine may be provided for formatting the advertisement, such as for display at a graphical user interface, such as at either, or both, of a stationary and/or a mobile computing device. Likewise, a fifth processing engine may also be provided for distributing and/or broadcasting the formatted advertisement, such as to a plurality of social media modalities and/or an advertisement exchange server, in a format capable of being viewed by a user at a third party client computing device. Additionally, a sixth processing engine may be provided for tracking and/or evaluating the effect the advertisement has on the consumer after the user is exposed to the advertisement. A seventh processing engine may also be provided for scoring and/or recommending content for use in generating further advertisements based on content scoring with respect to its success in a given environment and over a large variety of locations.

Further, in particular embodiments, additional processing engines may be provided where at least one of the processing engines is configured for generating a project dashboard that is adapted for presenting a graphical user interface, such as at a display of a client computing device. Specifically, in various embodiments, the project dashboard may include one or more controls for allowing the consumer to view and select the media template and the media component for integration therewith. In specific embodiments, the project dashboard is configured for allowing the user to select an objective, a budget, a target audience, and/or a geographical distance within which the advertisement is to be distributed.

Accordingly, provided herein is a simple to use, intuitive user interface that simplifies the process of generating and launching an advertisement down to just a few clicks of a button, making the process swift and comprehensive. Hence, presented herein is a dashboard, generated at a graphical user interface, that is useful for configuring, administrating, approving and managing advertisement campaigns on both a national and local level, such as with regard to dynamic advertisement content generation and incorporation into an advertisement, audience and location targeting, and for providing the tracking and evaluating effectiveness. One or more notifications or suggestions may also be provided as a result of one or more analyses being performed on any of the collected data.

In various embodiments, the system and/or an apparatus thereof may include an artificial intelligence module that may be associated with one or more of the modules, servers, CPUs/GPUs, processing engines, and the like, disclosed herein. For instance, the system may include a structured database and an artificial intelligence (AI) module, e.g., associated with the data collection, media element evaluation module, advertisement generation module, and/or advertisement evaluation module, such as for implementing one or more processes disclosed herein, such as for implementing a data collecting, evaluating, scoring, and/or generation protocol for collecting, generating, evaluating, and scoring the various media components and their use in advertisements. In particular embodiments, the AI module may be associated with machine learning module as well as an inference engine module for evaluating content and making one or more predictions of the ability of a generated communication to achieve a determined goal. In more particular embodiments, the AI module may be coupled to an advertisement integration module, and may be configured for selecting and/or suggesting the template, content, and the media component class for generating the advertisement, such as where the selecting and/or suggesting is based on results of the scoring. Likewise, in various embodiments, the AI module may be configured for generating, or at least assisting in the generating, and distributing, of the advertisement, which may be generated and distributed automatically and/or autonomously at real time and on the fly upon the occurrence of a triggering event.

Additionally, in another aspect, provided herein is a multimedia communication platform for administering an advertisement campaign, such as where the multimedia communication platform includes a memory, a server, and a client computing device which may be coupled one to another via an internet network connection. For instance, the memory may be a structured memory having one or more libraries that are configured for storing a plurality of scored media elements, based on one or more identifiable and/or searchable features, which media elements may include a media template, and a media component, a media class, such as an image, a media rich image, an animation, a video, and the like, where one or more of the media templates and the media components may be classified and/or stored in accordance with one or more categories, tags, and/or may include a score. Further, the server may have a communications module that includes a network internet connection to communicate with the memory, and may include one or more engines.

For example, the server may include a data collection engine for obtaining and extracting data from a web page. In such an instance, the data collected may include a plurality of media components, such as a text element and an image or video element that may be used as an advertising component of the system. In various instances, the data collection engine may further be configured for collecting metadata, such as metadata pertaining to one or more of the webpage from which the data was collected and metadata pertaining to the collected data itself. The server may also include a media component evaluation engine that is configured for evaluating the plurality of media components, such as based on metric data so as to produce scored media components, and for transmitting the scored media components to the memory for storage thereby.

As indicated, the server and/or client computing device may be coupled to a memory and/or other client computing device via the network internet connection. The client computing device may be configured for generating and/or for selecting the components for generating an advertisement, such as from one or more of the collected and scored media components. The server and/or client computing device may receive and/or include a project dashboard that is configured for presenting a graphical user interface at a display of the computing device, such as where the project dashboard includes controls for allowing a user to view and select a media template and a media component for integration therewith. Additionally, the server and/or client computing device may include or otherwise be associated with an advertisement builder for accessing the memory and building the advertisement based on the selected media template and media component.

Further, the server and/or client computing device may include an advertisement generation engine that is configured for retrieving content, transforming that content into a content class, such as in a text, image, animation, video, or other media rich class, integrating the selected media component, e.g., with respect to the advertisement class, into the selected template so as to thereby generate the advertisement and for transmitting the generated advertisement to a recipient and/or to the memory for storage thereby. In such an instance, the server may include a distribution engine, for retrieving the generated advertisement from the memory and distributing the advertisement to a plurality of social media modalities, such as in a form suitable for being presented for display thereby to a user of the system.

Accordingly, in another aspect, a multimedia communication method is provided. The method may include providing, such as from a computing device and/or server computer, via an Internet network connection, an input screen to a graphical user interface of a display of a client computing device that is coupled to the server computer via the Internet. In various instances, the input screen presents a collection of content, media templates, a collection of media components, and/or media rich classes to a user, e.g., an advertiser seeking to build an advertisement, whereby the user may engage with one or more controls provided thereby so as to select one or more of a media content, template, a media component, and/or a media rich class, such as where the media component may include one or more dynamic text elements and one or more dynamic image or other media rich elements. For instance, in particular instances, the text and image elements may be presented in ranked order, such as where the order is determined by a score representing the effectiveness of the media component.

Accordingly, the method may further include receiving, at the server computer, or other computing device, e.g., via the input screen of the graphical user interface and via the Internet, a user selection for the content, the template, a media component, and/or a media rich class, such as where these components, e.g., template and media components, are accessible on the graphical user interface on a display associated with the server and/or client computer. Additionally, the method may include forming the media components into the appropriate class type and/or compiling, by the server or other computer, the selected template and selected media components to generate an online advertisement in the appropriate class, such as where the advertisement may include a plurality of slides defined by one or more of a grouping of design layers, design elements, and content containers. Further, the method may include formatting, by the server computer, or other computing device, the online advertisement according to a selected media rich class and in an electronic distribution format specified on the graphical user interface. In various embodiments, the electronic distribution and/or broadcasting format may be selectable from a set of options of an electronic mail, a web page, a post, a banner, an electronic brochure, a text ad, a mobile ad, an in-stream ad, an in-video ad, an animated video file, an expandable video file, and an animated file for display on a computer, and the like.

Furthermore, the method may include distributing the generated advertisement to a social media modality, an advertisement system server, or publishing server for publishing thereby. Further still, the multimedia communication method may include evaluating, by the server or other computer, the collection of media components, and storing the plurality of media components based on metric data so as to produce scored media components to produce scored media components, and for transmitting the scored media components to the memory for categorization, scoring, and/or storage thereby.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF THE DRAWINGS

These and other aspects will now be described in detail with reference to the following drawings.

FIG. 4B is another exemplary dashboard interface for setting up an advertisement campaign.

FIG. 5A is a further exemplary dashboard interface for setting up a location parameter of an advertisement campaign.

FIG. 10B is an exemplary lead generation interface for setting up a lead generation form.

DETAILED DESCRIPTION

Figure 1A:
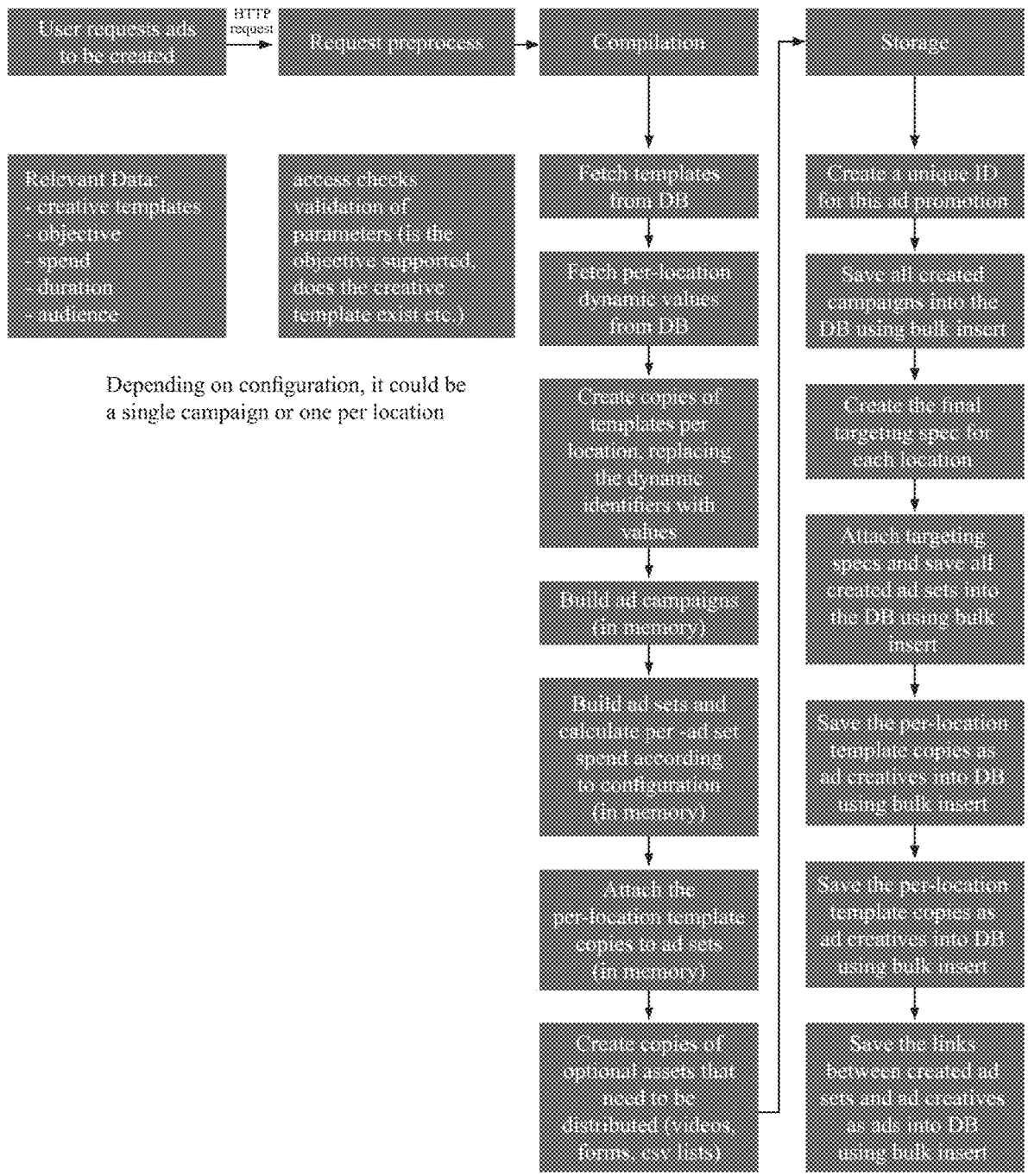
FIG. 1A is a process diagram illustrating an exemplary compilation and storage methodology for generating an advertisement in accordance with the teachings of the disclosure.

This document describes the collection, transformation, generation, distribution, and/or management of online web content. The devices, systems, and methods described herein can be used to collect and generate online web content and communications, for example, advertising, personal or business webpages, blogs, social media posts, etc. In various instances, the collected content can be transformed from one content type to another, such as from a text based content to an image and/or animation, and/or video content classification. The subject matter described herein can be utilized by commercial entities, corporations and companies, service providers, advertisers, publishers, market influencers, and/or other suppliers of web content to produce one or more marketing and/or advertising campaigns, as well as monitoring, managing, defining the efficiency, effectiveness, and workability of the campaign with respect to generating user engagement, thereby accurately determining the cost benefits of the campaign, thus providing guidance for the generation of original web content, such as for the purposes of enhancing customer or follower experience, driving business, and for driving advertising campaigns. Alternatively, web content that is in the public domain, and determined to perform well, can be reproduced, referenced, or otherwise referred to, in the context of promoting or presenting the user's web content.

In view of the above, in various embodiments, the devices, systems, and their methods of use, as described herein, are beneficial for independent, sole-proprietors, as well as for multi-location brands, and their agencies, for generating and distributing media content, such as advertisements, which may be deployed on a multiplicity of social media modalities so as to service both local and nationwide localities. Particularly, provided herein are devices, systems, and their methods of use for autonomously and/or dynamically generating advertisements, in certain instances, automatically.

In the manners disclosed herein, a single advertisement may be created in a manner to include one or more media elements, such as a template and one or more media components. A unique feature of this dynamically templated methodology is that the template may be formed of various layers that may include one or more container elements such that once the advertisement template has been created, various of the different media components, e.g., dynamic text and/or images, can be removed from and/or exchanged for other media components within the containers of the layered template, and may be converted from one media rich type to another. In such a manner as this, an advertisement may be generated so as to be easily edited, updated, or otherwise changed, e.g., dynamically and/or on the fly, such as for use across a variety of geographically disperse locations, on a variety of different social media platforms, and/or to achieve multiple objectives per advertisement structure. In various embodiments, the template is comprised of coding that is configured for calling one or more media components into one or more of its containers of one or more layers of the template and/or for changing the form of the media content component, such as from a graphic to an animation, an animation to a video, and the like.

Further, as described herein below, the media elements, such as the advertisement template and media component, may be content that is collected from the internet. Particularly, the present devices, systems, and their methods of use may include the retrieving, evaluating, scoring, and storing of content, such as online content, that has been collected for possible use in the generation of an advertisement. Hence, using the systems and methods herein, a multiplicity of different advertisements, in a variety of media rich content types, may be generated and/or deployed using the same media elements, e.g., from the same or similar templates, containers, design layers, and the like, as described herein below.

Specifically, the generated advertisements may be composed of layers having one or containers that include media components, such as dynamic text and images, and are therefore easily editable and capable of mass deployment. For instance, the main body of a templated advertisement may be composed of text copy, there may be a headline, and one or more URLs may be included, such as a website URL, e.g., for a landing page, or a display link, such as including URL text that may be displayed in a shortened or reformatted manner. A link description including supporting copy may also be included and displayed, e.g., under headline.

Accordingly, in view of the above, in one aspect, provided herein is an apparatus for executing an advertisement generation pipeline for generating an advertisement from one or more collected and/or scored media elements. In various embodiments, the apparatus may include an onboard memory, or at least a memory interface for coupling to an external memory, and a processing unit, such as one or more central and/or graphics processing units (CPU or GPU). For instance, in one embodiment, the apparatus may include or otherwise be associated with a memory, such as a structured memory or library, which is configured for storing media elements, such as including one or more of a media template, a media component, and/or one or more layers and/or slides, such as a slide defined by one or more of a grouping of design layers, design elements, and content containers.

Additionally, the apparatus may include one or more central or graphics processing units (CPU or GPU) that are configured for searching, collecting, manipulating the form, and/or scoring media components, e.g., texts, images, videos, and the like, which may be stored in the memory, such as in a ranked order based on the determined scoring. In various implementations, the CPU and/or GPU may be utilized for employing one or more of the stored media elements, e.g., advertising components, in generating the advertisement. In one embodiment, the one or more CPUs and/or GPUs may be implemented as one or more cores within a server. However, in other embodiments, the CPU and/or GPU may be implemented by a client computing device.

Particularly, the CPU and/or GPU may be configured to include a set of processing engines. For example, the processing unit may include a first processing engine that is configured for collecting a plurality of media elements, such as media components. In a particular embodiment, the collected media component may include one or more of a text element and an image element, where the image element may include a digital photograph, a carousel element, a video element, a graphic, an animation, and the like. A processing engine may optionally be provided for converting a media component from one type to another such as from a text to an image, an image to a graphic, a graphic to an animation, an animation to a video, and likewise in the opposite direction, e.g., a video to an image and/or text, and the like.

A second processing engine may also be provided such as where the processing engine is configured for evaluating the collected media components so as to produce a set of scored media elements and components. A third processing engine may additionally be included and configured for selecting a template and a scored media component, and for integrating the scored media component into the template so as to generate the advertisement. A fourth processing engine may be included for formatting the advertisement for display, such as at a graphical user interface of either or both of a stationary, e.g., desktop, laptop, and/or a mobile computing device. Likewise, a fifth processing engine may be included and configured for distributing the formatted advertisement to one or more, e.g., a plurality, of social media modalities, such as in a format capable of being viewed by a user at a third party client computing device. In certain embodiments, a sixth processing engine may be provided such as for tracking and evaluating an effect the advertisement has on the user after the user is exposed to the advertisement.

In various embodiments, the apparatus may include an advertisement builder, such as implemented by one or more further processing engines that are configured for producing a project dashboard for presentation at a graphical user interface at a display of a client computing device. In particular embodiments, the project dashboard may include or otherwise generate one or more controls for allowing a user of the client computing device to view and select the media elements, e.g., the template and media component, for generating the advertisement. The controls of the project dashboard may further be configured for allowing the user to further select one or more of a media rich content type, an objective, a budget, a target audience, and a geographical distance within which the advertisement is to be distributed. In one implementation, the advertisement builder may further be configured for, or otherwise be associated with a processing module configured for extracting the media component from a webpage and/or converting the content type from one type to another. The graphical user interface of the project dashboard, therefore, may be configured for generating a project viewer so as to allow a user to select the content to be collected, transformed, and/or used in the generating of an advertisement or other communication type. In various embodiments, a graphics conversion module may be provided for converting one component type into a media rich component type and/or for converting one form of media rich content into another form. The apparatus may also include a network internet connection to communicate with one or more other client computing devices.

Additionally, the apparatus may further include an artificial intelligence (AI) module, such as an AI module that is configured for implementing one or more scoring protocols for scoring the collected media elements, such as the media component. In various implementations, the AI module may include a machine learning engine as well as an inference engine that are configured for interacting with one or more of the processing engines, and may further be configured for autonomously selecting the template and the media component such as where the selecting is based on results of the scoring. For example, in one particular implementation, the AI module may be associated with the project dashboard, and may be configured for determining one or more of an object, a budget, a target audience, and/or a geographical distance, all of which may be configured in designing and implementing an advertising campaign. Once the advertisement is generated, it may autonomously be distributed automatically, at real time and on the fly, upon the occurrence of a triggering event.

Further, as indicated above, in various instances, the communications and/or advertisements to be generated may be particularized to the individual locations they are to be distributed, or they may be particularized or otherwise focused based on a determined campaign objective. For instance, as indicated a focus of the advertisement may be to gain reach, drive traffic, enhance engagement, and/or increase lift. The determining and/or setting of an objective may be of particular usefulness when distributing advertisements across one or more social media modalities, which may require the locking in of at least one objective per campaign. Particularly, the devices, systems, and their methods of use disclosed herein may be useful for executing multiple objectives to be employed in creating and implementing an advertisement campaign.

More particularly, they are useful for mass distributing, e.g., broadcasting, the generated advertisements across a multiplicity of social media modalities, advertisement system servers, and/or publisher servers, especially where one or more of the individual modalities typically blocks such mass deployment, or otherwise requires going in to every single ad account individually to change the ad and/or objective and/or for distributing the same. In a particular implementation, the apparatus, system, and methods presented herein may be configured for layering an advertising container and/or template that may be layered on top of a social media modality and deployed en masse.

For example, any given successful nationwide company may have upwards of tens of thousands of locations, each having a local online presence serving their immediate community via one or more social media platforms, such as FACEBOOK®, INSTAGRAM®, TWITTER®, etc. Specifically, a local franchisee of a national conglomerate may utilize their localized social media platform for the purpose of sending out an advertisement to their immediate community, but this is a relatively easy activity when it is one location generating one advertisement and implementing their one social media platform to post and/or otherwise distribute the advertisement to their community. However, when a national brand desires to send out a communication, such as an advertisement, using a plurality of social media platforms of its nation-wide facilities, it requires the monumental task of having each location publish the communication individually on every social media platform separately.

This piecemeal method of advertisement generation and deployment is both impractical and expensive for the company, their marketing employees, and/or the advertising agencies the company and/or its franchisees employ, because it requires each communication for each posting to be generated and posted on each individual platform for each individual franchisee. What is needed, therefore, is a centralized system having an interface by which a single user can generate a communication, e.g., an advertisement, template by which a communication can be generated and distributed system wide, while at the same time having content that is unique to each locality to where the communication is to be posted and across platforms. More specifically, the present platform and its systems provide a manner by which a large company having a nationwide presence can use a templated communication platform that can be used to generate a communication, such as an advertisement, that can be transmitted globally, but to a plurality of localized markets.

Particularly, as can be seen with respect to FIG. 1A, in generating an advertisement to be disbursed from a national brand, such as by a local market representative of the national brand, e.g., a franchisee, a user may make a request, at a project dashboard generated and presented at a local computing resource of the system, that an advertisement be generated, such as via an HTTP request entered at a browser interface. The request may be made in the form of entering responses to an online interview, or may be made by presenting selections to a user via one or more, e.g., a series, of drop down menus, or may be made on an intuitive basis by the system suggesting information by which the advertisement is to be generated. In various instances, the request may be made in a free form manner, such as by entering what kind of advertisement and/or advertisement type is desired to be generated.

For instance, in various embodiments, the system may solicit user input so as to determine which type or form of creative content, template and/or media rich assets are to be employed, what the objective of the advertisement is, how much is to be spent, e.g., budget per ad, the duration of the advertisement campaign, and who is the audience. For example, a template reflecting the universal look and feel of the national brand can be employed, while information pertaining to each of the localized franchisees, as well as their servicing of the localized market, can be retrieved and inserted into the communication template, e.g., at one or more defined containers of one or more layers of the template, so as to generate a variety of advertisements that all have the same look and feel, but where each is uniquely catered to the local audience to which they are to be distributed, such as by posting on one or more social media modalities unique to each market.

Once the request is made, a pre-processing step may take place, such as where the system may be configured for performing one or more data and/or parameter checks so as to validate the selected or derived campaign parameters. Such access checks may include ensuring that the selected objective(s) is supported, the selected content, content type, and/or creative template exists or may be generated, and/or the determined media assets are available for use, e.g., that there would be no conflict in its usage. For instance, where the template is to include local media assets, the information to be collected that is unique to each market may include the name, city name, address, phone number, name of the local company serving the local society, a local offer, and the like. This data may then be collected, assessed, and/or validated by the system, such as for authenticity. Additionally, one or more images pertaining to the local market may also be collected, transformed from one form to another, inserted into a container of a design layer of the template to generate the communication, which communication can then be distributed in an integrated format as part of an advertising campaign. This process can be repeated, e.g., in an automated fashion, for a number of franchisees across a nation, and thus, thousands and thousands of advertisements may be generated and distributed, each having a corporate format, but also containing particularized locally relevant information.

Particularly, once a content type, template, and/or media asset, or category thereof, has been identified, and prior to, or upon distribution of the advertisement, the advertisement components may be compiled. For instance, a content item may be collected and/or generated and/or transformed, a template may be fetched from a system associated library or other database, such as where the fetched template is an identified global and/or location specific template having dynamic value fields associated therewith. In such an instance, a variety of copies of templates per location may be used or otherwise generated, and various of the dynamic identifiers may be replaced with substituted values, such as with local values. Accordingly, in various embodiments, the collected information may be stored in a repository in a manner to be easily accessed and retrieved.

In particular instances, the collected and stored information pertain to one or more, e.g., each, of the local franchises, and their local markets, including the employees serving that market, which information can then be used to generate the unique communications of the disclosure. These universal and individualized, unique communications can be generated en masse in real-time, on the fly, and for multiple locations and across a variety of social media modalities, such as for substantially simultaneous distribution. In particular embodiments, one or more of the generated communications can be distributed in a targeted manner. In various embodiments, the system is configured for autonomously generating and distributing a media rich advertisement.

For example, with respect to advertisement generation, a user or the system itself may access one or more libraries storing content relevant to the administering of an advertisement campaign and/or with respect to building an advertisement. The advertisement to be used in a campaign can be a pre-fabricated advertisement or one that is to be generated by a user or system selection and/or in accordance with a transformation protocol. Hence, the advertisements can be prefabricated or dynamic, e.g., generated on the fly. Typically, the advertisement may include, or may be made to include dynamic text and images, where such image content can include digital photos, a carousel of images, videos, animations, GIFs, JPEGS, GIPHY's, and the like. In various instances, a database and/or library of prefabricated content may include a carousel of advertisements or content thereof of different categories and types, such as text, image, carousel, videos, and the like.

More particularly, as can be seen with respect to FIG. 1A, in addition to building the advertisement, the system may also build an advertisement campaign, e.g., via a system generated interview process, which data pertaining to the advertisement campaign may be stored in the memory. A useful element of the generated advertisement campaign is the allocation of a budget, that is an amount of spend per advertisement per location, as explained in greater detail herein below. Consequently, in generating the advertisement, the system may additionally build one or more content types and/or ad sets, whereby the system may calculate the per ad spend in accordance with the generated advertisement and as campaign. The generated per-location template copies can then be attached to the ad sets. Additionally, copies of optional assets, e.g., media rich assets, such as videos, forms, csv lists, and the like that can be distributed can also be created, and stored in a system library and/or database.

Storage of the collected and/or generated data, including advertisements and their components, may be performed in an enriched, structured manner. For instance, advertisement components, as well as the advertisements themselves, may be flagged and/or embedded with data, e.g., metadata, so as to be stored within one or more structured categories, such as where the database is a structured database. For example, a unique identification may be generated for the advertisement and/or its components and used for cataloging the advertisement for storage.

In various instances, the advertisement data may be stored in accordance with data pertaining to a generated advertisement campaign or promotion, and/or may be based on location data, and the like. In various instances, all created campaign and advertisement data may be transferred to the database for storage thereby via bulk insertion. Particularly, in various instances, the per location template copies and ad creatives may also be stored using bulk insertion. Additionally, the links between the created ad sets, ad creative, and components thereof may also likewise be stored. Various meta-data may be written, associated with the media components, and used for storing and recalling each data component.

As indicated above, in generating the advertisement, such production may be performed by inserting information and/or other data of a selected and/or generated type into a template, e.g., a defined container thereof, which data may set forth various of the particulars of the advertisement campaign and/or the advertisement to be generated. For instance, in initiating of the building of the advertisement, the system may generate a series of prompts or queries to be presented to the user at a generated dashboard interface, which prompts are designed to elicit from the user the appropriate information for determining the content for insertion into the advertisement template so as to build the template and/or generate the advertisement. For example, the prompts can elicit texts to be entered, with regard to the messaging of the advertisement, the media rich content type to be employed, and likewise such queries may be used to define one or more targeted audiences.

Likewise, the prompts may present one or more images, such as presented at the graphical user interface, for selection by a user of the system. Particularly, the system may present a prompt directed to the name of an organization for which the advertisement is to be generated, and the system may then prompt the further entry of locations, people, and/or services to be provided, which data may then be populated as one or more data fields in the template. In various embodiments, once one or more of these data fields have been populated, the system may perform a search, such as of one or more databases of the system, or an online search, so as to be able to auto-populate the other data fields. Further, one or more additional features, such as for configuring the advertisement and its delivery may also be selected. These features may include audience characteristics, e.g., creating an audience to be targeted, such as the number of recipients, the characteristics and/or demographics of the recipients, as well as the geographical region within which the recipients are located.

Accordingly, in creating an advertisement campaign, a first step may include the generating of an advertisement. In such an instance, a template may be generated, where the template may include targeting specifications so as to define an audience to be targeted, and/or inform the type or class of media components to be employed. Particularly, criteria for audience selection include: interest, behaviors, demographics, language spoken, locations, and the like. Hence, a localization feature may be included so as to allow a user to choose various audience demographic and/or geographical options within which a generated advertisement may be targeted. Specifically, a target audience may be one with a physical location within a particular defined area or region, or the targeted audience may be one that has social or other connections of interest and/or that are within a geographic area to be targeted.

Consequently, in various instances, one or more target audiences may be defined by demographics and/or one or more geographical regions, and likewise one or more persons, such as within the geographical region can be identified, and all of their social contacts within that geographical region may also be identified, collected, and then may be targeted themselves, such as via an access and/or search of their online contacts. Further, the social network of the social contacts within the region may also be targeted. In a manner such as this, a user can create demographic targeting that will apply to a variety of locations, but may also target a number of social networks of people within the geographical locations, such as via one or more user's social media interface.

For instance, the audience for receipt of the advertisement may be selected based on the geographical region within which they live, based on selection from a map, based on their presence on a predefined list, such as with respect to a defined radius, based on their demographics or other characteristics, and the like. Particularly, the recipients of the advertisement may be determined automatically by the system, such as based on the online usage data of the prospective recipients and its correspondence with one or more characteristics of the advertisement elements.

Once an audience has been defined, then the platform may be used to generate the advertisement creatives for fashioning an advertisement that may be created in a manner so as to be of particular interest to the audience being targeted. For instance, the platform may provide a variety of tools for generating advertisement creatives so as to produce templated advertisements capable of transmitting media rich files, including dynamic texts, dynamic images, videos, animations, graphics, links, calls to action, patterns, and the like. In various embodiments, the creatives can also be particularized to location such that available content can be catered to pull and provide content that pertains to the location and the people within that location to be targeted.

Particularly, the template may include dynamic creative fields, such as dynamic text and image fields that can pull data from a variety of resources, e.g., databases, webpages, other online content, and the like, within the defined geographical region, which content can be pulled, evaluated by the system, stored, e.g., within a structured database, and provided to a user of the system for presentation at one or more data fields within the template. Hence, in a manner such as this, a creative template may be provided having dynamic fields whereby content can be replaced one with another depending on the defined location such as to include location relevant content.

Thus, a variety of advertisements that all have a similar look and feel, may be generated, where each individual advertisement has been particularized to each targeted demographic and/or location, such as with respect to dynamic creative, including dynamic text and images. Consequently, instead of generating a single advertisement having a single set of creatives, a multiplicity of advertisements can be created with a variety of different creatives, whereby a single, or multiple, containers can be loaded with different texts, images, and the like. In this manner, a plurality of different advertisements each having localized creatives, text, images, videos, and the like, may be produced and distributed. This may be performed with respect to single text or image files or a carousel of texts and image files, which may be engrafted into one or more containers of one or more design layers of the template.

In another instance, advertisements may be generated autonomously by the system, in which instance, the parameters for dynamic auto-population may also be set at the user dashboard, such as with respect to the content to be employed and from which libraries and/or databases various of the design elements are to be selected. Such selectable data may include data pertaining to the subject of the advertisements and may include biographies and data describing the local representatives, their contact information, images, logos, texts, offers, e.g., coupons, and the like. Particularly, the name and logo of the organization, the location and location of subsidiaries, the name, photos, and biographies of the relevant employees, as well as relevant advertisement and/or offer information may be entered as a data field or may be collected and auto-populated into an advertisement generated by the system.

More particularly, as indicated, in various embodiments, once these parameters have been set, the system itself can then select one or more particular data elements, may select one or more media asset types, and the product thereof may be configured for insertion into the template, such as from a collection of pre-approved and/or selectable text, image, video files, and the like, so as to generate a media rich advertisement. Other data elements may also be added, including a logo, a website URL, a biography, interactive map component, and the like. The system may also include one or more controls for configuring various characteristics of the data fields, such as with respect to size, color, font, and the like. Additionally, one or more objectives, as described herein can be selected. Accordingly, once all of the design parameters, advertisement elements, and control features have been selected, the system may then auto-populate various design layers of the template, such as with respect to generating an advertisement.

In this manner, the system may be configured for manual and/or automatically functionalizing, generating, and broadcasting a number of different advertisements, where each advertisement is unique to each local market, and each employee servicing that local market, such as with respect to their images, biographies, the services they provide, the localities they service, and the like. Particularly, the system may generate and/or store one or more profiles for each person in an identified market and/or in a determined location of the organization for which the advertisements are to be produced. This data may be entered into the system by a system operator, or by retrieval and auto generation by the system itself, but in either instance, once a profile for one or more data elements has been entered and stored in a database of the system, the system may then pull data from that profile for entry into one or more templates for the auto-generation of a unique ad creative, which ad creative may include different data sets that are particularized to each market and each service provider within each market across a variety of geographical regions and localities within the geographical regions.

Hence, in manners such as these, users can create local ad creative libraries that contain various of the different media elements, entered, collected, transformed, and/or generated content, which can then be used by the system to generate an advertisement. For instance, one or more categorized and searchable libraries may be set up, such as where one library includes the profiles for the various employees of a company using the system to generate an advertisement, which profiles can include a photo, a video, and information about the local office, the employees thereof, their proffered business solutions and services and/or goods they offer, and available print copy that can be used in generating an advertisement. Further libraries can include images and print copy related to corporate headquarters, advertisement campaigns to be or being run, campaign objectives, collected and/or scored content, and the like.

Figure 1B:
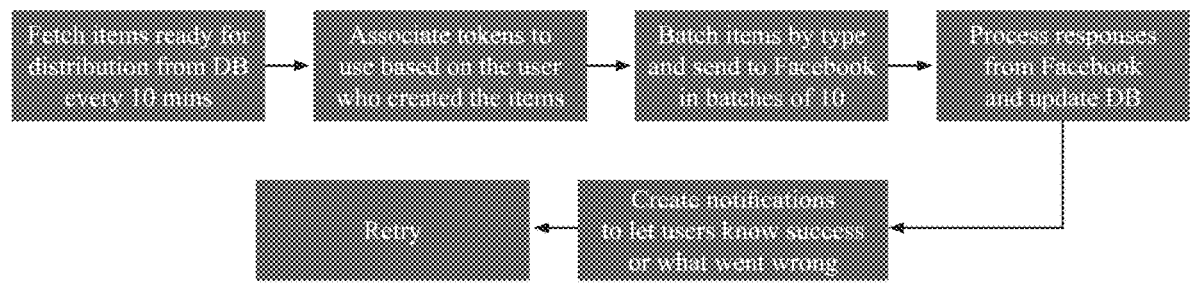
FIG. 1B is a process diagram illustrating an exemplary distribution methodology in accordance with the teachings of the disclosure.

For example, as can be seen with respect to FIG. 1B, after generation, tagging, categorizing, and/or storing, and upon the appropriate triggers, the advertisement may be broadcast or otherwise distributed. Particularly, once created, the advertisement can be distributed across a variety of platforms, such as one or more social media platforms. For instance, once an advertisement has been created, it may be stored in a database of the system, which advertisement may then be tagged and/or embedded for storage, such as in a hierarchical structure so as to be easily identified by the system and provided for selection by a user when distribution is desired.

Specifically, the advertisement may be embedded or otherwise include metadata that identifies the created advertisement into one or more classes. A user of the system, for example, may engage a graphical user interface whereby the user may be presented with a number of questions, such as provided in an interview, such as an interview designed to elicit from the user the type of advertising campaign sought to be deployed, and as a result of this interview, one or more advertisements may be generated and/or otherwise be presented to the user for selection for use in implementing the advertisement campaign. One or more conditions or other criteria with respect to configuring the advertisement may also be selected, such as whether to use an advertisement with generalized creatives, e.g., centralized texts or images, or to use an advertisement with particularized creatives, e.g., decentralized texts or images, which can be generated before or immediately upon distribution or may be pre-fabricated.

In such instances, the graphical user interface, may be configured to perform an interview process that allows a user to configure the system based on various parameters, such as with respect to generating and/or distributing a generated advertisement with a centralized and/or decentralized focus, which user interface may be accessed at an individual or group account level. Hence, in engaging the system from a social media or other platform of the system, a user can access the system via a single account, so as to reach all designated locations from the single account, e.g., at a centralized account interface and/or location, or the user may access the system from a number of localized accounts, e.g., a de-centralized account interface and/or decentralized locations.

For instance, it is difficult for large corporations having thousands of branches and/or franchisee locations, to engage in an advertising campaign in an effective manner and at a reasonable cost, such as spending $100-$500 per location per month so as to achieve a determined campaign objective, such as an increase in sales. However, spending such an amount without a defined methodology for determining successfulness and/or without regard to the composition of who is a likely consumer, will simply lead to a waste of resources. The present technology is configured for solving such problems, and for focusing the generated advertisements in a manner so as to maximize the company's return on investment. The methodologies and processes disclosed herein are configured for overcoming these challenges.

One such methodology involves recognizing the localization of purchasing decisions, and therefore focuses advertising to a limited audience, e.g., within a defined demographic and/or a limited geographical region. Yet, it would not be practical to access each local social media account for the deployment of an advertisement that focuses on each local market. Hence, the present system and methods provide for a centralized interface by which to generate advertisements, but then access a plurality of decentralized social media accounts that may be used to distribute national brand advertisements at the local level, such as within a given mileage range of each local branch or franchise. Consequently, the present devices, systems, and methods may be configured to allow a brand or its agency to perform a wide variety of functions, such as to create one or more brand approved ad creatives, upload dynamic brand media components, such as media rich texts, images, video files, and the like, such as where the media assets may have a global brand appeal, but may also pull from localized images hosted in the platform to automatically create individual ads for each location.

For example, dynamic asset functionality may be employed to localize the text and/or image part of an advertisement to include local city names, descriptions, images, and local website links. Additionally, in various instances, the targeting may be pre-set, such as when it is desired that an advertisement from a national brand be targeted to all locations, or where it is desired that a select set of distributed franchisees or independent locations be targeted, such as based, on or at least similar to the social media platform's endogenous targeting. Likewise, targeting may be pre-set around or within a selected geographical location, such as within a selected radius of a determined location. For instance, the system may be configured so that a user can set the radius around each location where ads will be distributed.

Further, the amount to spend per ad, e.g., the campaign budget, may also be pre-set, such as per individual location, a set of individual locations, or an amount to spend across all locations. In a manner such as this the system may be configured, autonomously or by a system user, to deploy 1 or 1,000 or up to 15,000 or more advertisements, instantly, in a targeted fashion, without any hassle, such as by the push of a button. Further still, in various embodiments, the system may include a tracking module configured for tracking and/or comparing the performance of the campaigns at the individual location or group level. The system may also be configured to track the effectiveness of the advertisements, such as with respect to the advertisement's ability to become an impression, e.g., influence a consumer's desire to view the advertisement, and/or to become a conversion, e.g., influence the consumer to make a purchase of the advertised goods or services Accordingly, with respect to FIG. 1B, items that are ready for distribution may periodically be fetched from the structured database according to a defined category by the system and distributed, such as in a timed manner so as to ensure the greatest possibility of being received, viewed, and engaged with, such as at high traffic times. In some instances, tokens may be associated with the advertisement and/or one or more components thereof, such as based on relevant data entered by the creator of the advertisement and/or ad campaign. In particularly instances, batched items may be distributed by time, type and/or transmitted to the social media platform of desire for transmission, such as in batches of 2, 5, 10, 15, 20, 25, 50, or more, such as in a manner to avoid various filters, such as spam filters.

The system may then receive response data back from the social media platform, such as where the response data pertains to the effectiveness of the advertisement to achieve a defined objective, such as reach, looks or views, clicks, impressions, engagements, transactions, conversions, shares, up votes, and the like. In such an instance, the response data may be collected from all those who receive the messaging, such as those within or outside of the sender's defined social network. In reaction to this response data, the database and tagging modality can be updated with respect to future use. One or more notifications may then be generated so as to notify the system user, e.g., administrator, how the advertisement and/or campaign may be running. Where the engagement is as expected, system weighting may be arranged to reflect the successfulness, and if the results are not at a level expected, the advertisement may be modified and/or re-sent one or more times, e.g., 3, 5, 10 or more times, if desired or if the system determines it is beneficial to extend the campaign.

Figure 1C:
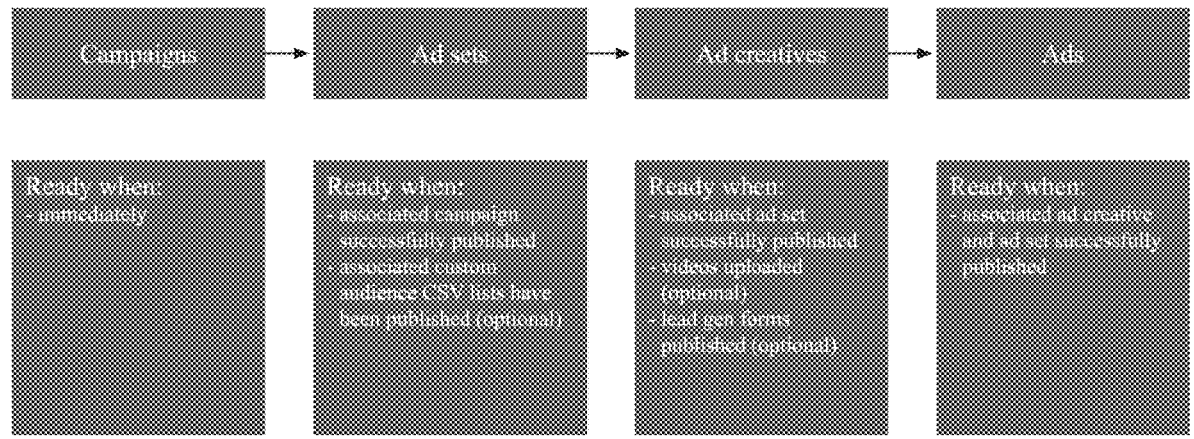
FIG. 1C is a process diagram illustrating an exemplary order of distribution.

As can be seen with respect to FIG. 1C, distribution may be performed in an ordered manner. For instance, distribution may be by campaign, by ad sets, by ad creative, or by advertisements themselves. For example, the distribution may be on a first in first out basis, being delivered immediately upon generation, or may be queued and distributed in order. In other instances, the system or a user can rank the order of distribution. In some instances, the advertisement may be distributed when the advertisement, ad creative, and/or ad sets are ready. Particularly, readiness may be associated with the campaign and based on the success of publishing, or may be associated with the readiness of a custom audience, e.g., determined by CSV lists that have been published, or may be ready when an associated ad set is successfully published, such as when media rich content, e.g., graphics and videos, have been successfully generated and/or uploaded.

In certain instances, distribution may be based on when one or more of ad sets and ad creative, or the ads themselves, have been successfully published. For instance, a successful publishing may be determined by the generated and/or published content achieving a determined goal or objective, such as based on its achieved score, as described in detail herein below. Such scores may measure one or more engagements with the published content, such as looks or views, comments, shares, likes, clicks, impressions, conversions, transactions, lead generations, and the like. In such instances, if an advertisement reaches a goal, e.g., the achievement of a specified number of leads, the campaign can be stopped or can be extended, and likewise, if a goal is not met the advertisement distribution may be made again, such as one or two, or three or four or more times, in an effort so as to achieve the designated goal.

Figure 1D:
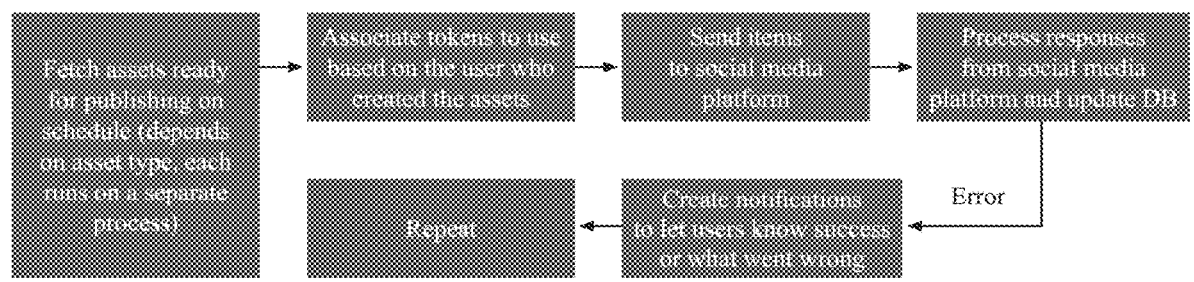
FIG. 1D is a process diagram illustrating an exemplary readiness determination process to be implemented prior to distribution.

Furthermore, as can be seen with respect to FIG. 1D, prior or upon distribution the system may perform a readiness determination. For instance, assets may be checked based on the asset class, type, genre, based on the components, and the like. Particularly, the system may determine that the assets have been loaded into the templates and the advertisement is ready to be distributed, such as in accordance with a determined schedule and/or token, e.g., a token associated based on the creator of the assets. Once approved, the assets can be pooled and the advertisement may be generated and can be transmitted to the selected social media platform for distribution thereby, such as altogether or in batches.

As per above, once distributed, one or more metrics may be collected by the system so as to evaluate the effectiveness of the advertisement, such as to measure the benefits per ad spend. One or more notifications can also be generated with respect thereto, for example, where the system has determined an add is working or not, the system may perform an analysis to determine why, and may make suggestions with respect thereto, such as to increase the ad campaign when messaging is working, or to change an advertisement asset when an ad campaign is not working. As indicated, the re-publishing of an advertisement may take place a system or user determined number of times.

Figure 1E:
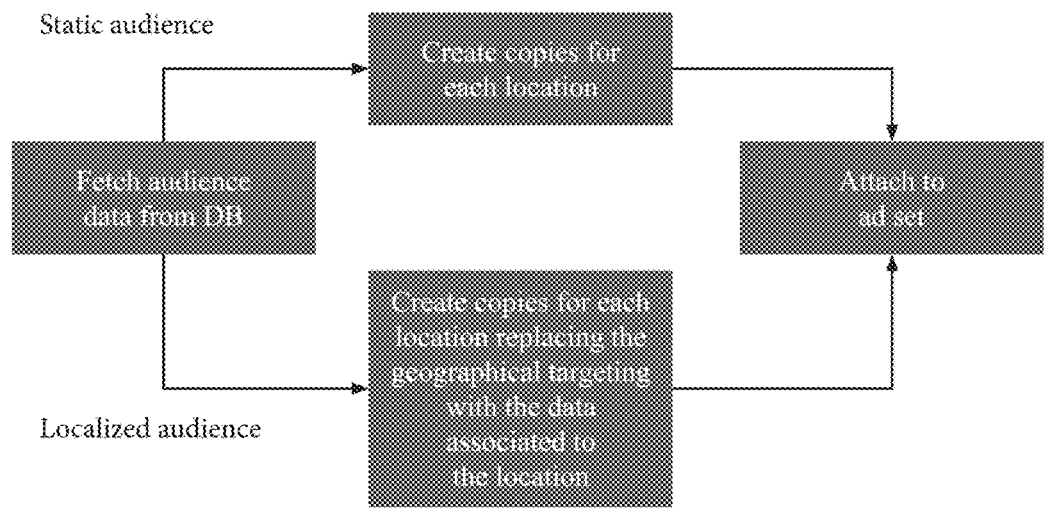
FIG. 1E is a process diagram illustrating an exemplary distribution process based on audience location.

Additionally, as indicated above and with respect to FIG. 1E, distribution may be based on each particular location, such as based on priority, based on an estimated return on investment, e.g., location per location, or based on any number of different parameters. In various instances, the ad set can be attached, copies can be created per each independent location, such as by replacing dynamic texts and images with local images, and/or targeting with data particular to each location. In this manner the advertisements can be particularized to location and geographically targeted, or can be targeted based on any number of particulars, such as demographics, age, ethnicity, recipient characteristics, browsing or engagement history, and the like. Accordingly, the advertisement may be directed to a defined audience, and fetched for distribution based on determined target objective, such as within a defined location, and the distributed advertisement may be tracked, such as to determine campaign efficiency and/or cost-benefit parameters. In particular instances, the audience may be the same audience within a defined field, generally, and/or may be geographically determined, such as a localized audience.

In various embodiments, any of the stored data and/or generated content, including ad creatives, can be accessed and/or shared across locations and even across brands and/or ad agencies, and this may be performed at the account, group, local, and/or national level. For example, when creating a library, a user or the system itself may collect, input, categorize, evaluate, and score the content, which content can be flagged according to category, which makes accessing and searching the data by a user or the system itself more easy, such as by name, content type, category, and/or by one or more of the pins. Particularly, users can search for libraries by name and filter searches by library category, such as where pinned creatives will display first. Users can also choose to whom to share the library and also assign roles or access levels such as for approvers, owners, editors, viewers, and the like.

Such sharing enables corporate and local users to easily distribute consistent, on-brand creative to managers on the group, location, or other level. In particular embodiments, a user of the system may create their own libraries so as to more easily store, search, and manage their libraries, also in some instances, a library may be generated autonomously and/or be dedicated to materials to be shared, which may also be created. Other user designated libraries can also be created. This enables users to easily created, search, find and review creatives shared by the brand or their agency. In various embodiments, each of these ad creatives may be generated by a common template, but may be unique as to particulars of the texts, images, regions, locations, and/or other profile data that is employed in populating the various data fields of the template.

Figure 2A:
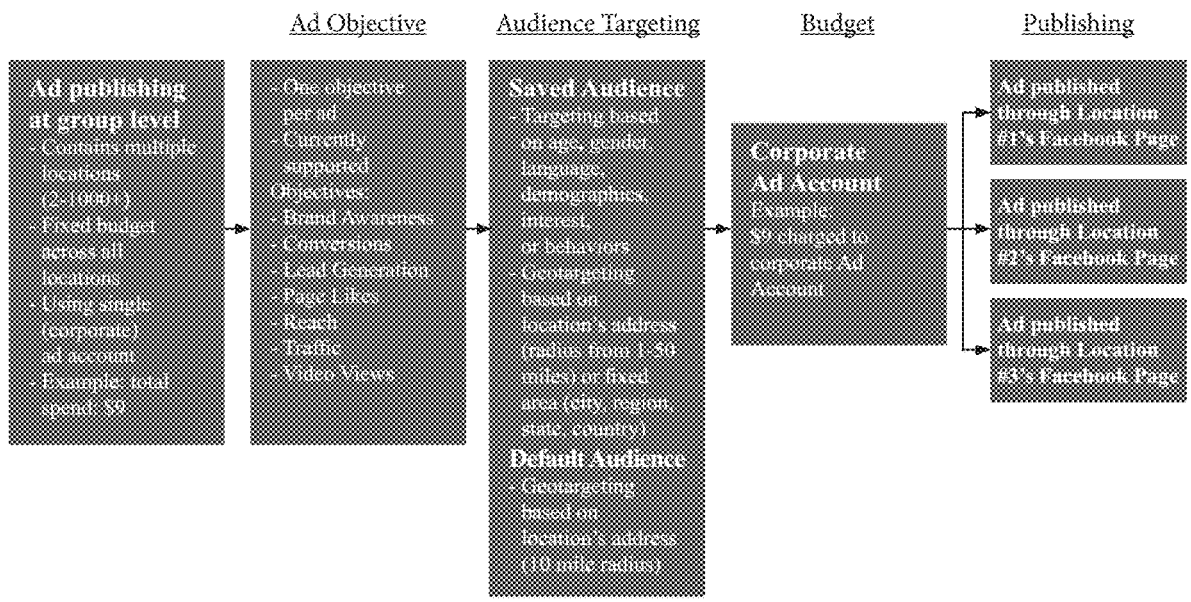
FIG. 2A is a process diagram illustrating an exemplary centralized ad account model.

Particularly, as can be seen with respect to FIG. 2A, a centralized account based advertisement generation system may be implemented. For instance, once the account(s) is accessed, in a first step, an advertisement objective may be determined. Particularly, the system may be configured for generating and distributing, e.g., publishing, an advertisement via a social media platform at the group level, which group level may include any amount of multiple locations, such as from 2 to multiple thousands of locations. A budget may be determined, a number of accounts or locations may be selected, and a price per location or account set, such as where the budget is a set amount per location, or a variable amount based on best performing location, and the like. The one or more campaign objectives may be selected from a list of pre-set objectives or may be entered by a user of the system. Such objectives may be configured in accordance with a number of parameters.

For example, one or more objectives can be selected per advertisement, and may present a list of types of objectives including: brand awareness, impressions, conversions, lead generation, page or content likes, reach, traffic, views, e.g., video views, and the like. For instance, the main objective of the campaign and/or the budget and/or the time frame, e.g., duration, for the campaign can be determined. Other, e.g., secondary or tertiary, etc., campaign objectives may also be determined, such as the number of instances, impressions, and/or conversions may be set.

Likewise, as discussed above, one or more audiences for targeting may be selected. An exemplary audience may be any number of different types of audiences, which may be selected and saved as an available audience type. Audiences can be defined and targeted based on a variety of characteristics of the target audience, including age, gender, language, demographics, interest, behaviors, actions, and the like. Further, as discussed above, the audience can be determined based on location, e.g. geolocation, such as by geotargeting, such as within a given location or a radius surrounding the location, e.g., within 1 or 5 or 10 or 15 or 20 or 25 or 50 or 100 miles or more, or by a fixed location, such as within a city, a county, a state a region, a country, and the like.

Particularly, one or more location preferences may be determined, by user selection or dynamic location determination, and a target audience may be defined in that manner. For instance, an audience may be defined by selecting a number of parameters that help the user, or the system itself, select a target audience to whom the generated advertisement is to be distributed. More particularly, as indicated, a number of predefined audiences may be set and provided for selection by a user so as to present a list of audiences that a user can select from. However, in other embodiments, a series of interrogatories may be presented to the user, and from the users answers the audience may be defined and configured by the system. In certain instances, the system may use historic audience data and success ratings to determine a likely audience for an given ad campaign. Once a geographical region has been defined, one or more accounts selected, and one or more target audiences demarcated a budget per ad spend may be determined.

A budget may be determined in any of a number of different manners, and may be supplied at the individual or corporate account level. Specifically, an advertisement account may be set up using an interface, such as a GUI provided at the social media platform or the advertisement system platform itself. A funding source may be set up. The campaign parameters and objectives may be defined. One or more ad sets, such as for controlling advertisement generation and/or distribution targeting, may also be determined. The budget, duration, and other campaign parameters can also be decided. Likewise, the parameters for building or selecting a prefabricated advertisement may also be demarcated. For example, an advertisement may be generated from individual creatives, such as by a user selecting individual template and media assets.

Alternatively, a prefabricated advertisement may be used as a template, whereby various of the dynamic data fields may be extracted, functionalized, and/or particularized as discussed herein, such that the advertisement as a whole has a common, centralized theme, but at the same time, various of the dynamic data fields may be populated, functionalized, and integrated, e.g., compiled, with particularized and localized creatives so as to include dynamic text or images from a local market, thereby, giving each advertisement targeted to a local market a significant local relevance. In this manner, from a single, centralized parental advertisement, a progeny of decentralized advertisements may be generated and distributed.

Likewise, once generated, the unique advertisements may be distributed differently with one another with respect to geographical regions, timing, scheduling, activating events, campaign spend, e.g., budget, and the like. For instance, in formulating an advertisement campaign, a budget to be spent on the entire, or a portion, of the campaign can be set, and in response thereto, the system can perform one or more analytics on the system wide data, and can determine how best to allocate advertisement spend by determining in which location and to which recipients advertisements should be generated and distributed so as to generate the greatest impact, e.g., with respect to accomplishing one or more of the determined objectives of the campaign, while incurring the least expense, which may all be determined by the system dynamically. For example, a given amount of money may be allocated to a campaign, such as $5,000.00, which may be apportioned evenly amongst all locations and all employees, or it may be apportioned dynamically, based on an assessment, e.g., by the system, of the costs and benefits, of generating and delivering an advertisement with respect to a given geographical region.

Figure 2B:
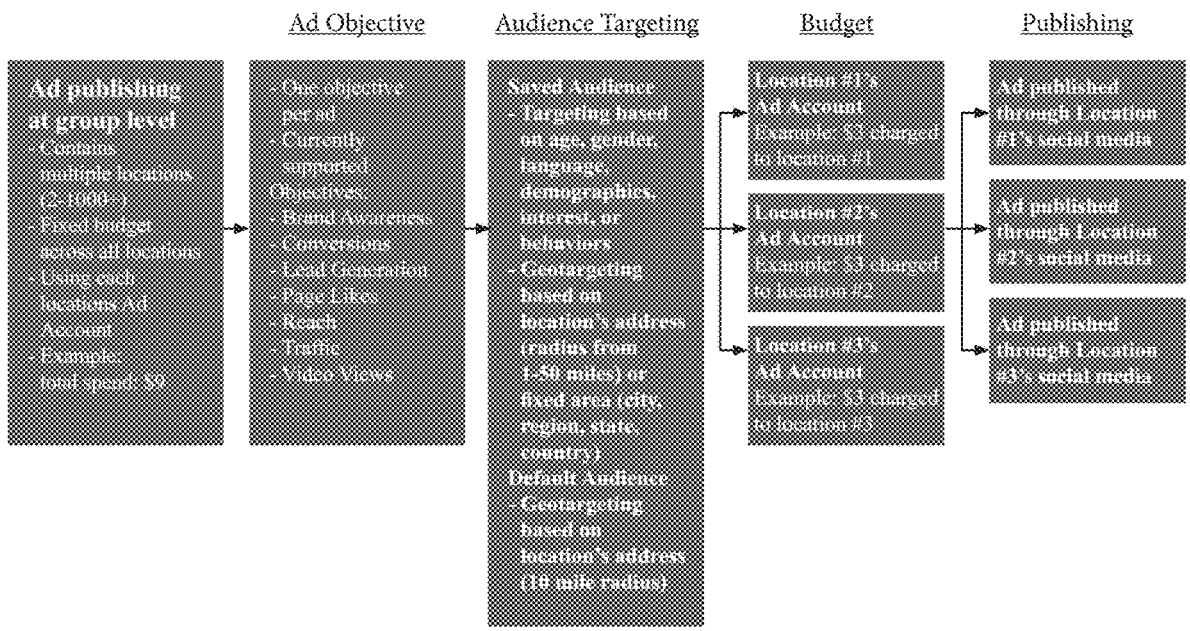
FIG. 2B is a process diagram illustrating an exemplary de-centralized ad account model.

Particularly, as can be seen with respect to FIG. 2B, a de-centralized account based advertisement generation system may also be implemented. For instance, in various embodiments, the system may be configured in a distributed, de-centralized architecture, such as where the advertisements to be generated may be done so in a manner that incorporates the messaging and images of a local branch of a national brand, or a small enterprise serving a particular community, and once generated can be distributed locally, such as via the social media platforms of the local branch.

Specifically, the system may be configured to generate and deploy advertisements on the local level, such as employing a local social media platform. Hence, although the generation and distribution of advertisements can be controlled at a centralized interface, e.g., at the group level, in various other embodiments, the generation and distribution of advertisements may be controlled on the local account level, even where the local account level includes a multiplicity of local locations, sometimes on the order of thousands of locations. In such an instance, a budget may be set per location, e.g., evenly, and the advertisements may be generated and distributed using each individual location's social media interface or ad account. So being, each location can set its own budget and/or may set its own objectives, such as with respect to increasing brand awareness, impressions, conversions, lead generation, consumer responsiveness, e.g., page likes, reach, traffic, views, and the like, in a manner similar to the above.

Additionally, as above, when functioning in a de-centralized architecture, one or more specific, e.g., localized, audiences may be targeted, such as based on a determined demographic, location, and the like, such as with respect to the age, gender, language, demographics, interest, behaviors, geographic region, and the like. Further, as indicated, the budget may be determined based on each individual location or equally across locations. Further still, once generated the advertisements may be distributed through the account at the national brand, e.g., group level, or may be distributed via each locations local account, as set forth with respect to FIG. 2B.

For example, in one exemplary embodiment, in many instances, a given national brand may have a centralized location, like a hub, which hub is served by a multiplicity of local, distributed locations. In certain instances, the central location may configure the system so as to allow each local representative, e.g., franchisee, to log into the system, via its own social media login or the central corporate account and to configure and deploy its own advertisements for use in the company's advertisement campaign. In such an instance, the user can configure the conditions of the advertisement campaign, or the system can walk the user through a set up regime.

For instance, the system user may be authorized to enter the system portal, select the advertisements and/or ad creatives, the budget, the targets, the geographical radius, and then deploy the ads. Particularly, the system may provide automated tools for guiding the generating, transforming, and/or selection of creatives, to suggest appropriate creatives for use, and/or for automatically selecting creatives, like locally focused text and images, dynamically. These text and images may be searched, selected, transformed and/or stored, and pulled by the system itself, autonomously, which then may be used to generate the advertisement in a manner that it has a local look and feel.

In certain instances, the system itself can configure the advertisement campaign based on system derived parameters, such as the campaign objectives and goals, generating the creatives, selecting the targeting, determining the geographical radius, and the like, all of which can be performed either manually by a system user, or autonomously by the systems intuitive intelligence module. A suggested budget may also be set, or the user can set forth the spend per ad themselves. In various instances, the central facility may set the approvals and require that all advertisements be approved before deployment, or they may set the parameters that the system verifies before deployment. The system may also track the amount that was spent and track the effectiveness of the advertisements deployed so as to determine an accurate return of investment, such as at the individual location level.

Additionally, as can be seen with respect to FIG. 2B, a decentralized account based advertisement generation system may be implemented. In such a decentralized ad account model, advertisements may be generated at the group or local level or even location level or all of the same, such as where from one, two to thousands of locations may be targeted, utilizing a fixed or dynamic budget that may be the same or may vary across locations. In various embodiments, the advertisements may be distributed using a variety of decentralized accounts servicing a wide variety of the local location's advertising accounts. During this process, one or more objectives per advertisement may be selected or otherwise determined. In such an instance, a variety of ad campaign objectives may include enhancing brand awareness, increasing impressions and/or conversions, page views, page likes, reach, traffic, text. Image, and/or video views, lead generation, and the like.

A target audience may also be defined. The target audience may be generated from one or more lists, derived from one or more online searches, or may be selected from amongst a number of pre-identified audiences saved in a database. The audience may be defined by one or more shared or non-shared attributes amongst its members, such as with respect to age, gender, language, demographics, interest, and/or behaviors. Likewise, an audience can be selected via geotargeting, such as based on a specified location, for instance, within a given radius, e.g., from about 1 to 50 or 100 miles or more, from a specified address, or within a defined region, such as within a city, county, state, region, country, and the like. Further, a budget can be determined, such as on a global or location by location basis, such as where the spend between locations is divided either evenly or disproportionally, as exemplified in FIG. 2B. Additionally, distribution may be performed in a centralized or decentralized manner.

For example, as set forth in FIGS. 2A and 2B, distribution may be performed in a centralized or de-centralized manner, such as by being published through the social media interface of each individual location, such as through each location's FACEBOOK®, INSTAGRAM®, TWITTER® pages, etc. Furthermore, as explained above, such distribution and/or broadcasting can be configured and/or performed along various pre-set or selected parameters, such as with respect to determined campaign objectives, audience targeting, and/or in accordance with a pre-defined budget and/or spend allocation.

Figure 2C:
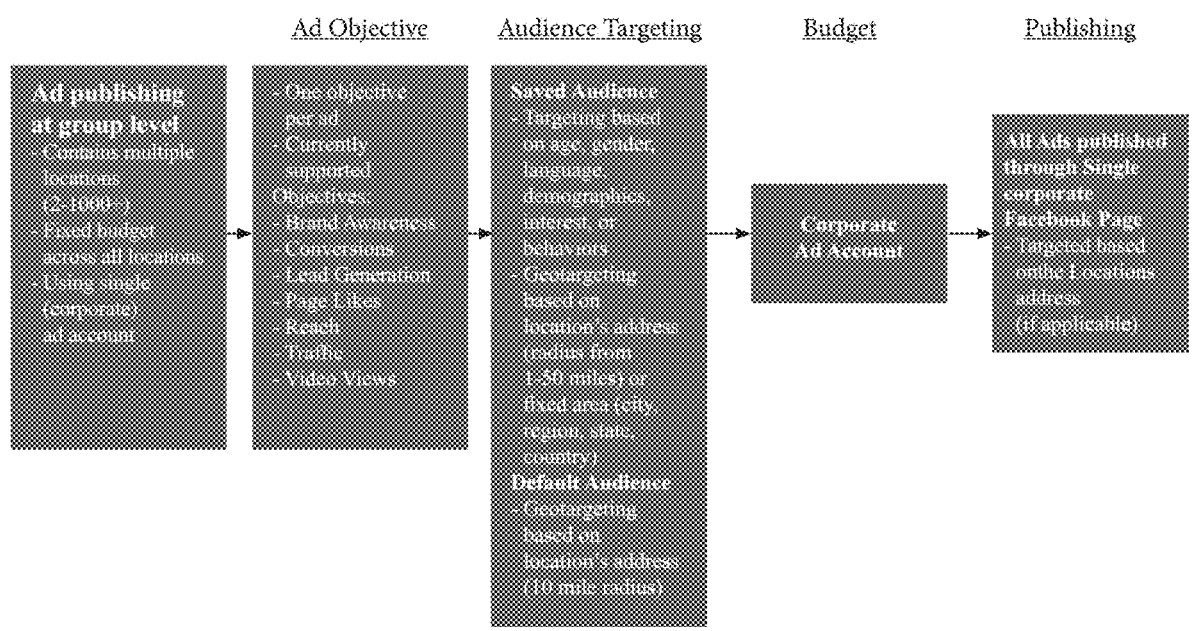
FIG. 2C is a process diagram illustrating an exemplary publishing methodology.

Accordingly, in view of the above, as can be seen with respect to FIG. 2C, distribution and/or publishing of the generated advertisement may be performed in a number of different manners, such as via broadcasting, e.g., via distribution from a centralized location, e.g., employing the global corporate account, or even publishing in a decentralized manner, such as from one or more localized account locations. Hence, once the parameters for creating the advertisement have been determined, then the targeted broadcasting of the advertisement may be implemented. For instance, upon distribution, one or more containers of one or more layers of the advertisement may call and be populated by the defined creatives so as to generate the advertisement.

Particularly, once created, the advertisement may be published or otherwise transmitted to one or more social media platforms, such as FACEBOOK®, INSTAGRAM®, TWITTER®, and the like, for distribution thereby, for example, by a single or multiple corporate or local account. In one exemplary embodiment, ad publishing may be performed at the group, e.g., corporate, level, such as from two to thousands of locations, and in other embodiments, a single corporate and/or local account can be employed for the purpose of distributing the advertisement. Publishing may be performed in accordance with various different parameters, such as based on a determined budget allocation, and based on one or more selected objectives.

For instance, as explained herein below, budgeting can be determined based on a fixed budget evenly split across distribution locations, or a floating budget based on a performed or perceived cost benefit analysis, such as where more budget is allocated to those locations that are best suited for generating a greater return on investment. As indicated above, distribution can be performed in accordance with one or more objectives, such as: Brand awareness, impressions, conversions, likes, reach, traffic, views, lead generation, and the like. One or more audiences may also be set up for targeting, which targeting may be based on one or more of: age, gender, language, demographics, interests, and/or behaviors.

Broadcasting and/or distribution may be based on location, such as for geo-targeting, such as to a specific geographical region, e.g., a town, municipality, city, county, state, region, country and the like, such as within a certain determined radius of one or more those locations. As indicated, the generated advertisements may be published through one or more centrally located corporate accounts, or one or more individual, local accounts.

Particularly, one or more analytics may be run on each region, on each proposed recipient, and with respect to each employee so as to determine the greatest opportunities to convert the advertisements into sales; and further, once the advertisements have been deployed, the results provoked by the advertisement can be collected by the system and used in one or more of the analytic processes. For instance, the system may be configured for determining one or more factors related to attribution. Specifically, as described herein, once the advertisements are deployed, the system can be configured for determining what sales can actually be attributed to a consumer having seen the transmitted advertisement. Such attribution may be determined in a variety of manners, for instance, the system may be configured for determining the incremental lift attributed to advertising.

More particularly, in various embodiments, the system may be configured for receiving data pertaining to who was served an advertisement, and further, of those served an advertisement, who actually were converted by the advertisement, and made a purchase, or performed some other act, such as in response to having been served the advertisement. More specifically, in a particular embodiment, the system server may include one or more APIs from which to receive content and data from other system servers, e.g., social media servers, such as with respect to the deployment of advertisements, e.g., on their platforms, and may also include APIs for receiving content and/or data, such as from sellers of products or services, which are the subjects of the advertisement, where the received data pertains to the consumers who performed an act in response to having been exposed to the advertisement, e.g., a conversion, such as by making a purchase. Likewise, such data may be transmitted to the system server from a partnered social media customer relations management (CRM) system or other such interface for transmitting advertisement and conversion data and analytics.

Figure 3:
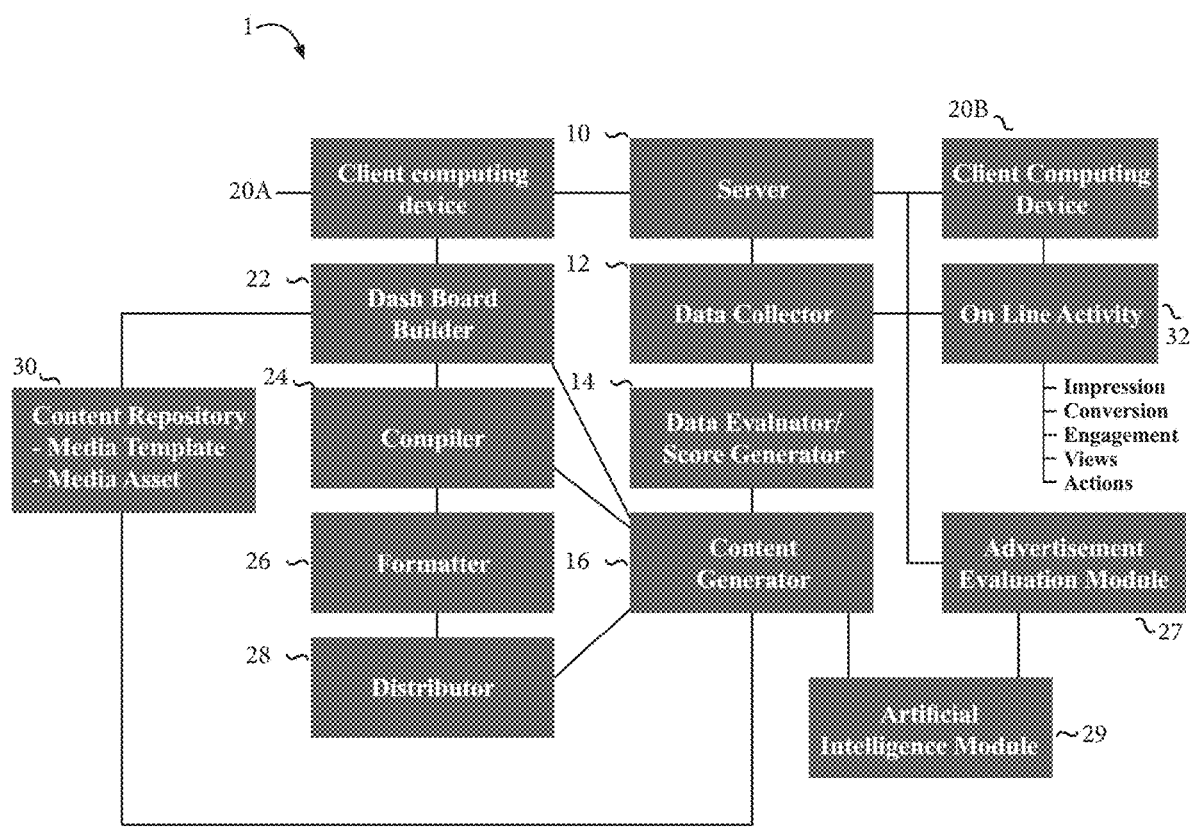
FIG. 3 is a diagram illustrating a first iteration of a system for generating an online communication.

In view of the above, as can be seen with respect to FIG. 3, in one aspect, presented herein is a system for executing an advertisement generation pipeline for generating an advertisement, such as from one or more collected and/or scored media elements. For instance, the system may include a memory, such as a content repository 30, that is configured for storing a plurality of media elements, such as where the media elements include a media template and/or a media component, such as a text component and/or an image element, such as one or more images, or a carousel element, a video element, and the like.

Additionally, the system 1 may include a central or graphics processing unit or server 10 having a memory interface to access the memory 30 and, which may include a set of processing engines, where each processing engine may be configured to perform at least one step in an advertisement generation pipeline, such as on the collected media elements. In such an instance, the computing system 10 may include a set of processing engines that include a data collection module 12, for collecting media elements such as media components, and/or may include a media component evaluation module 14 that is configured for evaluating the collected media components, such as where the plurality of media components include one or more of text elements and image elements. In various instances, therefore, the data collection module 12 may include one or more collection processing engines 16 that are configured for collecting data from one or more web pages of a website. In certain instances, a graphics processing engine may be provided whereby one or more media content components may be generated, such as from a collection of retrieved content, and/or may be converted from one media type to a media rich content types, such as for converting texts to images, animations, graphics, videos, and vice versa.

Such data collection may be performed by a plurality of processing modules, such as in implementing a parallel and/or serial processing regime. Accordingly, the system may be configured for collecting preliminary and/or finalized versions of advertisements, across accounts, batching them, and distributing them, e.g., in batches. For instance, a social media platform may set limits on what can be done based on the ad account level and/or the distribution requirements upon which the communication is to be distributed. However, the present system can be configured for overcoming various of such limitations. For example, the system may be configured for allowing a multiplicity of accounts to be managed at a single interface, all at one time. Once distributed the results of the transmission can then be collected and evaluated with respect to one or more factors, such as with regard to effectiveness.

Various aspects of the process can be detailed and one or more notifications concerning the same can be sent so as to ensure that system users are informed as to system and process functioning. For instance, the system 1 may include a notifications module for generating one or more notifications reporting campaign and/or advertisement effectiveness. The notification can include any variety of data, including a characterization of how the advertisement was made, how it was distributed, how it was received, the type and quality of engagement, as well as the velocity of engagement, and the results thereof. Particularly, a report as to the effectiveness of such advertisements may also be generated, whereby such effectiveness can be determined in relation to a number of different parameters, such as based on a scoring of the advertisement, e.g., weighted in such a manner to favor the selected objective. More particularly, the notification can include the pertinent information for determining how successful the advertisement was, whether the advertisement succeeded or failed to meet the campaign objectives, the effects of the budget that was deployed, and one or more system generated evaluations and/or recommendations may be made, and the like.

Specifically, one or more analytics may be run on the data so as to make one or more recommendations of how to better effectuate and/or meet the campaign objectives. For instance, the system may include an analytics module, which may be configured from one or more machine learning and/or inference engines that form an Artificial Intelligence module 29 of the system. For instance, the analytics module may perform a budget analysis that can be made to determine what the ad spend was and what effectiveness resulted. Likewise, the amount of money that was spent so as to achieve the determined results and/or other recorded objectives, e.g., sales, may be determined. Further, a prediction of how that effectiveness of the advertisement could be increased by increasing the ad spend may be made and tested. As indicated, any or all of these data may be reported to system users via one or more of the referenced notifications. In view of these data, one or more system parameters may be changed, such as by a system user or the system itself, so as to better effectuate the campaign goals.

Specifically, in particular instances, the collecting of the content data may include querying one or more webpages of one or more websites, e.g., social media modalities, based on one or more filters, such as where the one or more filters may include: a keyword filter, a character filter, a number filter, a language filter, a text-recognition filter, an image recognition filter, an image filter, a sentiment filter, a geolocation filter, an antonym filter, a chronological filter, and the like. In certain instances, the collected data may include content data that includes a media component, such as a text element and/or an image element. For instance, the image element may include one or more of a JPEG file, a GIF file, a GIPHY file, a collection, slideshow, a collection, slideshow, carousel element, a video element, and other ad media formats, and the like. In particular embodiments, the text element may be collected from a corporate webpage and the image element is collected from a local webpage, they may each be transformed and/or otherwise functionalized, and may be used in generating an advertisement, such as a media rich, multimedia advertisement.

In various instances, the collected data may further include metadata, such as metadata associated with one or more of the content data, a collection of content data, geographic data, website data, webpage data, metric data, and the like. In such an instance, the metric data may include characteristic data characterizing one or more characteristics of the content data, the collection of content data, the geographic data, the website data, the webpage data, and the like. Further, in particular embodiments, the metric data may include a number of webpages and/or content items viewed and/or collected, a time of content item views and/or collection, or other engagements, a number of webpages and/or content items viewed, a sentiment in response to the webpages and/or content items viewed, an engagement with the webpages and/or content items, a comment pertaining to the webpage and/or content item, a re-posting and/or sending of one or more of the content items, a number of times the content items are used, the size of the webpage and/or content items, a number, a frequency, and a consistency of content item views, collections, commenting, postings, and sending. Particularly, the metric data may include parameter data, such as including one or more of: a character value, a numerical value, and a symbol value, the symbol value including one or more of a "like," "dislike," "tweet," "retweet," "favorite," "+1," "upvote," "downvote," "view," "unique view," "fan," "follow," "forward," "viral posting," "paid posting," "storyteller posting," "click," "hit," "hide," "comment," "share," and the like. Where webpage data is included, the webpage data may include a page title, a page description, a page content, a hyperlink, and the like.

As indicated, a media component evaluation module 14 and/or an artificial intelligence module 29 may be included, such as where the evaluation and/or AI module includes one or more evaluation processing engines configured for evaluating the effectiveness of a media component of the content item collected. Particularly, the evaluating of the plurality of media components may be based on metric data, such as metric data collected with respect to the collected media elements, media components, and/or the webpages from which they are collected. Hence, in particular instances, the media component evaluation 14 and/or AI 29 modules may be configured as a score generator so as to produce scored media elements, including scored media components, and may further be configured for transmitting the scored media content to the memory for storage thereby.

The scoring of the media elements, e.g., the media component, by the media element evaluation and/or AI modules 14, 29 may include evaluating the media component by one or more parameters of the metric data so as to produce a media element with a score, e.g., where the score represents effectiveness, such as effectiveness of a campaign to meet one or more objectives. In particular instances, such effectiveness may be determined by evaluating one or more of a user engagement, a user review, a user commentary, results of a user questionnaire, an impression, a conversion, a user action, a user view, a user like or dislike, a user up vote or down vote that is associated with the media element, and the like.

The computing system 10 may also include an advertisement generation module 16 that is configured for accessing the memory and selecting both a template and a media component, for integration into the template, for generating the advertisement. In such an instance, the advertisement module 16 may be configured as a content generator. Particularly, the advertisement generation module 16 may include or otherwise be configured for generating a project dashboard that is configured for presenting a graphical user interface at a display of a client computing device 20A and 20B. Hence, the system 1 may include one or more client computing devices, 20A and 20B, such as where a first client computing device 20A is provided such as for generating and distributing an advertisement, and may further include a second client computing device 20B, such as for receiving and viewing the advertisement and/or for responding thereto.

In such an instance, the project dashboard may include a graphical user interface, for visualizing and viewing media elements, including media templates and media components, controls for allowing a user, such as an advertiser, to view and select the media template and the media component for integration therewith to produce an advertisement, and geographic regional identifiers, for selecting a geographical range within which the advertisement is to be distributed. In particular embodiments, the dashboard may be employed for a number of purposes, such as for allowing a user to generate and/or view an advertisement, or other communication, for viewing media elements, such as content, for scoring and/or selecting scored content, for determining a budget, for generating, reviewing, and/or distributing analytics, reports, and the like. In various embodiments, a variety of analytics may be performed and reports thereon generated and distributor, such as on an account, group, and/or location level. The dashboard will allow the various data collected to be sorted and searched, or otherwise filtered, such as by key category indicators and date ranges. For instance, in various embodiments, the system 1 may include an artificial intelligence module 29 that can be used to assist in the performance of the one or more evaluations disclosed herein. Likewise, the system 1 may include an analytics module 32 for determining the effectiveness of an advertisement to provoke a response from a user, such as where the advertisement has been distributed for viewing by the client computing device 20B. In such an instance, one or more metrics may be collected by the online activity module 27, e.g., once the advertisement or other communication, has been presented to the users computing device 20B, and either been engaged with or ignored thereby. Such data to be collected and evaluated can include views, impressions, conversions, engagements, and/or other actions or the like.

Figure 4A:
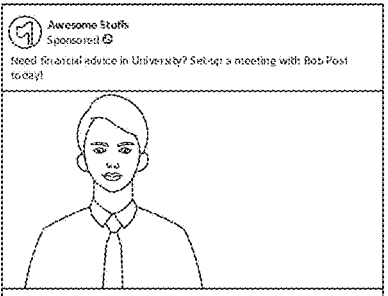
FIG. 4A is an exemplary dashboard interface presented at a display of a computing device for use in setting the rules by which a new communication campaign can be engendered and used to generate, e.g., dynamically, a communication.

For example, as can be seen with reference to FIG. 4A, using the dashboard interface presented at one or more client computing devices 20A, an advertisement campaign may be set up, and an advertisement created, such as by interacting with a series of online interrogatories and/or manipulative text and/or image boxes. For instance, using the dashboard interface, the format, images, texts, URLs, links, a call to action, and an objective can all be configured. The advertisement may be composed of a variety of components that may be combined together to form a dynamic advertisement having interchangeable assets.

Specifically, the advertisement may include a framework that contains a variety of assets, such as a template architecture having one or more design layers, into which one or more media rich assets may be inserted and/or otherwise integrated so as to form the advertisement. In various instances, one or more media assets to be used in advertisement generation may be collected by the system, such as from an online source, and/or may be uploaded into the system, such as via a suitably configured application programming interface (API). The desktop interface may be used to select one or more objectives for the advertisement campaign and its generated advertisements, such as increasing brand awareness, extending reach, surging traffic, generating views, looks, shares, likes, lead generation, increasing inferences and conversions, and the like.

As can be seen with respect to FIG. 4A, the communication being built, configured, and formatted can be rendered substantially real-time, such as for display via an in application review panel. For instance, the desktop interface may be configured in a variety of manners so as to present a multiplicity of options to a user with respect to building, generating, and/or distributing a communication. Particularly, a format selector may be presented so as to allow a user to select a format for the media components to be employed in generating the advertisement, such as in a dynamic text, image, graphic, video, carousel, and/or other media rich content format. Such content can be generated by or otherwise uploaded into the system. In various instances, the media rich content may be configured dynamically, e.g., by a generation engine of the system, such as to be automatically.

In various instances, the dashboard interface may further be configured to allow a user to enter texts into the system, which may then be used in generating the advertisement. A headline may also be determined and an interactive website URL may be entered and once the advertisement has been generated and presented for viewing, e.g., to a consumer, the URL may be interacted with, e.g., clicked on, whereby the user may be presented with a website of the product or services being sold. The link may optionally be displayed, and a description may be provided. In various embodiments, the generated advertisement may include a call to action toggle, whereby an interactive tagline calling for some determined action may be incorporated into the advertisement. Likewise, one or more objectives for the advertisement campaign may also be selected or otherwise determined. In a manner such as this, once various advertisement parameters have been determined, one or more templates and/or media assets may be selected and used in generating the advertisement. In various instances, the advertisement may be generated in a variety of functionalized layers.

Particularly, in a first layer of an advertisement to be generated, information to be inserted into the template architecture may be captured, such as where the information to be captured regards universal data that forms a global context of the communication. Such information can be collected, such as by a web-crawler, or may be retrieved from a database, or uploaded via an API of the system. In either instance, the retrieved data may be entered into the system in a number of different manners, such as by association with one or more specified accounts. Specifically, a user's social media, e.g., FACEBOOK®, INSTAGRAM®, or other account can be used to transmit the advertisement data, e.g., the advertisement creative, for incorporation into one or more layers of the template. More particularly, the system may be configured such that one or more advertisements or advertisement components, such as a template, text, image, or other media rich creative asset that may be collected and/or otherwise entered into the system, and may be published or posted, such as via transmission through a user accessing a suitably configured user account, e.g., at the group, individual level, and/or the like. In various instances, the advertisements and/or advertisement components may be scored and stored, such as in a structured and searchable database prior to use.

In a particular instance, dynamic media components, such as the universal and/or location limited texts, photos, media rich assets, may be transmitted for use by the system, e.g., in the generation of an advertisement, such as via the social media account. A target audience and/or campaign parameters can also be determined at this stage, such that the determined texts, images, media rich assets may be called or otherwise be populated into designated data fields or containers of one or more layers of a selected template. As indicated, a single template architecture can be used to generate a wide variety of advertisements, such as by calling and/or otherwise pulling a number of different creatives, e.g., dynamic texts or images, which may then be populated into the various design layers of the template architecture so as to generate the advertisement.

Particularly, one or more processing engines of the system may be configured for receiving or otherwise implementing instructions that are adapted for calling, e.g., from a database associated with the system, and populating the various fields and/or containers of the template architecture, such as with media rich content. Likewise, the media content can be tagged with keywords and/or other data that function to allow the media creative to be searched, identified, called, transmitted, and inserted to an identified container of the template architecture. In a specific embodiment, the media content may include embedded coding configured for allowing it to be called and fitted within one or more containers of one or more design layers of the template architecture, functionalized, and compiled.

In various embodiments, the numerous creatives of the system may be stored in an architectural database that is capable of being queried, such as via associated metadata, so as to identify not only the item to be selected but further identifying the items within the template to be replaced by the selected media asset. To effectuate efficient generation, the directions, html, xml, or other coding, governing the template and that of the media asset, e.g., personal home page coding, may be compiled, e.g., in conjunction with a hypertext preprocessor, together in a corresponding manner so as to generate the media rich advertisement.

Precisely, the advertisement may have a format that is composed of one or more image and/or text elements that can be entered and uploaded, functionalized, such as by being embedded with coding, and/or may be selected from a library of images and or text elements. In some instances, the images and/or texts may be viewed, such as via a preview display, selected, e.g., from a variety of elements in an image or text library, and can be inserted into the advertisement, such as by selection by a user of the system. For instance, using the dashboard interface, a variety of selectable images and/or texts can be presented to the user, from which one or more selections may be made. In other instances, the images and/or texts may be generated and/or retrieved, automatically and/or autonomously by the system itself.

In either instance, the delineated images and texts may be encoded and/or inserted and/or otherwise be integrated, such as via compiling, into one or more correspondingly encoded containers and/or design layers of the template architecture. In particular instances, as described herein above, the images may be photos, videos, animations, and the like, which images may be in a selected format, such as in a single or multi-image format, including as a carousel, slideshow, or collection of images and/or videos. And as indicated, such images may also be generated by the system and be selected individually by the user, or may be selected and/or retrieved and integrated into the template dynamically, e.g., autonomously, by the system itself, such as in accordance with various selected criteria.

Likewise, various texts elements may be encoded and/or added, such as by entering free-form language into a text box, as depicted in FIG. 4A, such as for describing a headline, setting forth an interactive URL or call, such that when a viewer of the advertisement, e.g., a consumer, interacts with the advertisement, the consumer is brought to a website, e.g., a seller's webpage, for viewing. The advertisement may also include one or more links that may be interacted with by the viewer. One or more objectives for the advertisement and/or campaign can be selected as well, such as with regard to increasing brand awareness, reach, traffic, views, impressions, conversions, page likes, and the like. As indicated, a preview display may also be presented so as to show how the advertisement will look and fell as each element is selected and defined.

Additionally, when generating an advertisement campaign, a campaign window, e.g., tab, may be generated wherein a budget may be determined for the campaign and/or for each advertisement. Particularly, the campaign interface may allow a user to determine the spend per advertisement and/or the overall spend for the campaign can be set forth. An analytics page may also be presented whereby results may be analyzed, and impressions, conversions, engagements, reach, leads, and the like can all be assessed, and/or objectives with respect thereto can be determined.

In a particular implementations, the dashboard may present collected and analyzed data in a number of different screen formats, such as for displaying the top performing creatives and media elements, key metrics may be set forth, e.g., with respect to reach, impressions, conversions, engagements, and the like. Likewise, the performance by these metrics and/or by set objectives may be presented for display, such as in a grid-like fashion, whereby key data, such as regarding reach, brand awareness, page or content likes, traffic, views, and/or other objective types may be displayed. Metrics may be generated and/or displayed such as where the metrics may include the number of advertisements generated or to be generated, the amount to be spent, such as per advertisement, the reach to be gained or gained as a result of an advertisement campaign, the cost per result, and other results, all of which may be displayed and controlled by the dashboard.

Additionally, various different demographics, such as of the target audience and/or the audiences who responded to the advertising campaign. Such demographics may include: age, gender, economic status, occupation, and the like. In particular instances, various metrics may include the above references, such as engagement and reach and the like for men vs. women and/or for the following age tiers: 18-24, 25-34, 35-44, 45-54, 55-64, and 65+, and various combinations of the like. Such engagement data may include consumer data in response to the advertisement and/or its contents, including: comments, shares, posts, likes, page likes, link clicks as well as volume of placements per social media modality. Specifically, a number of different previews of media elements may be previewed and offered for selection by the user at the graphical user interface of the project dashboard. In particular embodiments, graphical images, photos, videos, other digital image files, jpegs, gifs, gigphy's, thumbnails, and the like, as well as, text based elements, may all be presented at the graphical user interface as a media component that is selectable for incorporation into a selected media template.

Further, the format of the generated advertisement, such as for delivery to a desktop or mobile or other messaging device and/or modality may also be selected. The controls of the project dashboard may further be configured for allowing the user to select an objective, a budget, a target audience, and a geographical distance within which the advertisement is to be distributed. A budget objective and budget amount may also be selected, such as where the budget corresponds to an ad campaign objective. In various instances, objectives may include actions taken by consumers having been exposed the advertisement, including electronic actions, such as impressions and conversions, e.g., clicking on and/or viewing the advertisement, visiting the website of the advertisement promoter, downloading a promoted element, such as an app, as well as physical actions taken, such as visiting the promoter's store, and/or purchasing the promoted goods or services, either physically or via an electronic catalogue. Other post exposure and/or post conversion and engagement activities can also be tracked and communicated to the system controller.

Likewise, audiences for targeting can be selected based on a user's, e.g., potential consumer's, online activities, including what websites they have visited, what online products they have purchased, what online searches they have performed, or audiences may be determined based upon known customers that have visited the promoters webpage, follow the promoter, or have otherwise informed the promoter that they are a customer or are interested in receiving information from the promoter. In particular embodiments, the audience group to be targeted may be imported from one or more known customer lists, such as via a suitably configured customer relations management (CRM) tool, a social media following, and the like, for instance, via an application programming interface (API) or software development kit (SDK) interface. Lookalike audiences may also be set up.

Accordingly, in various embodiments, the system may be configured for allowing a user to create one or more specific audiences to be targeted with the generated advertisements. Such audiences may be specified by a number of different characteristics and/or identifiable demographics, which may be selectable based on one or more ranges, e.g., related to one or more of: age, race, gender, language, income, interests, locations, behaviors, or other such user characteristics and demographics. Such data may be useful because it allows for dynamic targeting of advertisements to particular users based on demographics, including selected geographic ranges.

Particularly, a geographic range may be defined so as to distribute advertisements within a defined radius, location, region, and the like. The range can be defined by the user or be determined dynamically by the AI of the system, such as based on a desired reach or other advertisement campaign objective. Other data may also be considered when determining an appropriate audience to target, such as with regard to their prior online use data, including their search histories, the websites they have visited, the searches they have performed, the products they have purchased, and the like. Hence, the system, e.g., via the dashboard interface, can be used to create and save audiences, including custom and look alike audiences, for the promotion of highly targeted advertisements.

The project dashboard, such as presented at FIG. 4A, may be configured for allowing a user to control a variety of different actions pertaining to the building of an advertisement campaign including the generation and distribution of advertisements, such as selecting one or more objectives for the advertisement campaign, such as: brand awareness, reach, page or content likes, engagements, conversions, e.g., web conversions, lead generations, web traffic, image or video views, and the like. In such instances, one or more media elements and one or more formats can be selected, such as media, text, website URL, headlines, CTA, single images, an image carousel, single video, carousel of videos, and the like.

One or more of these media elements may be generated or uploaded into the system, such as into the media repository, in a tagged and searchable manner so as to generate a searchable creative library. In particular instances, the texts and images may be scrollable so as to make navigation and selection easier. Further, as explained in greater detail herein, in various instances, prior to or after entry into the media repository the media elements may be evaluated and/or scored and/or embedded with code so as to be entered into the database in a categorized and/or scored manner.

In such an instance, the highest scoring content can be presented higher up in the categories, such as in a prioritized manner, and/or first in a carousel so as to be seen first. Particularly, in this manner single text or image elements, can be grouped into high performing categories and be displayed as lists, or carousels, whereby the best performing content can be presented first. Any number of texts or images ay be loaded and formed into a list or carousel, such as 2, 5, 10, 15 20, or more, e.g., in ranked order.

Once generated, the advertisements, and the component parts from which they are composed, may be tagged, and/or encoded, and stored, such as for later use, for instance, as a draft or a finalized version. Where a finalized version is stored, it may be stored indefinitely or for a period of time during which it is waiting to be deployed such as in accordance with a determined schedule so that the ads may be deployed at a set day and a set time, according to a configured campaign schedule. Likewise, advertisements and their elements can be ranked and stored in the database in a hierarchy, e.g., in ad sets, such as in a hierarchy in accordance with campaigns and their objectives, e.g., in single or multiple campaigns.

In various embodiments, where the advertisement elements are encoded but not fully combined into an advertisement, but stored at least partially individually, they can be combined automatically by the system, and in like manner, the user can create automated rules for the advertisements and the ad campaigns, so as to regulate the parameters of component integration, ad creation, deployment, range, budget, ad elements, and the like, all of which can be adjusted by the controls, so as to be automatically deployed and/or adjusted such as on the occurrence of certain selected conditions. In this manner automated rules for organizing and running the campaign can be determined and selected by the user. Particularly, the computing system e.g., a server 10 and/or a client computing device 20, may include an advertisement builder 22 that is configured for accessing the memory and building the advertisement, which building may be based on a media template and a media component that is presented at the dashboard and selected by a user of the system 1.

Likewise, a compiler 24 may be included where the compiler is configured for integrating and compiling the selected media component into the selected media template so as to compile the corresponding codes and generate the advertisement. Further, a formatter 26 for formatting the advertisement for display at a graphical user interface of either or both of a stationary and a mobile computing device may also be provided. Furthermore, the computing system may also include a distributor 28 for distributing the formatted advertisement to a plurality of social media modalities in a format capable of being viewed by a user. Further still, in various embodiments, the system 1 may include an advertisement evaluation module 27 for evaluating the effectiveness of the distributed advertisement.

In particular embodiments, the evaluation module 27 may include a tracking processing engine such as for tracking a user's engagement with the distributed advertisement. For instance, the evaluation module 27 may be configured for determining incremental lift. In various instances, the evaluation module 27 may be configured for working in combination with the AI module 29 of the system, such as for performing one or more of the analytics disclosed herein.

In certain embodiments, the system 1 may further include a reporting module configured for generating and distributing one or more reports related to one or more of the generation of the advertisement, the distribution of the advertisement, and the effectiveness of the advertisement. Specifically, the system may be configured for receiving both inputs and approvals, for advertisement generation and distribution, but also providing reports with respect to the performance thereof. Accordingly, the platform may provide for the implementation of various management protocols, such as to require authentication and/or authorization of system users, for assigning advertisement account managers, and for designating to whom authorizations and reports should be sent or otherwise exported. Such reporting may be implemented at the account, group, location, and/or global levels, and may include tracking information.

Likewise, authorization can be set at different levels within the company and based on different levels within the social media platform. Hence, authorizations can be set at executive, manager, administrator, employee, consultant, consumer level, and the like. Consequently, when a user accesses the system, they may be authorized both by the platform, but may also need to be authorized by the one or more social media modalities to which they want to access as well. In various embodiments, the social media platform may grant permissions and tokens, and then the ad account presented to the user may depend on the social media account the user has accessed and/or logged into.

The system, therefore, may be configured to grant a varied access based on a set of rules for determining the associated permissions for granting access. In this regard, tokens may be distributed to account holders, such as where the tokens include the identity of the user, their position in the company, their permissions, and consequently the tokens may direct the type of permissions the account holder has, and determine the amount and level of access the account holder has, e.g., based on the permissions. The tokens, thus, may include data for accessing the platform as well as for accessing each of the social media modalities. The system may also verify and ensure the user is employing the correct token(s).

Figure 4B:
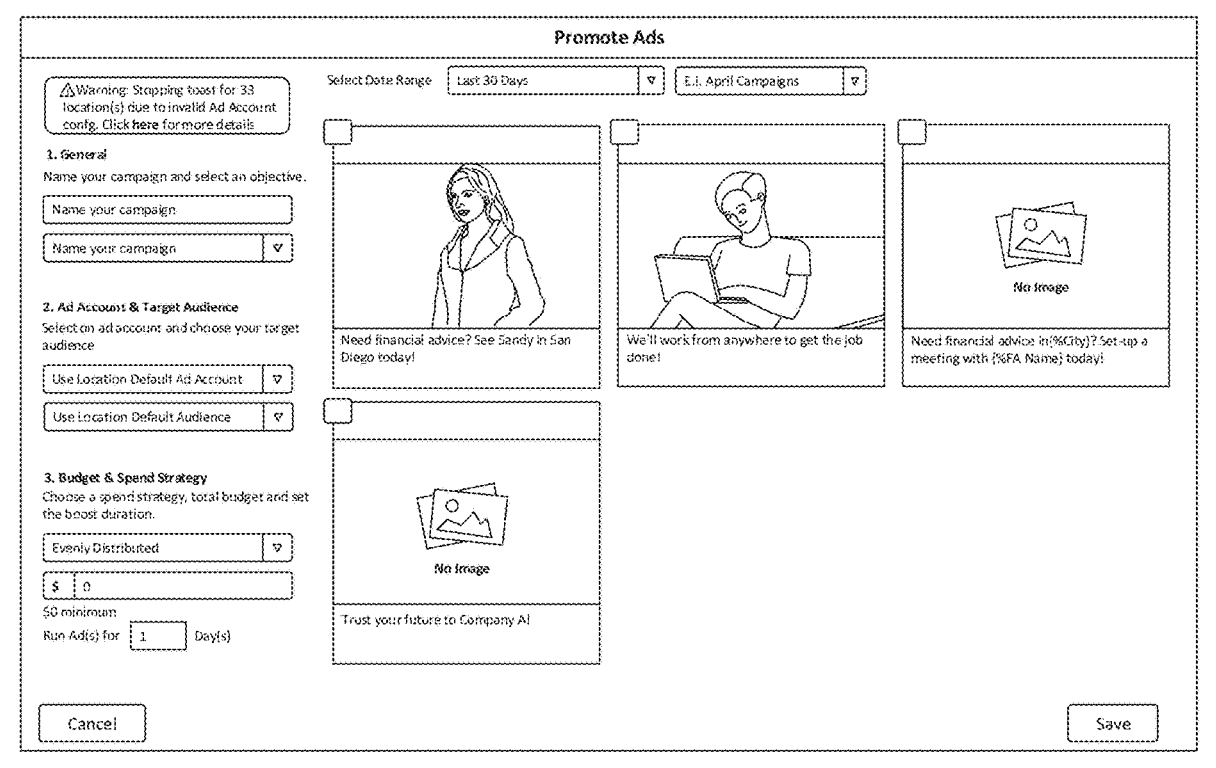

In view of the foregoing, as can be seen with respect to FIG. 4B, when setting up an advertisement campaign, a graphical user interface (GUI) may be presented to the user via a client computing device of the system, whereby the GUI may include a dashboard for configuring an advertisement campaign and/or for generating an advertisement. For instance, the dashboard interface may present a user with a list of options and/or interrogatories that may be presented for selecting amongst the various options for configuring the campaign and/or for creating the advertisement. For example, in creating an advertisement, a set of first steps may involve setting up the parameters of an advertisement campaign.

Particularly, a name may be entered for the campaign, and an objective may be selected. For example, the name may be entered into a presented text box, or a name may be suggested by the system. Likewise, an objective may be set, either by free form entry, or may be selected from a drop down menu. As described above, the ad account and social media platforms may be defined. In certain instances, the system may suggest the ad account and/or may suggest an audience to be targeted, such suggestions may be presented in a text box and/or may be presented by a drop down menu, such as by presenting a default setting.

More particularly, in generating an advertisement campaign and/or creating an advertisement, the user may be prompted to choose an ad account and/or a social media platform and/or account from which to run the campaign. A location can be selected, such as by entering a known location, choosing a default location, or selecting and/or entering a determined radius for targeting. Such information may be entered free-form into the GUI, e.g. via a text box, and/or may be selected from a drop down menu. A target audience may also be targeted. Various different budgeting parameters may also be selected, such as a spending strategy, whether to be evenly distributed, and/or allocated per location and/or per ad, e.g., evenly or disproportionately.

In various instances, a location setting may also be used to allow the user to select the location to be targeted. Additionally, a budget and spending strategy may be selected, so as to allow the user to choose a total budget, a distribution of budget across locations and/or across advertisement, a per ad spend, a duration for the ad campaign, such as for selecting a number of days, a range of days, and the like. Further, once a number of campaigns have been generated, a number of campaigns can be presented to be run or re-run, from which campaigns a number of advertisements from the campaign can be selected, and/or the campaign can be re-run. These already generated advertisements and campaigns can be presented for selection by the user.

Accordingly, in generating an advertisement campaign, the advertisement may be selected from a library of previously generated advertisements, an advertisement that has previously been generated and used in a campaign, or can be created anew, which once generated may be added to the library. When creating a creative, a launch button may be selected thereby launching a creative module. For instance, a selection of text and/or images may be presented for selection, such as stock images and texts, or the system may allow the user to upload images or texts, or may generate them themselves.

For example, ad creative, such as media rich assets, e.g., single or multiple images, videos, and texts may be uploaded into and/or presented for selection by the system. In various instances, the images and/or videos may be grouped together, such as in a carousel. As described herein in detail, the images and videos, may be selected and entered into the system, such as for use in generating an advertisement, dynamically, such as being selected by the system for presentation to a user or for generation of the advertisement. The various uses for the employment of the media may also be presented, such as for configuring the campaign.

In various embodiments, the texts, images, videos, and/or other media elements may be tagged or otherwise include metadata that indicates from where the data was collected and/or to where the data is to be targeted, such as to include a universal resource locator (URL), such as a website URL. These links and a description thereof may be presented as a selectable element in the advertisement or may be displayed to the user for selection. An ad display option may also be presented. In various instances, a call to action may be presented, which may be configured to elicit a further response from the viewer, e.g., consumer, of the advertisement, and which may take the consumer to the website of the product or service being offered. In various instances, the advertisement may be configured, e.g., by a user, for presentation via a desktop or mobile computing device, and/or may be presented as a part of a newsfeed and/or message board, and/or may be presented as an article, and/or a social media, e.g., INSTAGRAM FEED, and the like.

Once the advertisement has been created, or otherwise generated and/or selected, it may be promoted. For instance, from the creative desktop module, a "promote" ad button may be selected for promoting and/or boosting the advertisement. The promotion button will present a dialog box that will allow a user to view and/or post a dialog, choose a library and/or creative, and/or media asset, and/or otherwise configure the system and campaign. In such instances, the creative to be used and/or selected may be presented, which presentation can help the user configure the campaign, such as by naming the campaign and choose an objective, such as a brand awareness, reach, likes, impressions, conversions, leads, and/or a custom objective may be selected.

As indicated above, and as displayed at FIG. 4B, the advertisement to be generated may include a template having one or more containers, into which one or more assets may be called. For instance, as displayed at FIG. 4B, the advertisement to be generated may include a plurality of figures, such as of employees of a national service company servicing a local community. In various instances, one or more localized messages may also be inserted into one or more containers, such as a container for receiving texts for being associated with one or more selected images. Hence, as depicted, the advertisement to be generated will include four figures, of local employees, where each has a personalized tag line associated therewith. Prior to advertisement generation, a plurality, e.g., four, image display panels, and a plurality, e.g., four, text display panels of the advertisement building desktop panel can be presented and used to select and display the media elements being selected for inclusion in the advertisement being generated.

As can be seen with respect to FIG. 5A, in various embodiments, the advertisement campaign can be configured so as to deliver an advertisement within a geographical location. So being, the system server may generate a dashboard interface via the advertisement builder, which dashboard interface may present to the user of a client computing device associated with system server, e.g., via a network interface, a geographic delimiter whereby a geographical region may be selected. For instance, a menu, or list of available locations within which the advertisement campaign can be run, may be presented for selection by a user. The user can therefore interact with the dashboard interface to select all or specific locations to which the generated advertisements are to be distributed. In various instances, a text box for performing a search of the desired location and/or one or more filters, for narrowing down a search may be selected. Once presented the user can assign or un-assign which locations should be included in the advertisement campaign. Along with the location delimiter a listing of available local social media accounts can be generated and presented, which accounts may be searched for and added or removed from the campaign by selecting an add or remove button. A number of user accounts and/or assigned accounts can also be presented.

Accordingly, the advertisement and social media accounts to be used in setting up the advertisement and running the ad campaign can all be configured at the dashboard interface presented at the graphical user interface. In this manner, the desired social media account can be assigned to a selected ad account, and individual locations and groups for targeting the campaign can be selected. Likewise, various metrics for evaluating and determining the success of the advertisement campaign can be presented at the dashboard interface. Particularly, the system may include a data collector and/or employ webhooks, such as a web crawler, that may be employed to determine the successfulness of the advertisement and/or the campaign. Such collection can be performed on a periodic bases, such as daily or hourly, such as every 2, 4, 6, 12 hours and the like. These metrics may include lifetime, monthly, weekly, or daily, or per ad parameters and/or may be location or user specific or the like.

Hence, in various embodiments, the system may include an insights module and/or may otherwise be configured for tracking social advertising and performance, such as at the national and/local levels. Along with campaign parameters and effectiveness reporting, one or more system determined insights may also be reported, which insights may be customized to the user, the campaign, the advertisement, to its elements, and the like, such as for measuring effectiveness, and other such metrics. Such insights and reporting allow the system to leverage campaign reporting and key insights at all account levels. In such a manner as this, top performing creatives, such as with respect to one or more of impressions, conversions, engagements, reach, lead generations, and the like, can be tracked, monitored, and used in the building of new advertisements. The number of advertisements executed, e.g., per campaign, can also be tracked and optimized.

Consequently, performance by objective may be determined and tracked, such as with respect to the progress thereof. A cost per result may also be determined. The insights module, therefore, can be used to increase efficiency and return on investment, such as with respect to objective attainment and customized advertisement building. Notifications and alarms with respect to these evaluations and reporting thereon can also be set.

Along with budgeting information, payment information, such as for paying for a system implemented task may also be entered into the system, such as via the controls of the graphical user interface. In this manner, a user can directly pay to create ad campaigns, and distribute them either generally or specifically to targeted users, to one or more social media modalities. For instance, once an advertisement is posted to FACEBOOK®, it may automatically be distributed to INSTAGRAM®, and/or TWITTER®, and/or to one or more other social media modalities, e.g., autonomously and automatically.

With respect to generating insights, as indicated with respect to FIG. 3, the system 1 may include an artificial intelligence (AI) module 29 that may be associated with one or more of the sever 10 and/or client computing device 20. For instance, the AI module 29 may be associated with one or more of the data collection module 12, data evaluation module 14, advertisement generation module 16, and/or advertisement evaluation module 27. In particular implementations, the AI module may be configured for developing an advertising campaign and implementing one or more collection, scoring, generating, and/or evaluation protocols. Particularly, the AI module 29 may be associated with the content collection module 12 and/or evaluation module 14, and may be configured for collecting, evaluating, and/or scoring the content to be collected.

Likewise, in particular embodiments, the AI module 29 may be associated with the advertisement integration module 24, and thus, may be configured for selecting the template and/or the media component and/or for generating the advertisement, such as where the selecting process is based on the results of the above scoring. In such instances the content items may be collected, scored, and/or the advertisement generated and/or distributed automatically, at real time, and on the fly, e.g., upon the occurrence of a triggering event. In particular instances, one or more of these steps, e.g., generation and/or distribution, may be performed autonomously. Specifically, in one instance, the AI module may be associated with the project dashboard and may be configured for determining one or more of an object, the budget, the target audience, and the geographical distance, such as for determining the advertisement campaign.

More particularly, employing the platform disclosed herein will allow a single representative from a single user interface to generate one or more brand approved ad creatives, where each ad creative can both include various corporate design elements, and further include particularized messaging catered to each local region. Accordingly, one or more users can access the system, at the same or different times for the purposes of configuring an advertisement campaign, such as a campaign to be conducted on one or more social media modalities. For example, the system provides a common interface and account accesses for allowing corporate officers, e.g., accessing a corporate social media account, and local administrators, e.g., accessing a local social media account, which accesses can be conducted through a single interface provided by the system, in such a manner that audience creation, dynamic ad creation, and location targeting can all be streamlined on both the collective corporate and disperse local level.

Accordingly, in view of the above, a user of the system, e.g., advertisement promoters, can create, edit, and broadcast advertisements on a variety of social media modalities at the account, group, local, and corporate levels, whereby the user can add, evaluate, and/or select advertisements and/or elements thereof, such as including texts, images, links, and the like so as to build dynamic ad creatives. Hence, campaign messaging and advertisements may be generated, by a promoter or advertiser, and broadcast from a single user interface across a plurality of social media modalities amongst a single or multiple accounts. In various instances, multiple ads may be transmitted to multiple locations at once. For instance, the system may be configured for creating advertisements that can be mass posted to many locations at once, vs. manually posting each ad, or posting one generic ad to all pages, e.g., via parent/child relationship.

Likewise, as users evaluate, create, and/or otherwise configure the system to create advertisements, as well as the contents thereof, the system may indicate one or more objectives, such as advertisement objectives, based on their ad creative and campaign. In this manner, the system can guide the user as to the basic and advanced rules governing advertisement generation process. Consequently, such objectives can be selected on an ad-by-ad basis or may be selected amongst one or more groupings of ads, such as with regard to previously run ad campaign.

For instance, various different advertisement objectives may be selected from, including brand awareness, reach, page likes, web conversations, lead generation, web traffic, image views, advertisement previews, and the like. For example, in a particular embodiment, an objective of the advertising campaign may be to increase lead generation. In such an instance, a user of the platform can create an advertisement, or other communication, that is designed to support or otherwise promote lead generation as an objective.

Particularly, the user can create forms for generating leads and then publish an ad using those forms. In various instances, a menu option may be provided to the user so that they can simply select from a number of objectives, such as a lead form, e.g., from a drop-down list when promoting an ad objective. Likewise, once generated, the leads may be stored in a database of the system, from which the collected leads may be exported when determining a number of consumers to which to distribute a generated advertisement, such as in accordance with a predetermined budget.

These aforementioned advances make it possible for corporate brands, their local subsidiaries, and their affiliated agencies, e.g., promoters, to create and manage both corporate and localized advertisements at scale. Particularly, using the devices and systems disclosed herein users can generate and distribute advertisements, promotions, and other communications, at scale, which can then be broadcasts across social media modalities, such as FACEBOOK®, INSTAGRAM®, SNAPCHAT®, TWITCH®, SLACK®, and/or other online communications modalities, which advertisements may be promoted at the group, location, and/or other levels, in a manner so as to instantly promote dynamic ads to hundreds or thousands or hundreds of thousands of users at upwards of hundreds of thousands of locations, via hundreds of thousands of local postings, such as FACEBOOK® pages, from a single corporate ad account or individual local ad accounts.

In this manner, user generated advertisement campaigns can be a centralized or a de-centralized campaign. For instance, a centralized campaign can be initialized using one ad account to promote and pay for ads at the group level. Likewise, a de-centralized campaign can be initialized and promoted at the group level, and/or paid for at the location level. Particularly, when users generate and promote an ad from one or more of the above referenced creatives libraries, they may be tagged and/or customized with advertisement and/or campaign objectives, such as at an individual or collective ad campaign level. More particularly, the user can set a campaign name, a campaign objective, a campaign region, a distribution domain, e.g., to select upon which modalities to distribute the ad and using which accounts, and select a geographic region limiter, so as to limit the distribution radius so as to cover a certain geographical range.

Figure 5B:
FIG. 5B is an additional exemplary dashboard interface for setting up an audience parameter of an advertisement campaign.

Likewise, at FIG. 5B, specific audiences in addition to locations and demographics to be targeted can be defined, such as by selecting particular group characteristics by which distribution of the advertisement may be determined, e.g., by one or more target audience demographics, such as by age, gender, languages, characteristic interests, behaviors, and the like. These parameters may be presented at the dashboard display, and using the GUI a user can define the name of the audience, choose an age range, a gender, and a language in which the advertisement is to be rendered. The location parameters may also be determined, such as by adding a specific or general location, such as by entering a location into a text box or selecting from a drop down menu. An audience can also be defined by selecting one or more audience demographics, such as with respect to one or more interests shared amongst a group of potential individual recipients, such as based on shared interests, behaviors, or other shared demographics. Other selections may be provided so as to further narrow down and define an audience further. A graphic showing how relatively broad or specific by which an audience is defined can also be presented.

Likewise, audiences to be targeted may be defined by entering or selecting data pertaining to the desired interests, behaviors, and other selectable characteristics. Other features may also be used by which to broaden or narrow the definition of an audience, and thereby broaden or narrow the audience class to receive the distributed communication. A graphic interface may also be presented to indicate to the user the relative broadness or narrowness of the class may be symbolically represented. In this manner, the projected reach can be dynamically displayed so as to show how different audience delimiters affect reach, such as for a reach vs return on investment calculation to be made by the system.

For example, in various instances, an audience may be created at the group and/or geographical/location level. Once audiences have been set up, users can share the audiences to other users, such as within the platform. In various instances, users and locations can be selected at the group level, and likewise, all those within the group, e.g., each entity at the individual level, can also be targeted as a member of the group, and the geographical area can then be defined on the individual level. Such audiences can be used when creating, generating, and/or promoting creatives. For instance, at the group level, a specific location, such as for an entire or particular sub-portions of the group may be used, or a specific radius from the selected location may be used for targeting. In various embodiments, the system may present one or more determined locations, such as a default or fall back location. However, a custom location can also be entered into the system.

In view of the above, in an exemplary embodiment, in creating an audience may be determined, a geographical location can be selected, localized creative, having multiple objectives, may be crafted, and once created the audiences and/or the creative may be stored, such as in a library of the system, the creative may then be promoted as advertisements, such as by being distributed and/or broadcasted. Specifically, once generated, the advertisement may be distributed across one or more social media platforms, such as at the group and/or individual account level, such as with the appropriate authorizations and permissions, as disclosed herein.

For instance, the audience of interest may be created, such as by accessing the audience tab, selecting the group or individual or custom level, information for defining the user, their permissions, and campaign parameters can then be selected. The various different campaign parameters and objectives can be selected, and a location or geographical delimiter can also be determined. Likewise, as can be seen with respect to FIG. 5B, once a target audience has been defined, it may be saved as a group. Reports regarding the same may also be generated and sent throughout the system. Budget information, spend characteristics, e.g., how much to spend per ad, and over all spend and duration of spend can all be selected at this point.

Figure 5C:
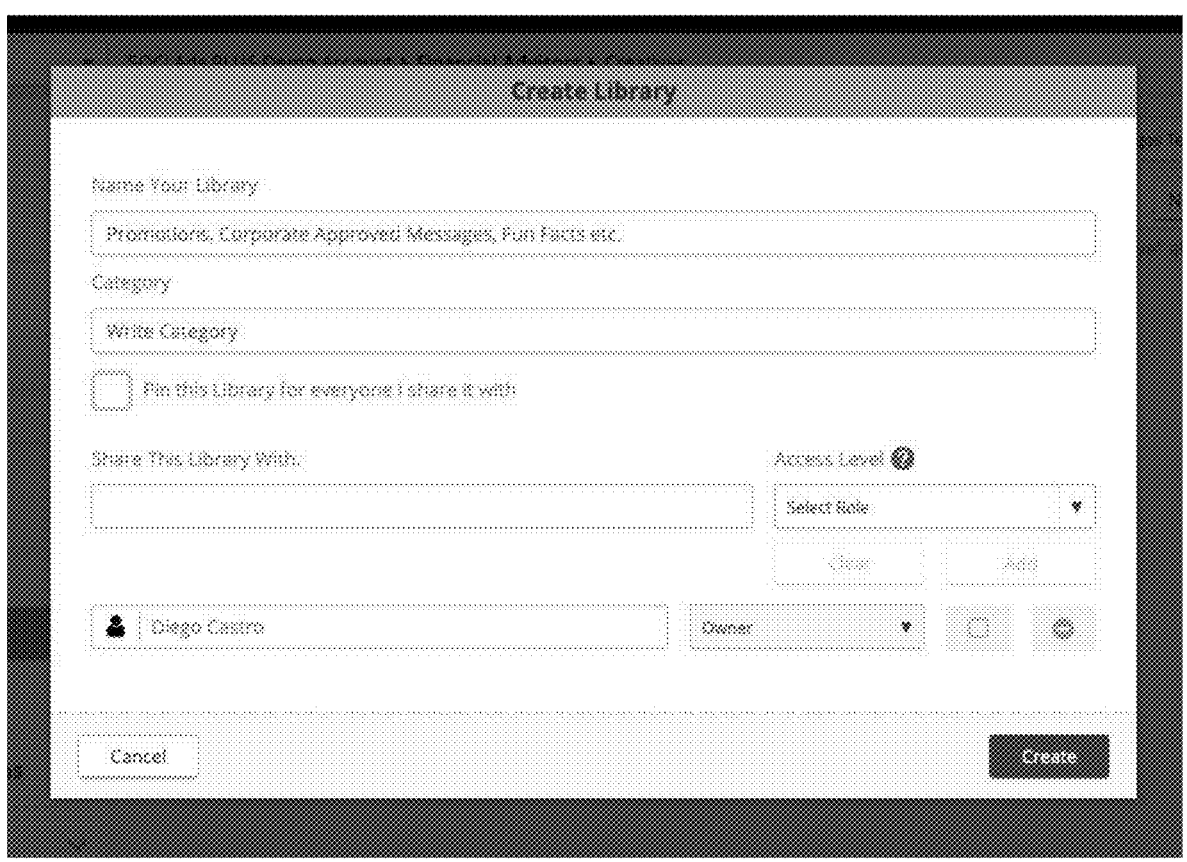
FIG. 5C is an exemplary dashboard interface for setting up a library of the system.

Additionally, as indicated above and set forth in FIG. 5C, once an audience has been defined, campaign parameters selected, and an advertisement has been generated, the audience, campaign parameters, and/or the advertisement and/or media assets, can be saved and stored by the system, such as in a suitably configured library or other database of the system. For example, from the group level, the ad creative tab can be accessed and a library may be defined, named, and categorized. The content to be stored therein as well as the library itself can also be pinned. Those who access the library may also be pinned. The library can store the various elements of the advertisements, and can be made accessible to, e.g., shared with, one or more users. The creator or "owner," curator, of the library may also be assigned at this interface.

Particularly, in an exemplary embodiment, the system user may be from the head corporate office such as at an interface presented on a computing device provided at a centralized location, but also, another system user, such as at an interface presented at a computing device provided at a dispersed local office, e.g., at a decentralized location, may access and use the system. In this manner, the system may be accessed by one or more affiliates of the brand, such as an advertising agency, property management firm, or other affiliated brand representative, where such access may be for the purpose of adding or generating ad creatives and/or their elements, such as with respect to the templates and image elements discussed herein.

Specifically, the ad creatives may include texts and/or images that are entered into the system, or may be collected from the system by other sources, and approved for entry into a repository or defined library of the system, such as for later use by the system such as for dynamic and autonomous advertisement generation. For instance, the system may be configured for retrieving and evaluating content, manually or autonomously, which content can then be stored within a repository of the system and used for generating an advertisement. Hence, in a manner such as this, the system may be configured to store and share everything from audiences to ad creatives across location, and still maintain the ability to set different objectives and hyper-localize audience targeting. Such content may include both texts and images that have been collected by the system, and which may be evaluated and scored by the system, such as with respect to its effectiveness for use in generating one or more advertisements of the system. Accordingly, the advertisements to be generated herein may include one or more of several formats, such as including various different image formats such as a digital photo, thumbnail, a JPEG file, a GIF file, a GIPHY file, a collection, slideshow, a carousel element, a video element, and the like Hence, in generating advertisements, the system may deploy stock or standard, e.g. preapproved, texts or images, such as images that represent the overall corporate brand, e.g., are generally applicable company wide, or may be texts and/or images that are collected and/or directed to local offices that are particular to a given community, which texts or images may be evaluated and deployed manually or autonomously by the system. For example, the system may collect and deploy localized texts and imagery in generating advertisements, which collection and/or generation may be performed autonomously and/or automatically, so that the user does not have the burden of performing these tasks themselves. In this manner, the generated advertisements may have one or both of a centralized or decentralized look and feel. Further, when generating the advertisement, one or more centralized brand and/or local franchisee images may be pulled from one or more databases so as to create individualized advertisements for each particular location, while still maintaining a consistent brand messaging as well as look and feel.

In various embodiments, such advertisement generation may be performed by a user of the system, e.g., manually by a promoter, or automatically and/or autonomously. Specifically, the system may be configured so as to dynamically localize advertisement text and images based on local regional names, regional based images, and to provide local contact information, such as a local website link. More specifically, the system provides an interface, e.g., presented at the project dashboard, whereby either or both a central head office or one or more of a plurality of local offices may engage with the interface, such as a portal presented at a graphical user interface, select one or more premade and approved advertisements, or a template and/or one or more media elements for an ad to be generated, and may enter the budget or amount desired to be spent per advertisement or per location, and may select amongst the conditions by which the advertisement is to be sent to consumers. Hence, via the graphical user interface, an authorized user of the system, e.g., goods or services promoter, may set the conditions by which an advertisement may be generated and edited, and the system can track the changes as well as the amounts spent per advertisement and per location.

The system may also be configured for promoting the enhancement of promotions and assisting in the conversion process. For instance, when interacting with a generated advertisement, the advertisement may include a "call to action," whereby a potential consumer seeing the advertisement can be prompted to interact with the advertisement in a manner so as to indicate their interest in the advertised product or service. Particularly, the consumer can view the advertisement, can click on an interest box and be taken to a display page displaying the good or service and can then perform a purchase operation. For example, the system may provide a data entry box into which the user can enter data pertinent to the purchase of the product or service proffered. Such information may include, prompts to view a product or service, add registration information, add payment information, select and add a product or service to a shopping cart, add an item to a wishlist, effectuate a purchase, perform a search, and/or at least generate a lead. Other calls to action may be responding to a "contact us," "apply now," "Get Quote," "Learn More," and the like.

Additionally, the system may also track the performance of the advertisements, and my make suggestions based on the determined performance, such as with respect to the selection of advertisement elements that have been scored and been proven to have a beneficial impact, such as with respect to increasing lift, where such analysis may be performed on the corporate or local level. This scoring may be used by the system to rank, order, and select content, both text and image based content, for inclusion within an advertisement, such as an advertisement template described herein. This is advantageous because the system is configured to allow users to quickly reach their top-performing audiences, with their top performing content, within a targeted radius so as to optimize messaging and more accurately determine the return on their advertising investments amongst advertisements and messaging as well as across all locations.

Figure 6:
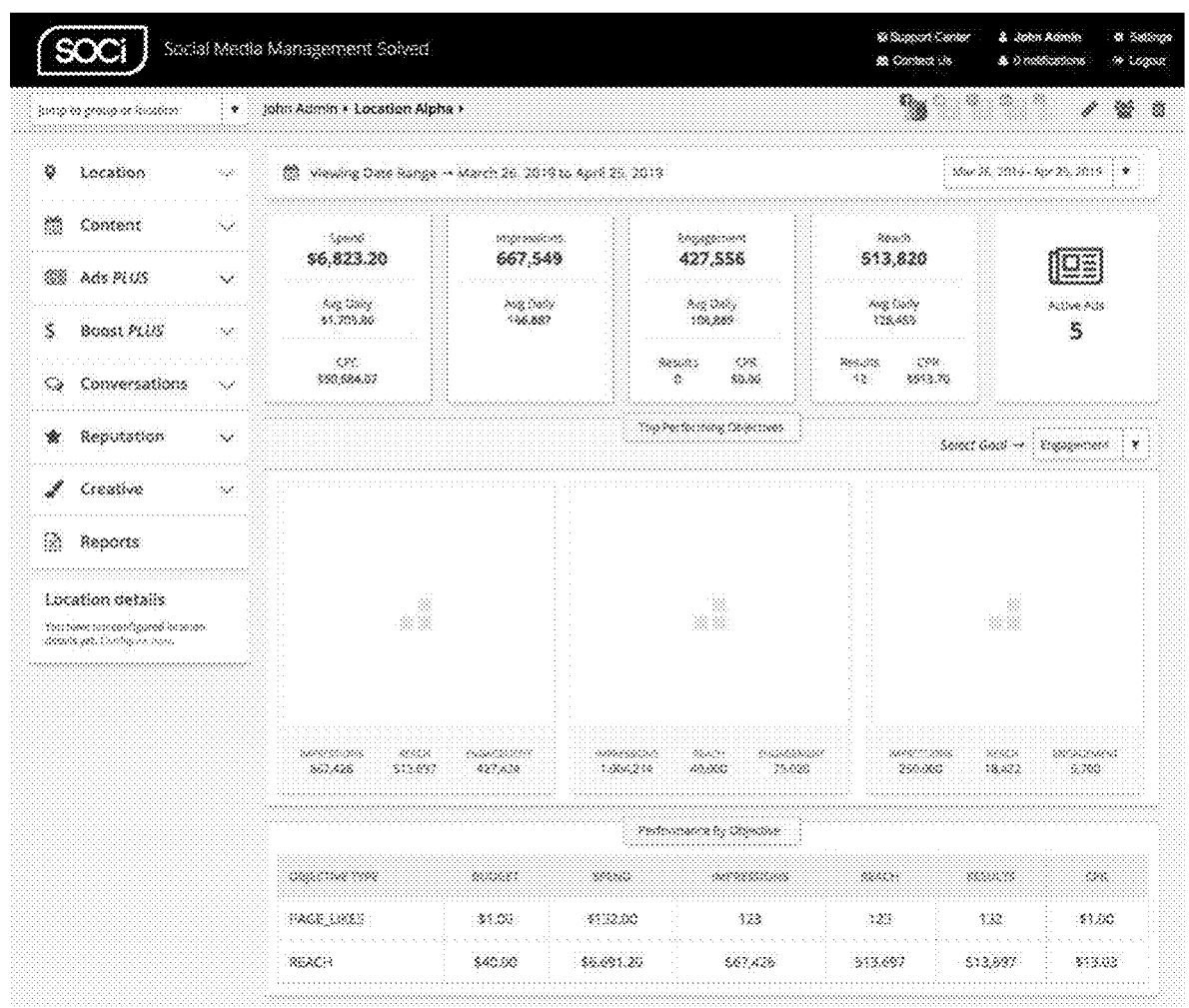
FIG. 6 is a graphical user interface setting forth an analytics module of the system for displaying the results of one or more analysis performed by the system.

In various embodiments, as can be seen with respect to FIG. 6, the system may be configured for collecting, analyzing, and displaying data, such as analyzed content data. For instance, the system may include one or more analytics modules, such as an analytics modules 14, 26, and 29 that include one or more processing engines that may be configured for collecting, analyzing, and presenting the analyzed data. The data may pertain to one or more locations, content information related to a generated and/or distributed advertisement and/or its effectiveness, various discussions being held about the advertisement, the products or services proffered, and/or its audiences, discussions about the advertised company, the reputation of the company, data pertaining to the creative elements, data about ad plus and/or boost functions, and reports generated with respect thereto.

Such data collection and analyses may be performed by a collection of the processing engines acting individually or collectively, such as in a pipelined manner. Particularly, where a system user desires to increase the determined range and/or reach of the generated advertisement and/or lead form, the boost function may be employed to boost the range, e.g., radius and/or reach, of the advertisement. The boost function may also be used to increase the number of recipients beyond a designated preset number of users.

For instance, in various instances, one or more of the analyses to be performed may be presented at the dashboard interface, whereby one or more analytics may be initiated by interacting with one or more buttons designating the type of analysis to be performed. Hence, by a user clicking on the analysis interface, a particular analytic function will be performed by the system. In particular instances, the analytics to be performed may be de-limited by a date range, which range can be demarcated by the user selecting dates on a calendar or entering the dates into a text box.

Once run, the analytics module may generate a dashboard display, e.g., tab, for presenting one or more results, such as results that indicate the amount of money spend per campaign and/or per advertisements, the amount of progress that has been achieved towards one or more objectives of the campaign, such as the number of impressions, conversions, and/or engagements garnered, the amount of reach achieved, the status of reputation being increased or decreased, and the like. The number and/or types of ads actively being run in the campaign may also be presented. In various instances, the successfulness of the campaign with regard to achieving one or more of these objectives can be presented, such as in ranked order. Of course, the manner by which these performances and other results may be displayed in an order selectable by the user. Other objectives may also be displayed, such as with regard to objective type, budget, amount spent, likes, views, conversations, reputation, creative, reach achieved, and/or other results, and the like. Notifications can also be analyzed and displayed.

Specifically, analytics with regard to how an advertising campaign is performing may be presented for review by a user. For instance, various analytics may be generated and displayed such as with respect to performance of the advertisement per designated location, based on its contents, e.g., its particular media elements, the type of conversations being generated based on the communication, how engagement with the advertisement is affecting the reputation of the subject company, and how the creative are performing generally. Additionally, analytics with respect to various in-APP features, such as Ads Plus or Boost, can also be evaluated, scored, and presented for display. Additionally, one or more reports detailing the results of the analysis can also be generated and display via the user interface.

Particularly, as can be seen with respect to FIG. 6, the analytics may be run within a designated date range and with regard to one or more topics, and the results of such analysis can be displayed in one or more view panels. In this instance, an overall spend per ad has been determined, which is further broken down by average daily spend. Likewise, the number of overall and daily impressions, engagements, and reach are also displayed, each in a separate view panel. The current number of active ads being broadcast may also be displayed.

Further still, the system can be configured so as to be automated, and thus, a targeted audience may be pre-set for generation and distribution to all locations or to a sub-set of selected locations, and on all social media modalities, or to a selection of the same. For instance, a preset radius may be defined for each location wherein the radius defines the boundary within which an advertisement will be generated and distributed. Likewise, a preset budget amount can be selected globally or for each independent location. In such instances, with a simple activation, hundreds to thousands to hundreds of thousands of ads can be generated and broadcast nationwide and globally, but in a targeted manner. Additionally, the system may include an analytics module that is configured to compare the performance of various advertisement campaigns having particular advertisements that are distributed to different locations.

Accordingly, in view of the above, provided herein is a multi-location, large scale platform for facilitating complex advertisement campaign workflows. For instance, in a first part, provided herein is a social media directed, content centered workflow that may be implemented for the purpose of finding content, scoring it, getting approval for its use, encoding the content, and then using the content for the generation of an advertisement. For example, as discussed herein, the content may be collected from any number of online websites, webpages, may be uploaded into the system, and/or entered at a user interface, such as presented at a project dashboard.

Likewise, in a second part, the presented platform can be configured for tracking the results of the targeted advertisement, so as to determine effectiveness, such as by following conversations, filtering for keyword use, collecting data pertaining to the evaluations of the advertisements and its contents, and for transmitting the evaluations to a system server of the platform, such as for scoring and storing within the media repository. As indicated, the collected content can be evaluated, scored, and saved as one or more categories and/or list within the repository, so as to allow for ease of searching, selecting, and integration within one or more templates for the purpose of building an advertisement. Further, as indicated, metadata pertaining to the content can also be collected and used to score and rank it.

Consequently, in another aspect, provided herein is a multimedia communication platform for administering an advertisement campaign, such as where the multimedia communication platform includes one or more computing devices, such as a server having one or more CPU and/or GPU cores, and/or one or more client computing devices, where the one or more computing devices may be coupled to one or more memories, via a suitably configured network internet connection. For instance, the multimedia communication platform may include a server, such as a server having a data collection engine that is configured for extracting and obtaining data from one or more web pages.

The collected data may be evaluated, scored, and stored in the memory, such as in a structured format. The memory may be any memory configured for storing instructions for execution by one or more of the data processors of the system. For instance, the memory may be a volatile random access memory (RAM), a FRAM, a ROM, a NAND or flash memory, and the like. The memory may temporarily or permanently store instructions that cause at least one processor, e.g., of the CPU or GPU, to perform one or more of the operations described herein. The instructions may be implemented by one or more data processors either within a single computing system or distributed among two or more computing systems.

In a particular implementation, the memory is configured for storing a plurality of media elements, such as scored media elements, which may include a media template and a media component, where either may have been evaluated, scored, tagged, and stored in a hierarchical manner. Such collected data may include one or more, e.g., a plurality of media components, such as one or more of a text element and an image element. In particular instances, the data collection engine may further be configured for collecting metadata, such as metadata pertaining to the collected data as well as to one or more of the webpage from which the data was collected.

Accordingly, the server may also include a media element evaluation engine that is configured for evaluating the media elements, e.g., components, which in some instances, may be based on a variety of different metrics so as to produce a scored media element, and once evaluated, e.g., scored, the scored media elements may be transmitted to the memory for storage thereby. Particularly, in various embodiments, the metric data may include the above referenced metadata, and the media evaluation engine may be configured for evaluating the collected content items based on the metadata. Further, the platform may include a client computing device, such as may be coupled to the server and associated memory via the network internet connection.

Particularly, the platform may be composed of a computing system that may include one or more servers and client computing device. Such servers and clients are generally remote from each other and typically interact through a communication network. This relationship between client and server arises by virtue of computer programs running on the respective computers, implementing instructions, and having a client-server relationship to each other. Consequently, such computing systems, as described herein, can be connected and can exchange data and/or commands or other instructions or the like, via one or more connections, including but not limited to a connection over a network (e.g. the Internet, a wireless wide area network, a local area network, a wide area network, a wired network, or the like), via a direct connection between one or more of the multiple computing systems, etc.

Particularly, one or more systems of the platform may include a communications module such as a suitable transmitter and/or receiver, e.g., transceiver. For example, a typical transmitter may be a radio frequency (RF) transmitter, a cellular transmitter, WIFI, and/or a Bluetooth, such as a low energy Bluetooth transmitter unit. Specifically, in various embodiments, the server may be a cloud based server having a network and/or wireless internet connection so as to communicate with one or more recipient computing devices, which computing device may be a client computer, a recipient computer, a desktop computer, laptop computer, a tablet computing device, or other mobile computing device such as a cellular phone having online or other computing functionalities.

As indicated one or more of the server and/or the client computing device may be configured for generating an advertisement from one or more collected and scored media components. For instance, in one instance, as described above, the client computing device may include one or more of a project dashboard, which may include a viewer element, an advertisement builder, and an advertisement generation module, such as including one or more generation engines. For example, one or more of the server and client computing device may include, or otherwise be configured for generating, a project dashboard that is adapted for presenting a graphical user interface, e.g., a viewer element, at a display of the client computing device.

In particular instances, the project dashboard may include, or otherwise generate, a project viewer and/or a control interface for allowing a user, e.g., a system operator like an advertiser or a promoter or seller of goods and services, to view and select a media template and a media component for being integrated within the template so as to generate the advertisement. In more particular instances, the viewer element may be configured for displaying the media elements, e.g., during advertisement construction, and/or may be configured for playing the advertisement once constructed and generated. As such the viewer element may be embedded within the advertisement builder and may be configured to render one or more core file types so that the user, e.g., advertisement builder, can edit desired content in the containers. Likewise, viewer element may be configured for rendering content files into a variety formats such as .swf, .pdf, xml, html, txt, and/or other formats, as disclosed herein.

Accordingly, an advertisement builder for accessing the memory, retrieving the selected template and media component, and for building the advertisement, e.g., based on the selected media template and media component, may be provided. In various implementations, the advertisement to be generated may include a collection of slides, such as where the collection of slides include one or more of: a design layer, a design elements, and a container. For instance, the generated advertisement may include more elements than merely the template and media asset. Particularly, the generated advertisement may include a slide class, a slide type, and a slide container, where the advertisement builder identifies the various available slides by their class, which class declares the slide type, and which type declares the slide container. These file designations may be used by the advertisement builder, e.g., via inputs received at the viewer dashboard, for determining the available slide types and for locating the containers within slides. The containers are the elements that reside on the edge and into which the templates are inserted and the media components fetched, such as from the media repository.

Particularly, as indicated, slides may include a grouping of design layers, design elements, and content containers, where the design layers may be predefined, static elements. Nevertheless, the various design layers may be configured to accommodate a plurality of design arrangements of the media elements, collected content, and/or other elements useful for generating and distributing of the advertisement. Such design layers may include background, main, foreground, navigation, and the like.

A plurality of design layers may be included, such as where there may be one or more core design files for each layer, such as a main layer file, a background file, a slide type file, a foreground file, a navigation file, and the like. The number of slide types and core files may vary depending on the class. A class is a unique collection of slide types, where the number of slide types in any given class varies. As indicated, slide classes may be used to organize communication content types, such as by the quantity and type of content displayed at each slide in the class. For example, a template class can have a variety of unique slide types, such as where each slide type includes a defined number of content containers.

In generating an advertisement, the class may be defined, and a determined number of slide types may be provided, such as based on the number needed so as to achieve the design goals and/or objectives of the advertising campaign. However, the total number of slide types should be selected so as to not overload a viewer with too many choices and/or taking up too much band width. Accordingly, a slide type includes a unique collection of media containers, where the number of containers for any given slide type can vary.

Using the dashboard viewer and/or advertisement viewer, a user of the platform can view, fabricate, edit, and comment on advertisements and their components. Hence, through the configurations and functionalities set forth herein the various design layers may be assigned and the templates configured so as to provide the user context within the design so content can be configured and assigned to appropriate containers. As indicated, the various slide types may be employed to organize the quantity and type of content that will be displayed on any given slide. For instance, a text container, an image container, a graphics container, an animation container, and/or a video container may be included, such as where the text container includes text components used for displaying HTML formatted text, the image container includes image components used for displaying images, such as .swf files, and the video container includes video components, such as is configured to display streaming video, and the like.

The text component is positioned inside the core template file as a core design layer that functions to load and display HTML formatted text. Particularly, during the integration process the text component gets positioned into the design layer, is catalogued according to the class XML, and is configured to load and display HTML text content. During reproduction, the text content is typically assigned to a Flash text field. The image component is positioned as a multimedia module, e.g., macromedia file, inside the core template file as another core design layer that functions to load and display images and/or .swf files. As such, the image component may be configured to integrate into any graphic layout, animation schema, and/or other visual effects. The video component may be positioned inside the core template file as a further core design layer configured as a macromedia module that functions to load and display any .flv video. The video component integrates into any graphic layout, animation schema, and/or other visual effects.

In various embodiments, an audio container may be included, such as where the audio container includes audio components that are employed to provide audio, e.g., streaming audio. The user is responsible for the layout of the containers that appear on a slide. The quantities and types of containers for a given slide type are defined in the class XML, file. The system is flexible and allows the user to use the containers in any design arrangement they choose.

Likewise, an advertisement generation engine may also be included, such as where the generation engine is configured for integrating the media component into the template so as to thereby generate the advertisement. Once generated, the advertisement may be transmitted to the memory for storage thereby, or may be configured for immediate distribution, such as where the server and/or client computing devices further include a distribution engine configured for retrieving the generated advertisement from the memory and distributing the advertisement, such as to a plurality of social media modalities in a form suitable for being presented for display thereby to a user of the system. Additionally, in various instances, the platform may be configured for tracking the effectiveness of the advertisement, and thus, may include an advertisement evaluation engine, such as for evaluating the effectiveness of the distributed advertisement so as to produce effectiveness results data.

In particular instances, the advertisement generation engine may be configured for automatically and/or autonomously generating the advertisement. Particularly, in various instances, the advertisement may be generated, either manually or autonomously, in accordance with the users instructions, whereby the project builder implements the received instructions. However, in other instances, the advertisement builder may be configured for automatically and/or autonomously selecting a media component from the memory, e.g., based on its score and/or determined effectiveness results data.

For instance, in various embodiments, the platform may be configured for autonomously generating and/or distributing advertisements. Particularly, the system may implement and/or otherwise use a scoring regime by which to select media elements in generating the advertisement. For example, the system may be configured for using high scoring media elements, such as media components, in the generation of advertisements and/or other communications. In a particular implementation, the platform and/or its systems may be configured for collecting content, evaluating the content and/or scoring it, such as based on metadata collected that pertains to the media elements collected and/or the website and webpages from where they are collected. Specifically, the system may be configured to evaluate the media elements, e.g., the media components, such as based on collected metadata, and may score and rank them for easy storage, access, and use by the system when generating an advertisement or other communication.

More specifically, the AI module, e.g., a machine learning engine, of the platform may be configured to analyze the content items, determine their subject matter, and an inference engine of the system may be configured to evaluate the content for use as an advertisement and/or other communication, and an AI associated autonomous project builder can then generate the advertisement and/or communication in such a manner as to express the same or similar theme to the data collected and/or the source from where it was collected, such as including the same or similar subject matter, tone, look, feel, and the like. In various instances, the new advertisement and/or communication can be generated autonomously or manually into a completely new communication having content similar to, but different from the collected content elements but expressing the same general idea. Particularly, collected and/or scored data may be embedded with code, formed into one or more of a template and/or media component, and can be compiled so as to generate the advertisement.

Accordingly, in a manner such as this, the platform may be configured for promoting the growth of a company, such as by promoting efficient and effective communications, including advertisements, both within the company and to its consumers, such as with respect to implementing a dynamic communication creation and distribution. Particularly, in a further aspect, presented herein are methods for collecting content across the internet, such as including texts, images, including video content, and/or one or more content and/or links, which collected content may be content discussing a product or service, such as in a positive or negative manner, and which content, in some instances, may be of a more personalized nature, such as to include information about the person posting or otherwise uploading the content, such as their personal name, contact information, address, online identifier, and the like. More particularly, through the unique templatized system provided herein, tens, to hundreds, to thousands, to hundreds of thousands of unique advertisements, e.g., ad creatives, may be generated, and via the distinctive containerized infrastructure the uniquely generated advertisement may be distributed globally across all social media modalities. One benefit of the templatization of the ad creative platform disclosed herein is that it allows for multiple objectives to be implemented per ad and/or per advertising campaign, such as by allowing multiple ad creatives to be edited and re-used.

As discussed above, in various embodiments, these advertisements, or other communications, may be generated manually, however, in implementations set forth herein, these advertisements may be generated autonomously, and dynamically, by the advertisement creation and distribution platform disclosed herein, such as in a customized manner. For instance, the advertisement, or other communication, may be customized in a plurality of different manners, such as by setting one or more communication objectives, determining a set of communication parameters, e.g., via the AI module, and/or by setting user preferences for the type of communication to be generated. These elements may be set either collectively, e.g., for an advertisement campaign, or per advertisement.

Particularly, in certain instances, multiple objectives and/or targets may be set whereby the objectives and/or targets can be locked, or not locked, into a single or multiple campaigns. For example, the system may be configured so as to allow each dynamically generated communication and/or advertisement to be substantially instantaneously targeted to identified consumers, such as based on their online usage characteristics, location information, and/or other geographical data. Such targeting may be set on a number of different levels, such as per ad or even at the campaign or multiple campaign set level.

Additionally, the system may be configured for seeking approval prior to and/or for scheduling distribution of the generated communication and/or advertisement. For example, once the communication is generated, the system may be configured for sorting the communication throughout the organization, such as for approvals, prior to sending out the communication to one or more targeted recipients. Likewise, the generated communications, e.g., advertisements, may be sent out immediately upon approval or can be set out in accordance with a pre-set schedule. In certain instances, the generation and distribution may be set in accordance with a pre-determined budget.

In a particular instance, the distribution may be limited to a specific demarcated geographical region, such as where one or more of the scheduling and/or budgeting and/or geographical delimiting may be inter-determinate, such as where the spend decreases as the distance from origin increases, and the like. The system may also be configured for amplifying the brand presence, such as by a suitably configured brand amplifier module.

Particularly, the system, e.g., the project dashboard, may be configured for generating a menu by which the user can select the geographical region within which the communication is to be sent. In various instances, the system itself may be configured for determining an appropriate geographical region within which to distribute the communication, such as based on analytics determined by the system, for instance, where the locations are determined dynamically, e.g., by the AI module, based on what the system determines to be the most likely to lead to an impression, conversion, and/or some other favorable act.

For example, the system may include an evaluation and/or analytics module that are configured for performing one or more evaluations and/or to run one or more analytics on the collected data, the distributed advertisement, and/or one or more components of the advertisement. In various instances, the system may include a tracking element that is configured for tracking and collecting data pertaining to the distribution of the communication, and its effectiveness for producing a result, such as an impression, a conversion, or other action that may lead to a lift in one or more of the same due to the advertisement having been distributed.

For instance, an impression may be determined in a multiplicity of different manners. Particularly, an impression may be determined as the presentation of content, such as a website, or a webpage thereof, that a consumer visits. In certain instances, an impression may be determined by a consumer actually being presented an advertisement and clicking on it. In such an instance, the number of impressions of a particular communication and/or advertisement may be determined by the number of times the particular advertisement and/or page is located and loaded.

Hence, an impression may be determined at that point when an ad loads and displays in front of a user, whereas a click may be the action the consumer takes of actually opening the advertisement by interacting with it once displayed. A click involves a greater investment on the part of the consumer, and is thus, a sign of greater interest. Consequently, an impression may refer to the number of times a communication, e.g., an advertisement or post, is displayed, regardless of whether the it is clicked on. Reach, on the other hand, refers to the total number of people who have seen a presented communication. Particularly, reach may refer to the number of people who see the displayed content, e.g., by interacting with the advertisements, while an impression may refer to the number of times the content is displayed.

Engagement, on the other hand, may refer to the number of interactions people have with the distributed content, such as by commenting on or otherwise engaging with the content, such by likes, comments, shares, retweets, and the like. Likewise, a conversion may be any act taken by a consumer after having been exposed to the communication and/or advertisement, which may be an indication of them having been positively influenced by having been exposed to the advertisement. Typically a conversion may be an act such as clicking on the advertisement and/or visiting the sellers website after having been exposed to the advertisement. Buying the product or services advertised would also be a conversion, e.g., converting a browsing consumer into a purchasing customer.

Particularly, a conversion occurs when a consumer is exposed to an advertisement, and the consumer completes a desired goal, such as visiting the seller's website, filling out a form, and/or making a purchase. The percentage of total consumers versus those that take the desired action, e.g., convert, is the conversion rate. A high conversion rate is indicative of a successful marketing campaign that is capable of influencing the purchasing decisions of others. Determining that the consumer's actions of making a purchase is actually due to having seen the advertisement, and not simply due to a consumer that was likely to make the purchase any way may be determined by a lift analysis. Specifically, in this context lift may be measured as an increase in sales in response to the advertising campaign, and/or one or more of the promotions thereof. Accordingly, the platform and its various systems may be configured for monitoring, measuring, and optimizing lift, so as to determine how any given advertising element of a marketing campaign and its advertisements impacts the conversion rate.

More particularly, a lift analysis may be implemented in a manner so as to measure how the designed advertising campaign impacts one or more key metrics and/or objectives of the advertiser and/or promoter of goods and services. Specifically, a lift analysis may be implemented by the system in a manner so as to determine what effect, e.g., what direct effect, the advertising has on a consumer's decision to purchase the advertised subject matter. More particularly, a lift analysis may be configured in such a manner so as to distinguish those who would have made a purchase anyway, even having not been exposed to the advertisement, from those who made a purchase as a direct, or at least as a proximate, cause of having seen the advertisement, e.g., the advertisement influenced them in making the purchase.

Hence, in one embodiment, one or more of the processing engines disclosed herein may be configured for determining lift due to an advertising campaign, such as where lift may be calculated as the percent increase or decrease in each metric for consumers who were exposed to a new campaign versus a control group. For instance, in a general sense, lift may be determined by calculating a conversion rate for those having seen an impression, in control, and then subtracting that result from a test group that has been exposed to the actual advertisement. The increase result may then be divided by the original (control number), which may then be multiplied by one-hundred so as to determine the percentage increase due to a consumer having been exposed to the advertisement.

In various instances, those in the control group may be presented a public service announcement instead of the advertisement to be tested, or may simply be analyzed to determine if they would have been exposed to the advertisement, and/or having been exposed to the advertisement if they would have been converted. In this manner, the system may be configured to perform a lift analysis, and in receiving the results thereof, may score one or more of the design elements of the advertisement with respect to their individual contribution to the overall lift. This score may then be used by the system, and or its users, when deciding which elements to use in making a decision as to which elements to employ in generating an advertisement.

In various instances, the results of the analytical analyses may be used so as to determine not only what the advertisement should say, but also how it should look, as well as the feel of the advertisement, so as to create custom and/or lookalike advertisements, such as for generating a national advertisement that is catered to a plurality of local audiences. Particularly, along with determining lift, one or more of the system components may be configured for running a multiplicity of analytics of the collected and/or analyzed data. This data may be used in evaluating the collected content, so as to score it, such as with respect to its ability to increase lift in one or more consumer groups.

In other instances, the data may be evaluated in a manner so as to manage the reputation of the advertiser and/or company being promoted, such as by collecting data regarding the results of the advertising campaign, determining if collected content from consumer's evaluations of the advertisements, and its design elements, are either positive or negative, and where positive weighting future use of those design elements more heavily, and where negative decreasing the weighting of them or preventing future use of them all together. Particularly, the platform may include an analytics module configured for performing a plurality of analytics, such as a lift determination, a reputation management system, and for performing one or more other evaluation processes. In particular instances, the system may be configured for using the results of the analyses so as to derive one or more insights from the analyzed data, which insights may be reported to a user of the system, or may be autonomously used by the system so as to better select the design elements of the communications and/or advertisements to be generated. More particularly, the system may include one or more modules containing one or more processing engines that are configured as a reputation manager, an insights generator, and/or a reporting engine.

Figure 7:
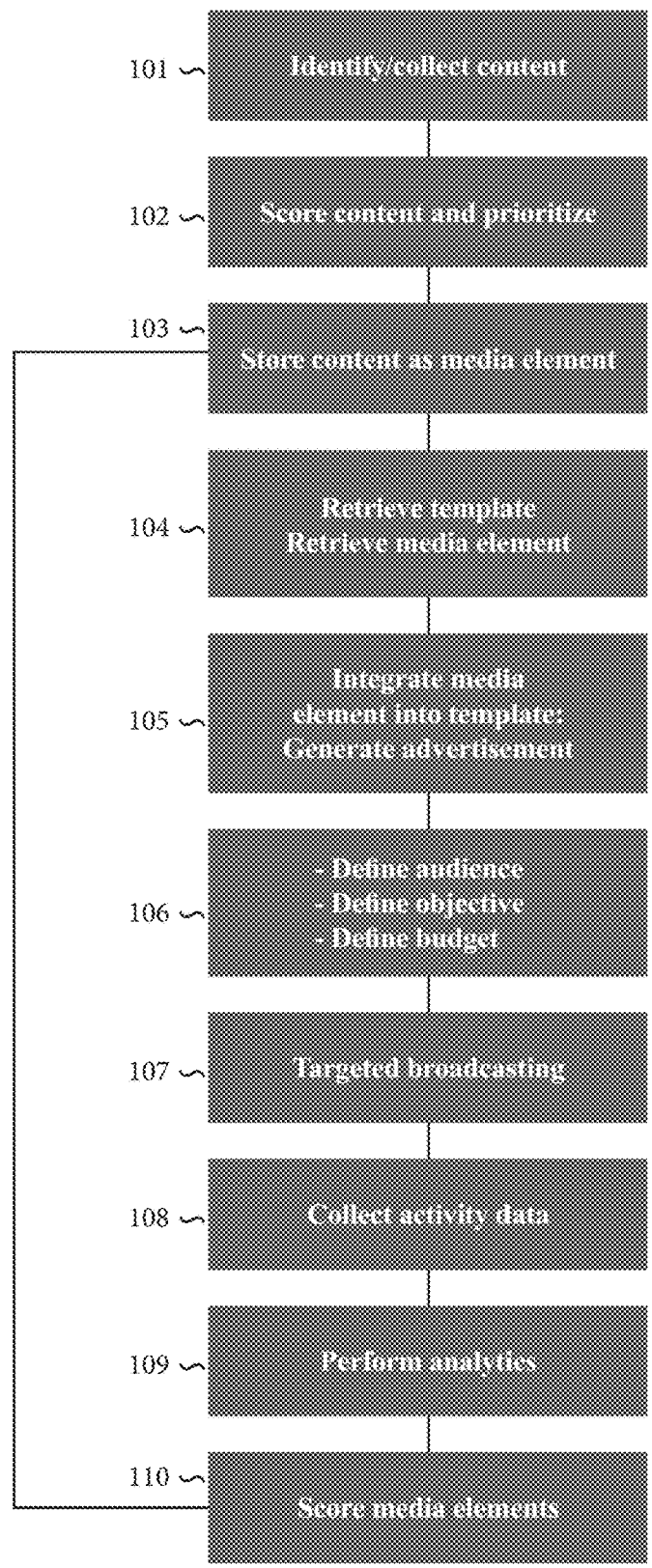
FIG. 7 is a diagram illustrating a method for implementing a series of steps of the system for generating an online communication.

Accordingly, as can be seen with respect to FIG. 7, in one aspect, provided herein are methods for generating and/or effectuating a multimedia communications campaign. One or more of the methods disclosed herein may include one or more of the following steps. Particularly, in a first step 101, online content may be collected, such as from a variety of different content producers and/or online publishers.

Once collected at 102 the content can be scored and can further be prioritized and stored, such as in rank order. More particularly, the collected content can be evaluated for its use as content as a media element. For instance, in various embodiments, the collected content may be scored in accordance with one or more scoring regimes, as described herein below, such as by measuring various different engagement factors by which the collected content can be evaluated. Particularly, the engagement factors to be considered in scoring content may include one or more looks or views, comments, shares, likes, clicks, impressions, conversions, transactions, lead generations, other engagements, and the like.

Then at 103 the content can be tagged and/or stored in a manner so as to make searching, review, and/or approval for use as a media element, such as a template and/or a media component, easier. Hence, at 104 the methods may include one or more of selecting and/or retrieving the stored media elements, and at 105 may include integrating the retrieved media component into the retrieved template, so as to generate the advertisement. The methods may further include embedding one or more of the media elements and/or components with coding so as to effectuate efficient integration of the media rich component into one or more containers of the template, such as via compiling the corresponding coding.

For example, during this process, such as at step 106, the methods may include defining one or more of an audience to whom the advertisement is to be delivered, setting up and/or defining an objective for the advertisement campaign, and allocating a budget for each advertisement of each advertisement campaign. Once the advertisement has been generated, at step 107, it may be broadcast, such as in a directed and targeted manner.

Additionally, in various embodiments, at 108, the methods may include collecting data about how the advertisement is received by consumers, such as for determining its effectiveness. Consequently, data pertaining to consumer's comments about the content, and/or the actions they take, or do not take, when exposed to the advertisement may be collected and analyzed. For example, the method may include collecting various different types of potential consumer activity data, such as data related to one or more of impression, clicks, conversion, engagement, and/or other data may be collected and analyzed, such as in a manner for determining lift, e.g., incremental lift, due to a consumer having been exposed to the advertisement.

So being, at step 109 the method may include performing one or more analytics procedures, as described herein, on the collected data, such as with regard to the performance factors of the advertisement employed content and/or the collected or otherwise determined activity data. Specifically, at step 110 the methods may include using a determined value, such as a determined or predicted lift value, so as to score the media element of successful and/or non-successful advertisement elements. One or more scoring methodologies, as described herein below, may also be performed at this time, so as to determine the effectiveness of a given advertisement or other communication for achieving one or more defined objectives, as discussed herein. In various instances, one or more of these method steps may be implemented by one of more servers and/or computing devices of the platform.

For instance, in a particular embodiment, the methods disclosed herein may include employing a server, or other computing device of the system, for the purpose of generating an input screen at a graphical user interface of a display of a client computing device, such as where the client computing device is coupled to the server computer via the Internet. Particularly, the method may include generating and/or presenting a project dashboard to the input screen of the graphical user interface, such as where the project dashboard includes, or otherwise generates, one or more controls for allowing the user to view and select the media template and the media component for integration therewith. Hence, the method may include receiving, e.g., from an input of a user, a selection of a media template and a media asset via the controls of the project dashboard.

In various instances, the project dashboard and/or an input screen thereof can be configured so as to present a collection of media templates and a collection of media components to a user of the computing device. The media components may include one or more text elements and/or one or more image elements, which may be presented to the user for selection thereby when generating a communication such as an advertisement. In particular instances, the text and image elements may be analyzed by one or more other system components so as to generate a score for one or more of, e.g., each, of the text and/or image elements and/or template elements. Hence, in various instances, in generating the advertisement, the highest scoring media elements may be selected for use in producing the advertisement to be distributed.

Accordingly, in certain instances, the media elements may be configured for presentation to the user in ranked order, where the order is determined by the score, e.g., where the score represents the effectiveness of the media elements and components. Accordingly, in certain embodiments, the method may include evaluating, e.g., by the server computer, the collection of media components, and storing the plurality of media components, such as based on one or more metrics, so as to produce the scored media components that may then be transmitted to the memory for storage thereby.

The method may further include receiving, e.g., at the server computer, via the input screen of the graphical user interface, the user selections for the template and a media component, such as where the template and media component are accessible on the graphical user interface of the client computer. Additionally, the method may include compiling, e.g., by the server computer, the selected template and the selected media component so as to generate an online advertisement. In various instances, the advertisement to be generated may simply include a template and one or more media components, such as a text or image component, such as where the image component may include an image, video, or the like. In particular instances, however, as described above, the advertisement may include a template architecture that may be configured to include a plurality of slides, such as a slide defined by one or more of a grouping of design layers, design elements, content containers, and the like.

Further, the method may include formatting, e.g., in one embodiment, by the server computer, the online advertisement. For instance, the advertisement may be formatted according to an electronic distribution format that may be specified by the user at the graphical user interface. Particularly, the electronic distribution format may be selectable from a set of options, such as an electronic mail, a web page, a post, a banner, an electronic brochure, a text ad, a mobile ad, an in-stream ad, an in-video ad, an animated video file, an expandable video file, and an animated file for display on a computer. Hence, the advertisement may be formatted so as to be displayable on a desktop, laptop, tablet, and/or mobile phone computing device.

Further still, the method may include distributing the online advertisement, such as over the internet, generally, and/or specifically to a social media modality for publishing thereby. In particular instances, as indicated above, the method may include evaluating the effectiveness of the advertisement for increasing one or more metrics, such as with respect to increasing lift.

More particularly, in one particular embodiment, a method is provided whereby a user of a client computing device may be provided a list or menu of options that are presented at a graphical user interface of a display of the computing device. The menu options may be interactive so as to allow the user to scroll through a list of preset menus and thereby choose from a variety of options for configuring the system. For instance, the menu options may include a list of online advertisement categories that demarcate a number of different goods and services types from which a given option may be selected. Likewise, a menu may include a list of different commercial industries from which the user may select a given choice. A variety of different categories may be presented so as to better allow the user to determine the types of media elements they desire to select from for generating an advertisement.

In various embodiments, the computing device may be coupled to a remote server, via a communications network, and thus, the method may include receiving, by the server computer, one or more selections made by the user, via the graphical user interface, of the various different menu options. For instance, the server may receive the user's selection for an online advertisement category type, from the menu of category types, and/or a selection of an industry type from a list of industry types. Multimedia data pertaining to either of these or any other menu selectable options may also be provided.

Additionally, in various embodiments, the method may include providing, e.g., by the server computer via the display of the graphical user interface of the client computing device, a menu of options of online advertisement styles, such as where the advertisement styles may be associated with one or more categories of multimedia data, such as data characterizing each selection of the online advertisement style associated with a category of multimedia data. In such an instance, the method may further include generating, e.g., by the server computer, an online advertisement having data presented according to the online advertisement style associated with the selected category of multimedia data, such as where the data of the online advertisement may be embedded on an online advertisement template that has been identified by the server computer based on the selected online advertisement category and the selected industry.

Further, the method may include formatting, e.g., by the server computer, the online advertisement, such as in accordance with a selected distribution format specified at the graphical user interface. In such an instance, the electronic distribution format may be selectable from a set of options of: an electronic mail, a web page, an electronic brochure, a text ad, an image ad, an ad for display at a desktop computer, a mobile ad, an in-stream ad, an in-video ad, an animated video file, an expandable video file, an animated file, and the like. The method may also include broadcasting the online advertisement, such as on the internet and/or for display at a social media modality.

As indicated above, in various instances, the communication and/or advertisement may be produced in a manner so as to be composed of a collection of slides such as a grouping of design layers, design elements, and content containers. In such an instance, the method may include employing an advertisement builder and/or a dashboard viewer so as to display the slides with auto-play on or auto-play off, such as when building the advertisement and/or when displaying the advertisement after distribution. Particularly, the method may include generating a dashboard viewer for allowing a user to view both the advertisement template and the media component on the graphical user interface.

Figure 8:
FIG. 8 is a diagram illustrating a user interface produced by an advertisement building dashboard of the system for use generating an online communication.

Specifically, as can be seen with respect to FIG. 8, in various embodiments, an advertisement dashboard and/or project viewer 22 may be provided. The presented dashboard 22 is useful for configuring, administrating, and managing advertisement campaigns on both a national and local level, such as with regard to dynamic advertisement content generation and incorporation into an advertisement, audience and location targeting, and for providing the tracking and evaluating of advertisement effectiveness. One or more notifications or suggestions may also be provided as a result of one or more analyses being performed on any of the collected data.

In such instances, as can be seen with respect to FIG. 8, a dashboard is presented, wherein the dashboard may be configured for receiving user inputs, and may be employed for setting up and running an advertisement campaign, and/or for generating an advertisement. So being, the dashboard interface may include one or more menus of options. For instance, a selection of general campaign characteristics may be presented and selected from such as in a drop down menu. Such campaign characteristics may include one or more of naming the campaign, selecting one or more campaign objectives, defining a target audience, determining a budget, e.g., an ad per spend, as well as for selecting one or more images and generating one or more texts to be employed in generating the advertisement. For these purposes, one or more templates may be selected via this dashboard interface into which the one or more texts or images, or other media rich content, may be dynamically integrated.

Particularly, one or more prompts for entering data may also be included. For example, a prompt for naming and/or otherwise describing an advertisement campaign can be presented such as at a graphical user interface of the dashboard. More particularly, a drop down menu for selecting one or more campaign objectives for the advertisement campaign and/or advertisements may be presented. Further, a plurality of advertisement accounts from which to distribute the advertisement via one or more social media modalities may be presented, such as where an account menu is provided, which menu may include a number of different social media and/or other accounts.

A drop down menu including a variety of targeting options may be presented, such as where various of the targeting options may include one or more demographic indicators, audience characteristics, and/or geographic limitations. A further drop down menu and/or prompt for selecting or otherwise entering one or more budgeting limitations may be presented, such as where the drop down menu includes a selection as to how the allocated budget is to be proportioned, such as in an evenly or non-evenly distributed manner, and a prompt for entering the amount to be spent, such as per ad or for the campaign generally, may also be presented. A prompt for entering the length of time during which the campaign is to be run, and the budget to be allocated, may also be presented. A date range during which the advertisement campaign is to be run and/or by which the budget is to be expended may also be selected from this interface.

A search for content items, such as media rich elements can also be performed, and the results thereof can be displayed in a menu of results that fit one or more of the search criteria. Accordingly, as can be seen with respect to FIG. 8, a variety of collected content items or available pre-built advertisements, such as collected and/or scored advertisements or texts or images, e.g., photographs, videos, or the like, may be presented, e.g., in response to a performed search query, to a user at the advertisement dashboard for selection thereby. Once the media assets and/or templates have been selected, an advertisement may be generated and may be presented for selection. In such an instance, once an advertisement campaign has been set up, e.g., the target audience and/or demographics have been determined, the geographical region limited, and an advertisement selected, the campaign can be initiated and the advertisement may be distributed. In this instance, six advertisements have been identified as fitting the search criteria and are made available for selection for use in running an advertisement campaign. Although the preceding was described with respect to advertisement selectable campaign features, one or more of these steps may be automated and or effectuated automatically by the system, such as by an AI module of the system.

Figure 9A:
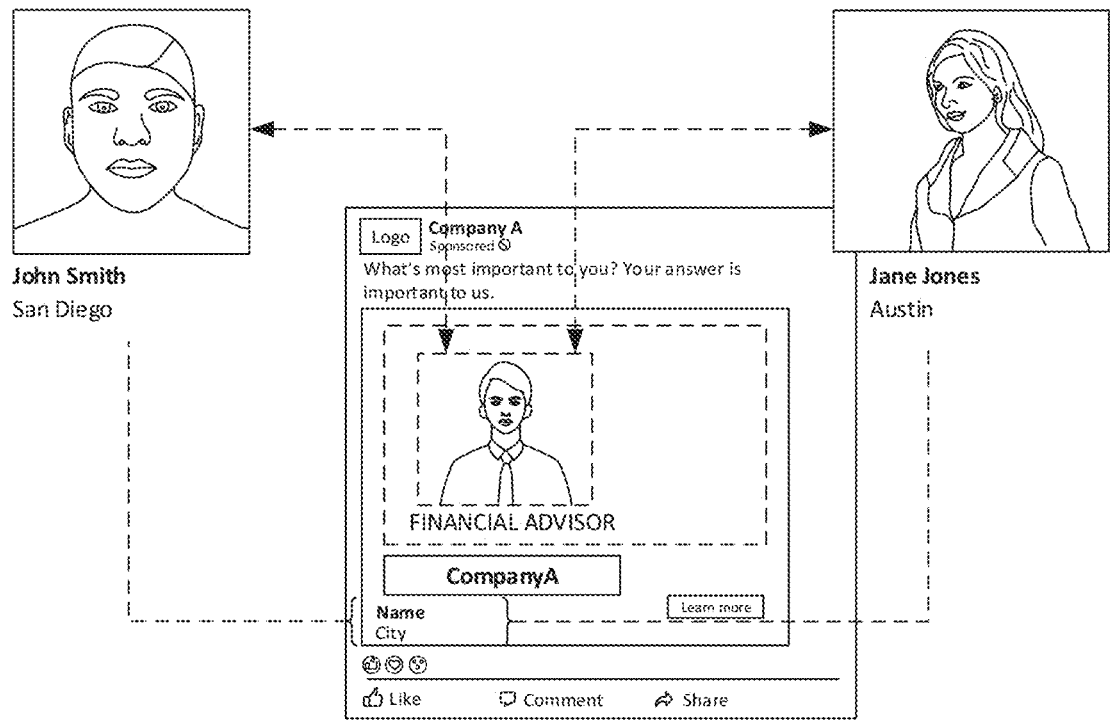
FIG. 9A is a diagram illustrating a media integration module for generating an online communication.
Figure 9B:
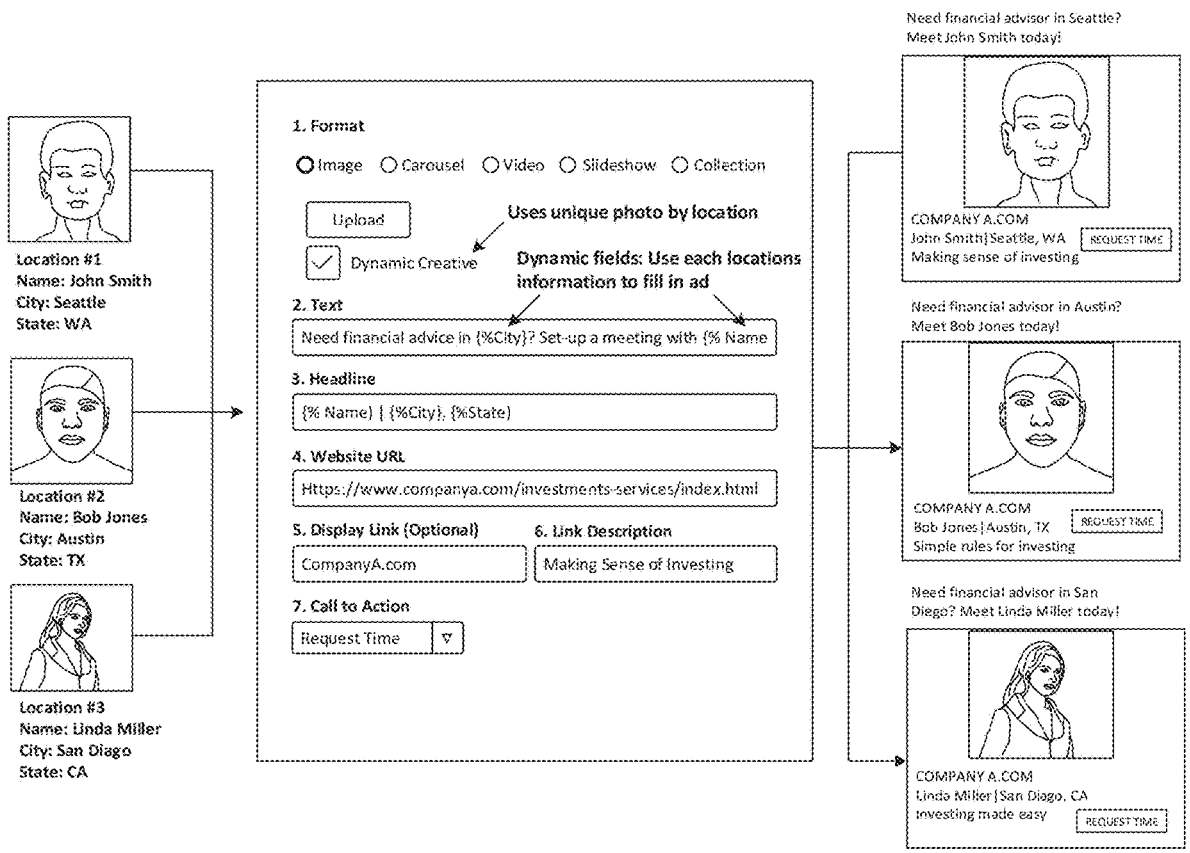
FIG. 9B is a diagram illustrating another iteration of a media integration module for generating an online communication.
Figure 9C:
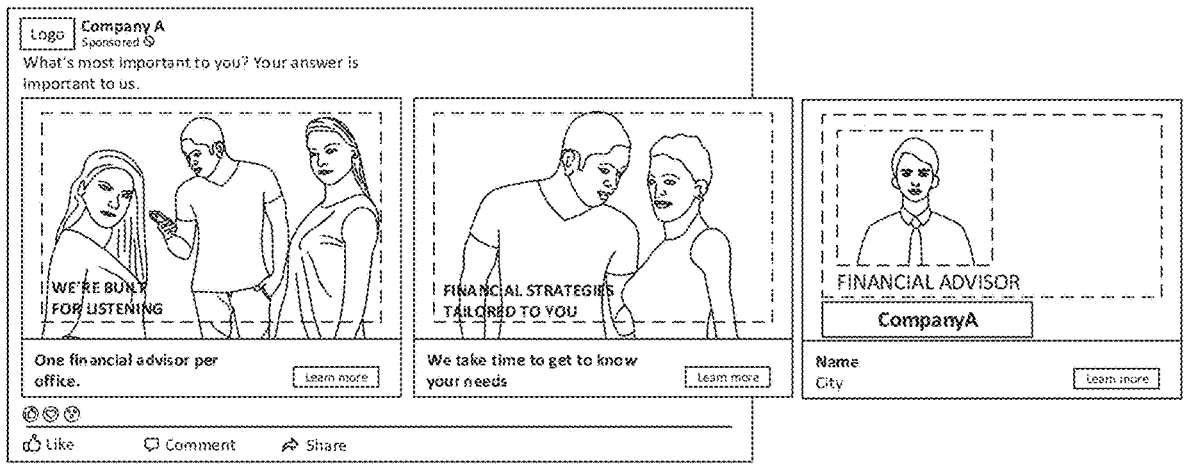
FIG. 9C is a diagram illustrating a user interface for generating an online communication.

For instance, as can be seen with respect to FIGS. 9A-9C, the computer and/or server system of the disclosure may include an advertisement generation module that may be implemented for the autonomous and/or automatic generation of advertisements. Specifically, the system may be configured with dynamic creative-check on or off. Particularly, because of the containerized and templated manner by which the advertisements are generated and distributed, the system may be configured to both generate and broadcast advertisements dynamically, on the fly, and substantially real-time, which advertisements may be individualized and distributed to hundreds and thousands or even hundreds of thousands or more of recipients, such as simultaneously.

For example, where dynamic ad creative generation is on, the system may be configured for autonomously generating an advertisement from a plurality of collectable and/or selectable texts and images, such as dynamic texts and images. In various instances, such texts and images may be collected and/or selected dynamically for automatic entry into a generated and/or selected template for the building of an advertisement. Specifically, the system may include a variety of different libraries that may be stored in one or more system databases. For instance, the system may include a library of collected, scored, functionalized, and/or embedded advertisement creatives, which library may store collected and/or generated content for use in building an advertisement, such as collected, generated, and/or uploaded image and text files. The system, therefore, or a user thereof, may select or otherwise designate which elements of which libraries are available for use in generating the advertisement. Once designated, approved material, such as materials stored in the designated libraries having a higher than a determined baseline score, may be selected for use.

As depicted in FIG. 9A, an advertisement template having a plurality of containers is presented, into which one or more media assets, e.g., images and/or text, may dynamically be called and integrated. Specifically, presented herein is a universal template, having a global look and feel representing the national branding, and further the template includes a container into which individualized images that are particularized to each local market. For instance, in this embodiment, the images selectable for incorporation into the template are digital photographs, which can be collected, generated by the system, or uploaded by a user. However, in other instances, the images may be a video image, and in certain instances an image and/or video carousel may be provided. In such instances, the image data to be employed may be functionalized by the system, such as for media rich advertisement generation. Accordingly, as can be seen with respect to FIG. 4A, the system may be configured for dynamically selecting an image, such as from an image repository, embedding the image with coding, e.g., so as to generate a media rich image component, and for incorporating the image into an advertisement template, e.g., a template architecture having a container including corresponding coding to the embedded image. The system may do this autonomously or in response to user inputs.

Further, in response to selecting and integrating images into the template dynamically, the system may be configured for selecting and integrating dynamic texts into the template. Specifically, as indicated in FIG. 9A, a variety of local images may be selected from one or more local repositories, where each image may be integrated into a particularized container of a universalized template. For example, where thousands of images from thousands of local markets are used to generate and distributed thousands of advertisements substantially simultaneously, such as where the generated advertisements all have a common template organization, with a common look and feel, but each advertisement includes particularized, and localized images and messaging.

Particularly, in various embodiments, descriptive texts characterizing the localized images and the services or goods to be offered may also be inserted, e.g., called, into the template, such as a name and city of the local franchise, the name and title of the franchisee or employee thereof, and a description of the goods and services may all be collected by the system and/or retrieved from a library thereof, encoded, and inserted into the template so as to build an advertisement, and once generated the advertisement may be distributed such as across one or more social media modalities. In this embodiment, three different images from three different franchisees of a national brand serving different localized markets are presented, where each individual image can be substituted one for the other in the template, thereby generating three different advertisements from the same universal template. It is also noted that the descriptions for each image may also be changed dynamically as well.

As indicated above, the images and textual content for selection and integration into the advertisement may be encoded and selected in accordance with one or more campaign objectives. For instance, the system may be adapted for allowing a user and/or the system itself to evaluate content, such as for its use in building advertisements, and may further be adapted for evaluating the generated and distributed advertisements and their component parts. In particular embodiments, the evaluation may be made in accordance with one or more determined advertisement campaign objectives.

For example, one or more of the advertising content and/or the advertisement itself can be evaluated with respect to its ability to achieve one or more of the determined objectives, such as advertisement objectives, based on their ad creative and campaign. Such objectives may include one or more of increasing brand awareness, enhancing reach, generating better impressions and conversions, improving engagement, increasing page likes, web traffic, image and video views, web traffic and web conversions, as well as generating leads. These objectives can be selected on an ad-by-ad basis or may be selected amongst one or more groupings of ads, such as with regard to previously run ad campaign. In this manner, the system can guide the user as to the basic and advanced rules governing advertisement generation process.

An exemplary embodiment for using the dashboard for setting up an advertising campaign and/or generating an advertisement is set forth in FIG. 9B. As can be seen with respect to FIG. 9B, the system is adapted for selecting and/or providing a template and a media element for building the advertisements, such as a static or dynamic text or image element that may be imported for integration into the template. For instance, in this embodiment, a listing of available images from available locations for generating advertisements are set forth, on the left-hand side of FIG. 9B. Likewise, presented in the middle of FIG. 9B is a selection of menus presenting options for configuring the advertisements to be generated. Particularly, as can be seen with respect to FIG. 9B, a variety of menus and text boxes are provided, such as an image selection menu, e.g., for selecting a format of single images, a carousel of images, and/or videos, which can be uploaded via the dashboard interface.

In this embodiment, a dynamic functionality for the images and texts options can be designated, whereby the system will dynamically select the images and/or texts to be employed with building the advertisements. This dynamic functionality can be free-range, e.g., fully automated, or can be bounded by instructions received by the user. Likewise, along with the images to be selected, one or more text boxes for generating, selecting, and/or entering texts to be incorporated into the advertisement are also provided. For example, a text box for entering freeform language, or for providing a menu of prefabricated messaging, may also be presented. In this instance, a combination is provided where messaging meant to be universal is entered into the text box, and a prefabricated code language, e.g., for dynamically entering particularized messaging, is also entered into the text box.

Particularly, the individualized language includes the city's name, the employee's name, and a headline text box may also be included. However, in other instances, a variety of universal and/or individualized messaging content can be included, such as for inclusion within a text box and/or for use as a headline. A website universal record locator (URL) text box, a link to be displayed text box, a link description text box, and/or a call to action text box may also be included. In various instances, the links and calls to action can either be entered free hand or can be selected from a menu of predetermined options. The universal and individualized advertisements generated by the system for preview by the user are presented on the right-hand side of FIG. 9B.

Accordingly, the presented advertisement dashboard is configured to generate a project viewer for not only previewing the advertisement elements to be selected for building an advertisement, but also for selecting the parameters of the advertising campaign. For instance, the project viewer may allow a user to preview and select advertisement objectives, define a budget and allocate how it is to be dispersed, e.g., set a custom budget per ad or entire ad campaign budget, and to select a duration for the advertising campaign. A call to action may also be defined, and one or more accounts from which to implement and run the campaign may also be selected.

As can be seen with respect to FIG. 9B, the system may include an image repository, such as for storing user or system images that can be selected for incorporation into an advertisement template. In particular embodiments, the image repository may include a variety of images that can be scrolled through for selection and integration, such as a figure of a local business owner or franchisee to be promoted by the advertisement. As depicted, the project dashboard may present one or more menu options whereby the user can select the image format for an image to be selected. The image format option may provide a list of formats, such as a standard image format, a carousel format, a video format, a slideshow option, a collection option, and the like.

Likewise, the system may include a static and/or media rich text and/or image repository such as for storing collected or generated image and/or text data. For example, as indicated in FIG. 9C, a set of other text and image based options by which a user can set forth others of the various parameters guiding the advertisement building process may be presented. Specifically, in addition to the image and image format options, one or more of a text option, a headline option, a website URL option, a display link option, a link description, a call to action, and/or other selectable options may be presented, such as to guide the advertisement building parameters. Particularly, as set forth in FIG. 9C, a set of three exemplary FACEBOOK® advertisements generated by the system are provided, where both dynamic images and texts have been selected and employed by the system during the generation process.

In view of the above, a variety of parameters may be selected by the user and then may be employed by the system in building the advertisement or other communication. For example, the selected parameters may not only guide the selection process, but may also determine the configuration of the advertisement. Accordingly, in addition to the image format option, the system may allow a user to use collected or constructed images, or may allow the user to upload usable images, including videos. As indicated, the system itself may generate the advertisement autonomously, by itself, or with user input.

Figure 10A:
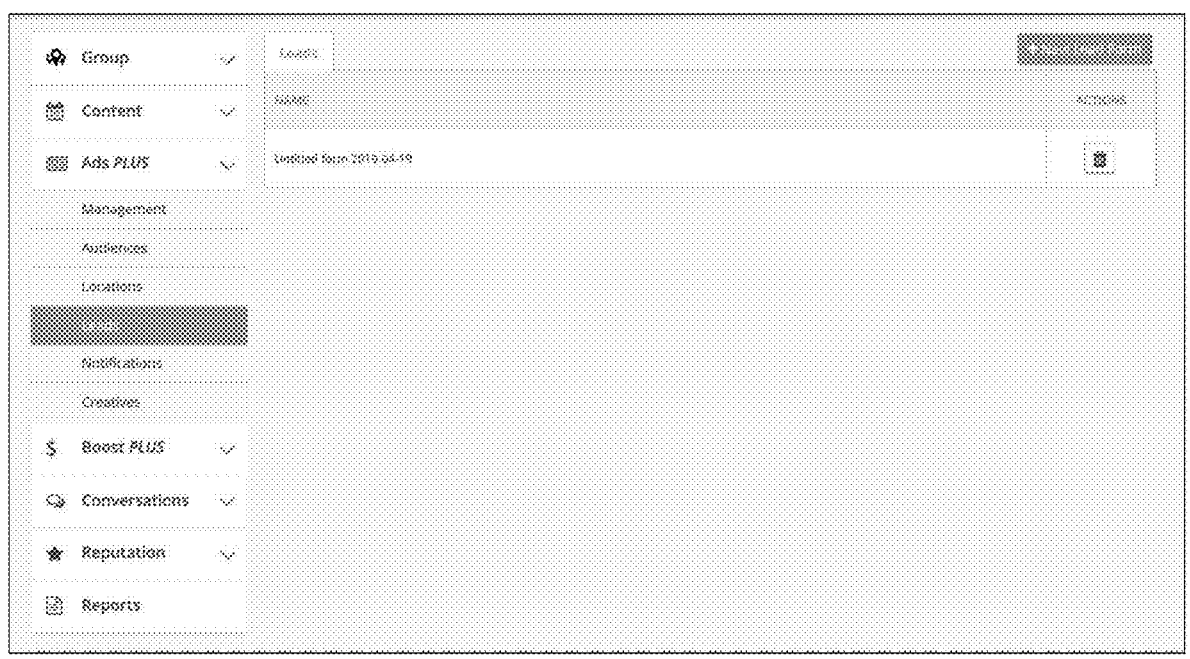
FIG. 10A is an exemplary dashboard interface for setting up a lead generation interface.

Additionally, in various embodiments, as can be seen with respect to FIG. 10A, the system may be configured for not only creating and distributing advertisements, but may also be configured for promoting or otherwise eliciting a response, such as an impression and/or a conversion. In particular instances, the system may be configured for eliciting a call to action and/or a lead, such as for lead generation. Particularly, in various embodiments, the system may be configured for generating a dashboard interface that is configured for making it easy for our users, such as system administrators or advertisers, to create and manage leads, e.g., at scale. In certain embodiments, the lead generating advertisements may be configured so as to facilitate the efficient collection of information about and other data pertaining to potentially interested consumers.

Specifically, in various embodiments, the system may be adapted for producing a lead generation feature whereby the lead generating feature will make the lead generation process more efficient, such as by moving away from the typical page-by-page assessment, and moving toward an assessment process that mines data across 1000's and 1,000's of pages at once, which was not previously possible. At the same time, the present system allows users to export leads at the group level, thereby saving the user having to download leads on a page-by-page basis. More particularly, presented herein is an advertisement layout that includes an interactive lead generation interface that once interacted with takes the user to a form into which data may be collected, across all forms, conglomerated, and analyzed collectively, e.g., at scale.

Figure 10B:
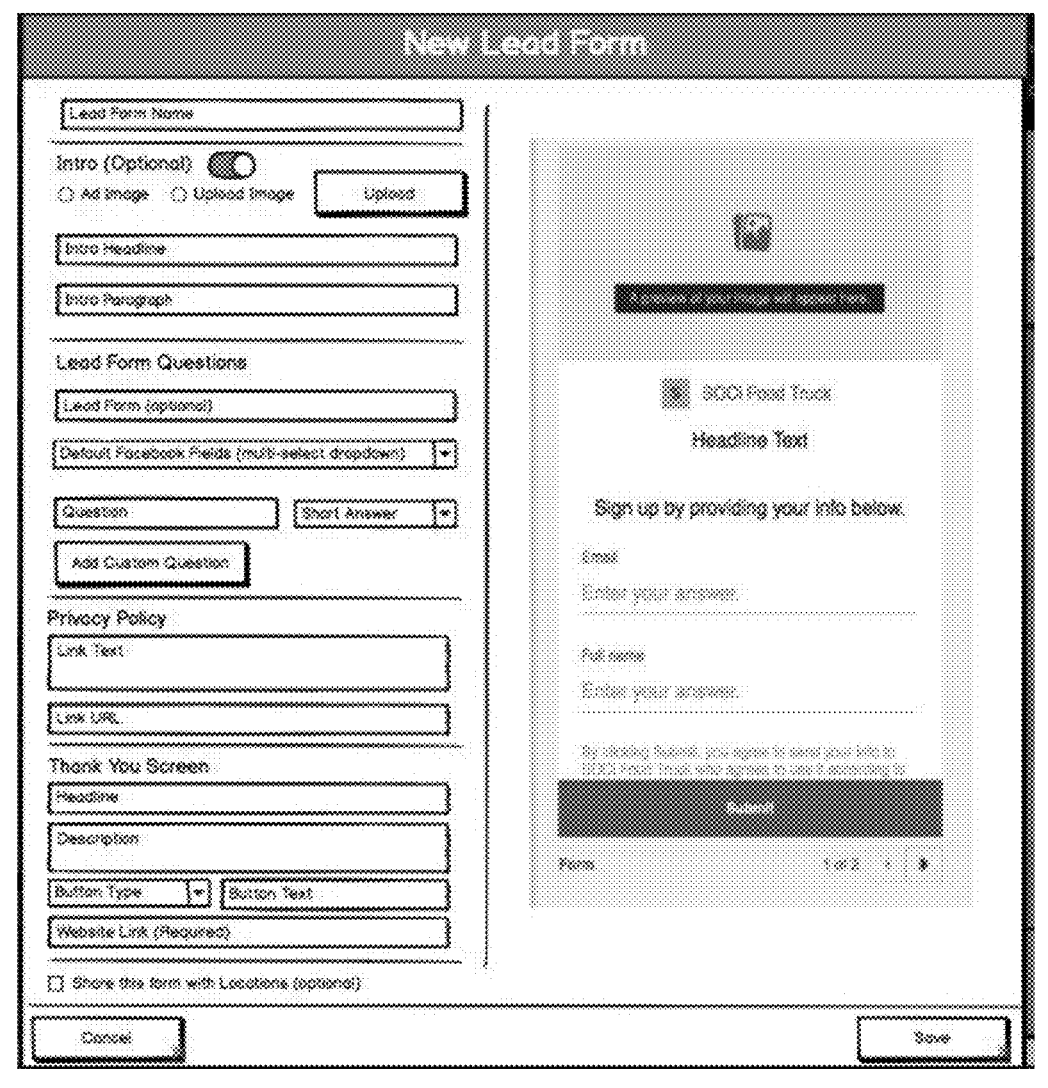

For example, as exemplified at FIGS. 10A and 10B, the lead generation form may be an electronically generated interface that allows a consumer to enter information pertaining to their level of interest in a proffered product and/or service. Such information may then be collected by the system, stored in a database, analyzed, and the results can be aggregated, viewed, and can be flagged for follow up by a later user of the system. Particularly, the lead generation form can be configured so as to elicit from a consumer any information desired to be known. Consequently, the form may include one or more determined interrogatories that are generated in order to receive the input of information of interest to the user.

Likewise, the data collected may be analyzed with reference to a multiplicity of parameters. In this manner, the lead generation forms may be customized to the business at the corporate, e.g., account level, and/or localized level. Particularly, in a manner such as this, a single template may be generated whereby the template is generalized so as to include media elements featuring data pertaining to the central office of the corporation, but may also be generated in a manner that the template includes particularized information that is pertinent to each of the localized franchisees of the corporation. Hence, when a potential consumer views the generated form, the form has a corporate look and feel, but has design elements, e.g., images and texts, which are particularized to the environment of the local franchise, thus, making the form appear to be less generic and more specific to the needs of the local consumer.

In various embodiments, the digital lead forms generated herein can be created, at real time, across thousands of advertisements being published at a variety of social media platforms, all using one or more templates and employing a variety of centralized and de-centralized images and texts, rather than having to be created on a page by page basis. A particularly useful feature of this embodiment is that it may be configured for utilizing the present dynamic image and text technology for customization and localization of each form of the advertisement so as to be customized to a large variety of specific locations. For instance, the system may dynamically generate interrogatories and localized images that are of particular interest to a local business owner, and/or may also be of interest at the corporate level, all of which can be employed in generating an electronic lead generation request that can be distributed by the system.

For instance, as can be seen with respect to FIG. 10A, the lead generation from can be configured at the account, group, and/or local level, a search of a database for content can be made, e.g., via a suitably configured toggle, and various different control mechanisms may be set. For example, one or more toggles can be set such as for the purposes of managing the generation and distribution of the lead generation form, such as in response to triggering events, selecting audiences and locations to be targeted, as well as for setting the parameters by which notifications are to be sent and/or received. The various ad creatives can also be searched and toggled through so as to format the appropriate media assets for use in a lead generation template. Additionally, a series of control parameters can also be set from the lead generation interface, such as for setting an Ads Plus and/or a Boost Plus feature for enhancing and/or increasing distribution of the lead generation form in response to triggering events, and further for tracking the success or effectiveness of the lead generation form, such as by tracking its use within online conversations, tracking comments that increase or decrease its reputation, and for generating one or more reports of the online trends being provoked by the generated and distributed lead forms.

Accordingly, once the advertisements are created and published so as to be viewed by online consumers, an interactive lead generation interface, as presented at FIG. 10B, may be presented to the online user, whereby if the consumer is interested in the advertised product or service, they can interact with the interface. In such an instance, a lead generation form may be created and provided to that consumer for engagement there with. Once the form is created, such as via the interface provided at FIG. 10A, and distributed to a consumer, the consumer can then interact with the form, as exemplified in FIG. 10B, and enter the requested information as desired. Any question the answer of which is of interest to the business being advertised may be generated and included in the form, such as name, age, other demographics, contact information, interest level, credit information, billing information, mailing address, and the like.

Once the information has been entered it can then be transmitted and exported to the local and/or central office. The collected information may then be used to generate more particularized advertisements that can be targeted to the consumer and/or for following up with them, such as by phone, email, text, and the like. For example, in such instances, leads can be exported and downloaded from the account, group, and/or individual level across 1000's of social media pages, e.g., simultaneously, at once, or more strategically, such as at a determined time of high traffic.

In particular instances, the lead forms can be generated, can be published, as either part of the advertisement, or as a stand alone communication, and the results thereof can be collected. Once collected, the results can be analyzed and shared, and used to more efficiently modify and reproduce new more particularized lead generation forms that can be created and employed either on the account, group, and/or individual level. Likewise, the consumer engagements generated thereby, e.g., conversations pertaining to the distributed communication, may be shared with individual locations so as to be exported and/or downloaded, and used at the individual location level, such as for lead follow up. In this manner, each location can follow up on the generated leads that are most pertinent to their local markets. Further, a reputation feature may also be included whereby content and conversation pertinent to the advertising entity can be identified, tracked, collected, and evaluated, e.g., when activated. This increases efficiency in the system as it allows the most interested parties to follow up on the most interesting leads as quickly as possible.

Particularly, with respect to configuring a lead generation form, as can be seen with respect to FIG. 10B, a system dashboard may be configured for presenting a lead generation interface that may be employed so as to set up a lead generation form. For instance, the lead generation form may be configured by the user interacting with the system so as to create an interactive advertisement that is constituted to generate a lead form such that when the posted advertisement is interacted with by a potential consumer, the lead form is distributed. The generated lead advertisement is presented in the view panel of FIG. 10B as rendered.

More particularly, the lead form set up module, presented on the left hand side of FIG. 10B, may have a variety of interactive text boxes and drop down menus by which the user may configure the lead form, as represented at the right hand side of FIG. 10B. For example, the lead generation form may include a name, description, and/or questionnaire entry prompts, an image generation prompt for uploading or otherwise including an image within the lead form, as well as a call to action button, which call to action may be adapted for eliciting one or more desired actions from the consumer. The dashboard of the lead form set up module may further include a preview screen for illustrating what a prototypical lead form will look like once generated.

Specifically, as can be seen with respect to FIG. 10B, the lead generation form may employ fields that may be particularized to the user, or may utilize the same fields that are typically employed by the social media platform. Hence, the fields may be dynamically generated instance by instance. In either situation, the particular fields of the form to be employed may be generated dynamically. As depicted, the lead form generation engine may include a headline and introductory paragraph text box and/or dropdown menu, such as where the text body may be provided for entering free hand content into the box, which content can be incorporated into the lead form template upon advertisement generation. Likewise, a drop down menu box may be provided, such as where previously deployed, e.g., high scoring content, may be provided for selection by the user as a headline and/or introductory paragraph. In various instances, the system may suggest content for use in these regards.

With respect to FIGS. 10A and 10B, one or more lead form questionnaire menu boxes may also be provided for customizing and building the lead generation advertisement form. For instance, various different form formats may be selected from a dropdown menu, and various different distribution channels for broadcasting the advertisement across one or more social media platforms may also be presented. Likewise, various menus for configuring the advertisement for distribution and display on the selected social media platform may also be presented, e.g., once the platform toggle has selected the desired distribution platforms.

One or more question text boxes and/or menus may be provided for engaging the potential consumer with one or more questions selected to be of interest to the consumer. One or more short answer prompts can also be provided, so as to allow the consumer recipient to easily answer the question. The questions may be such that they are configured for allowing the system to determine the level of the recipient's interest in the proffered product and/or services, such as via one or more of their responses in answer to the displayed questions.

Additionally, the lead form generator can also have an interface by which free-hand questions can be entered into a text box. Various corporate messaging may also be provided and entered into the template, such as with respect to providing a privacy policy, a corporate, franchisee, and/or user link, a URL, and the like. Further, a personalized messaging screen, such as a "Thank You" or other salutation screen may be provided, such as for providing a greeting or salutation to the recipient, such as for their interacting with the lead generation form. The salutation may include a heading and a message or other description, and thus, the lead generation form may provide a text box or menu for selecting the appropriate salutation content. As indicated above, the various texts and images to be included in the form may be uploaded and/or may be generated dynamically. In a manner such as this the consumer experience vis a vis the lead generation form may be catered and/or particularized to each consumer and/or to each locality to which the advertisement is being distributed.

Figure 10C:
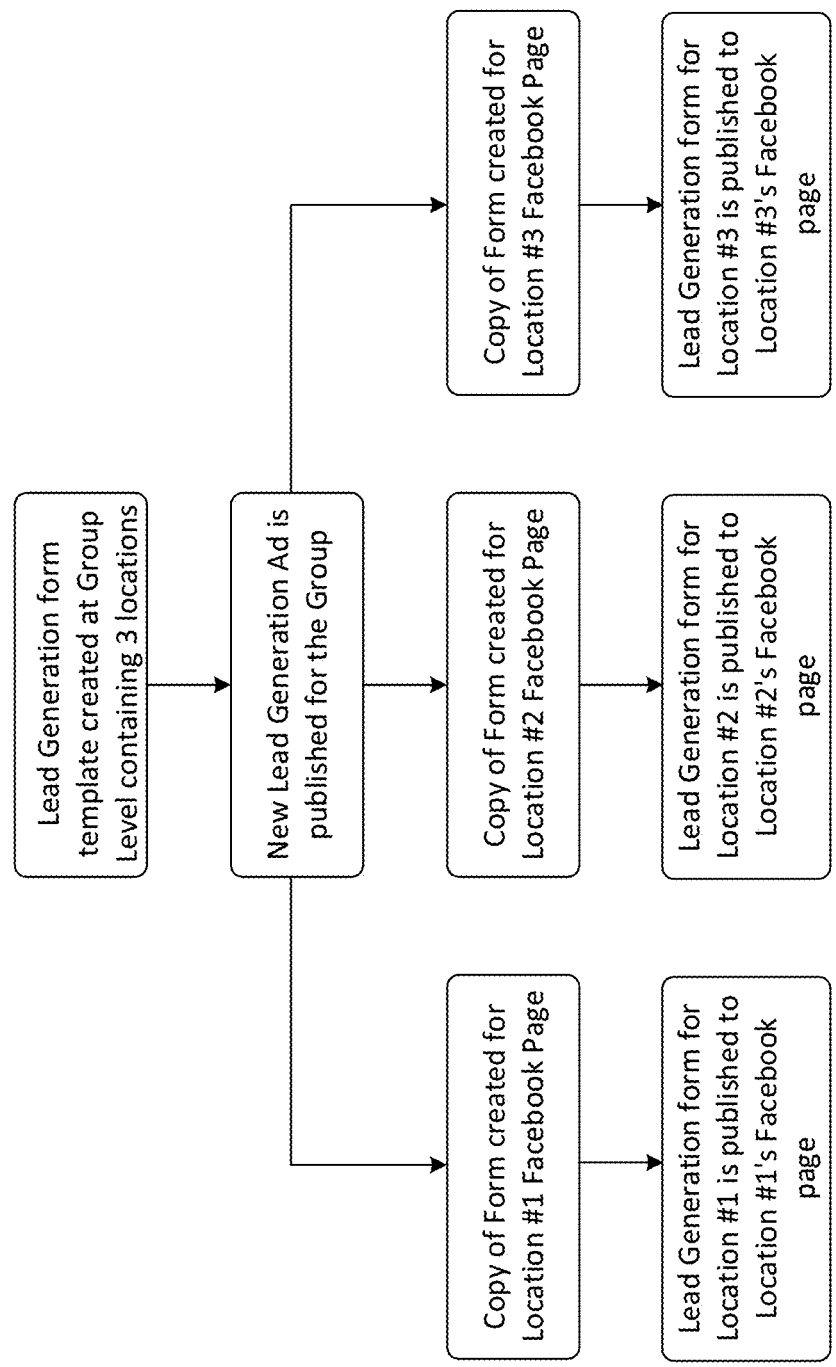
FIG. 10C is a process diagram illustrating an exemplary lead generation methodology of the disclosure.

Accordingly, FIG. 10C sets forth a typical process for producing a lead generation form. As indicated above, the lead generation form may be generated from an initial template that may be adapted so as to be employed at the account, group, local, and/or individual location level, e.g., at a level including one, 2, 3, or more locations. The lead generator may be configured as an interface that can be interacted with as part of the process of publishing the advertisement, e.g., where the advertisement is to be published at the account or group level.

For instance, the lead generation form may be part of an advertisement, may be associated with an advertisement, or may serve the function as an advertisement in and of itself. As exemplified, the lead generation form may be created in a manner so as to be particularized to each location it is distributed to, in this instance, 3 locations, e.g., Location #1, Location #2, and Location #3. In such an instance, the generated form may be particularized to each of the three locations, such as representing three different individual and/or localized locations being published on a single or different social media platforms.

Accordingly, as set forth at FIG. 10C, the present technology allows the system users to create a singe form at the account or group, which may then be distributed to all of the locations within the group, such as at the location or even individual level. For instance, although the template may be generated at the account and/or group level, each individual lead generation form may be particularized at the location or individual level, such as where users or the system itself may be enabled to create a form specific to their individual locations. For example, a universal template having a generalized corporate theme may be employed, but the template may have defined containers that are configured for calling local media assets, e.g., image files, that may be representative of each different, particularized location. Further, once a form has been generated, it may be published immediately and/or it may be stored in a database, such as in a categorized library, for later viewing and/or use. In this instance, the generated lead advertisement for each location is posted on designated, location specific FACEBOOK® pages, but it could also be formatted to be used on other Social Media platforms, such as TWITTER®, INSTAGRAM®, and the like.

Figure 10D:
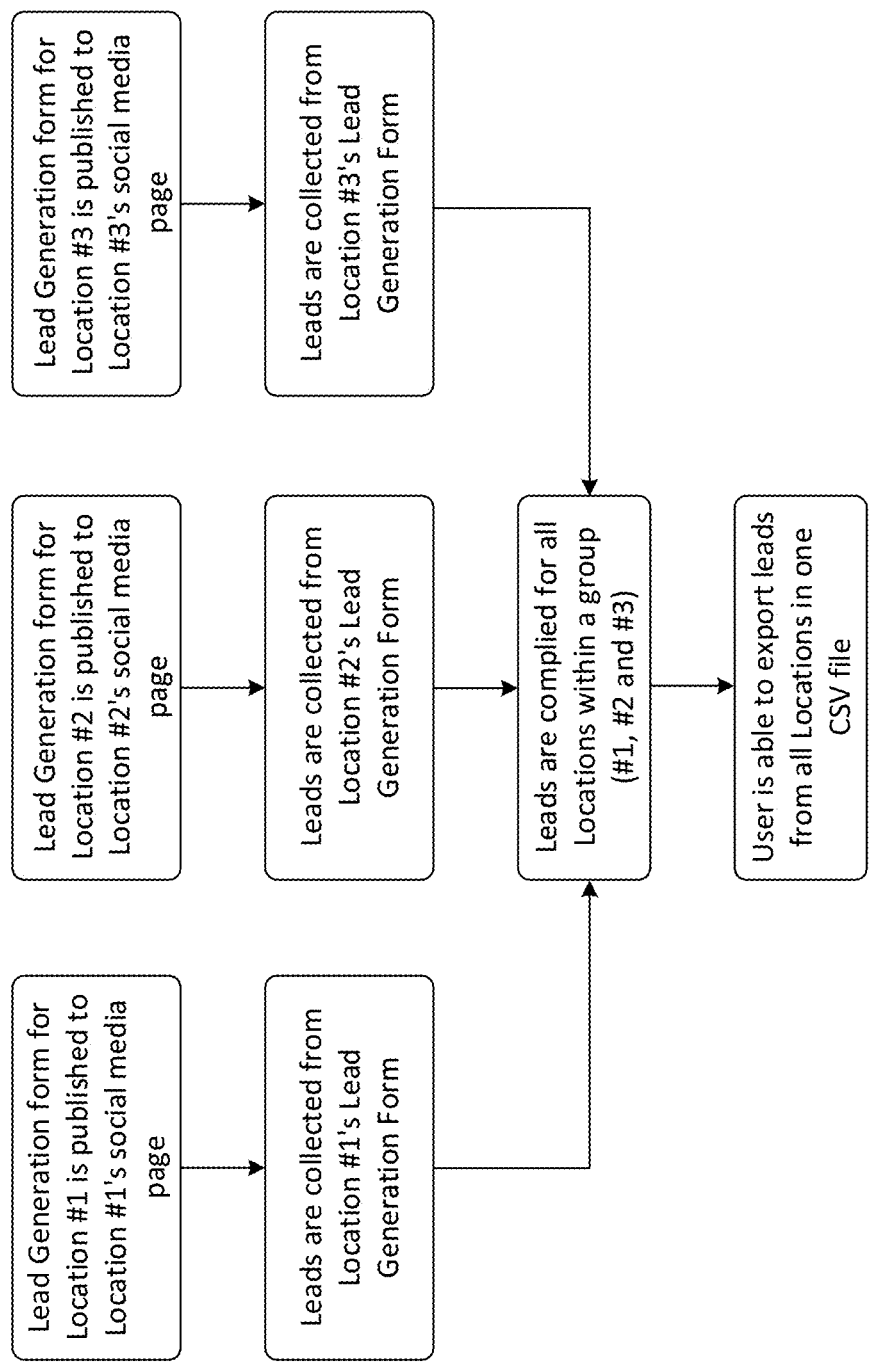
FIG. 10D is another process diagram illustrating an exemplary lead generation methodology of the disclosure.

In particular instances, at FIG. 10D, once the lead generation forms have been created, published, and interacted with by various consumers, the data that is collected from each localized form may be collected and aggregated from each individual social media platform for each location that is part of the group. In such a manner, each lead represented by each form may be downloaded and aggregated together, as opposed to having to download each page on a page-by-page process across all social media platforms. For instance, as exemplified in FIG. 10D, a particularized lead generation form may be distributed to a plurality of localized locations, e.g., 1, 2, and 3, whereby the data generated by a recipients' engagement with each of the lead forms may be collected and aggregated from all locations. In such an instance, the system user is enabled to export leads from all locations, along with the data specific to the lead generation, interaction, and collection, which may be presented at a single user interface, such as in one CSV file.

Figure 10E:
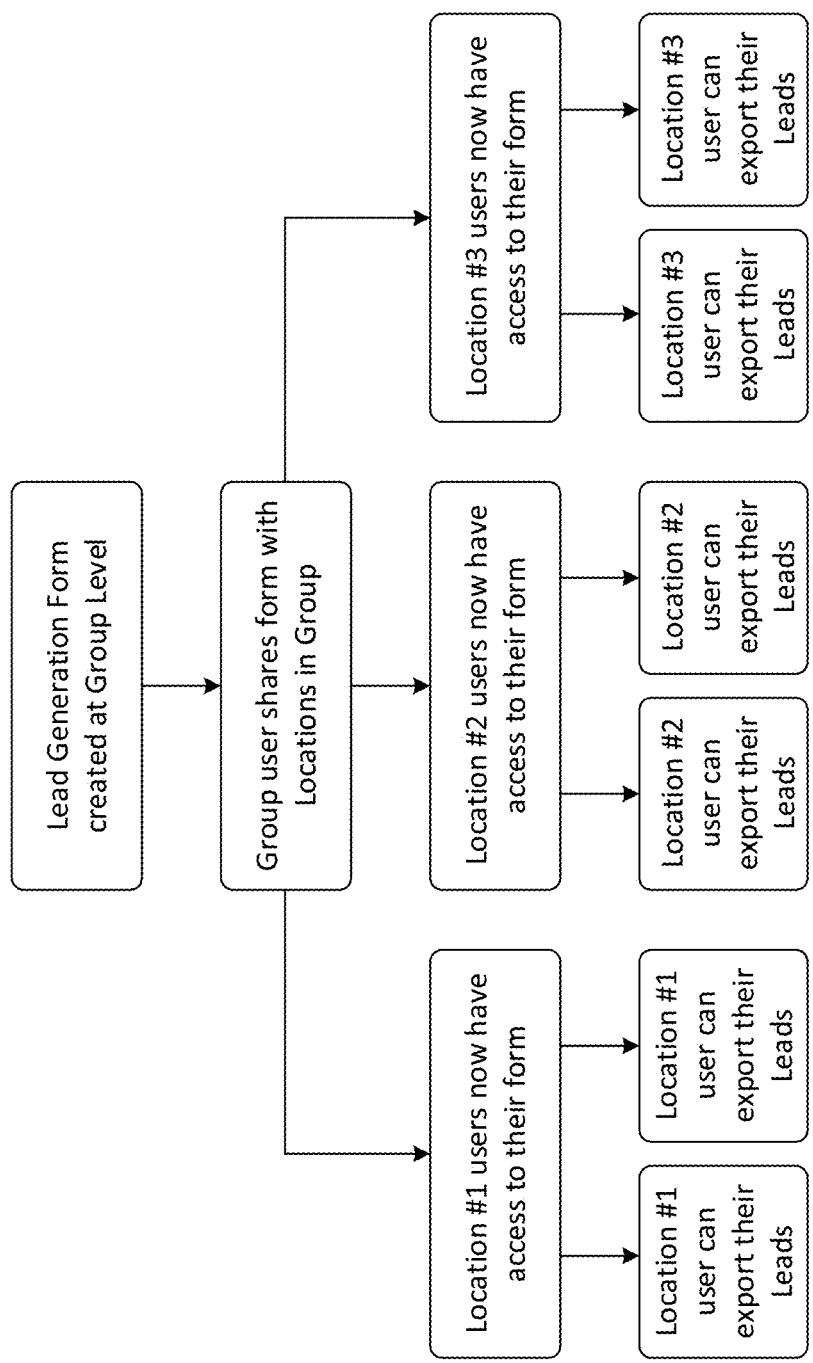
FIG. 10E is a further process diagram illustrating an exemplary lead generation methodology of the disclosure.

Further, as can be seen with respect to FIG. 10E, the system may be configured for sharing the data collected, such as by account, group by group, or location by location. Particularly, using the system, a group level user may be enabled to create one or more lead generation forms at the group level, which forms may be particularized for all locations in a group. In such an instance, the data particularized to each location may be shared at the group and/or individual location level. For example, in one embodiment, an advertisement may be generated at the group level, but may include a lead generation interface that is particularized to the localized location level, and in such an instance, the leads generated from the advertisement may be shared at the corporate level, where the corporate personnel may follow up on the generated leads, and/or may be forwarded to each particularized individual location, for following up at the local level. Hence, group level users can choose to share those forms with each particularized location, so that they can manage the leads for their location and/or use that form in their own ads.

Figure 11:
FIG. 11 is a graphical user interface setting forth an analytics module of the system for displaying the results of one or more lead generation analysis performed by the system.

Furthermore, at FIG. 11, to make management and analysis of such diverse leads easier, the dashboard may generate a management interface that can make following and analyzing leads easier. The interface may categorize the forms generated, as to whether they are basic or particularized, whether the consumer demarcated they wanted follow up information, and if so, whether they requested a follow up day or time, and/or whether they indicated their level of interest or made a purchase. Additionally, the lead management interface may also include one or more analytic results, such as the number of leads generated, e.g., per location, the cost spent, e.g., per lead, and the actions that were taken by the consumer, and/or the actions that can be taken by the system administrator with respect to the generated leads, such as for exporting, sharing, copying, and/or deleting the leads generated. In various embodiments, only the forms that are accessible to the user may be displayed. In various embodiments, the interface may be configured for allowing an administrator of the system to manage, respond to, and track the lead generated by the advertisements, and where those leads are successful in turning into an impression and/or a conversion, or other engagement.

As indicated above, in one aspect, the devices and systems of the disclosure may be configured for performing one or more analysis on collected and/or generated data. For instance, in various embodiments, the system may be configured for collecting data, such as from one or more web pages of one or more web sites, such as from one or more user's thereof, where the data may be collected, scored, and used for a variety of purposes within the system. For instance, in particular embodiments, the collected data may be categorized, scored, stored, and made available for use as a template and/or media asset in the generation of an advertisement and/or lead generation form. Likewise, once an advertisement, which may include a lead form, has been generated and/or published, the system may elicit one or more inputs from a recipient thereof for the purpose of evaluating the published advertisement, such as with respect to achieving one or more objectives of an advertisement campaign.

For example, the method may include distributing the generated advertisement to a social media modality for posting or publishing thereby, and may further include collecting data pertaining to the effectiveness of that advertisement for achieving one or more objectives of a relevant advertising campaign employing that advertisement. Particularly, the method may include the performance of an evaluation, such as where the evaluation may include performing a scoring methodology on the advertisements, and/or one or more of its component parts. More particularly, in one aspect provided herein is a scoring methodology for scoring an advertisement and/or one or more of a media asset, such as a template and/or image that forms a component part of the advertisement.

Specifically, a scoring methodology may be employed so as to provide an advertiser or brand representative thereof a relatively objective scale by which to determine and/or otherwise measure the effectiveness of an advertisement campaign. In particular instances, the scoring regime may be configured so as to give a measurement of prospective consumer engagement with generated advertisement or other messaging content. Particularly, content used in an advertisement or other communication, e.g., transmitted to a consumer, may be scored so as to determine a consumer response such as a metric of how well a given communication is performing with respect to achieving a determined metric, such as engagement.

As indicated, the communication can be one automatically and/or autonomously generated by the system, or may be generated by a user thereof, such as on the account, group, and/or local levels. For example, the communication may be one generated by an advertising agency working for a corporate customer whereby the ad agency is employing the system to generate, upload, and/or distribute a communication, such as for distribution, e.g., posting, across one or more social media platforms. In such an instance, the system may collect the various data as to how that communication, once posted, is performing in accordance with one or more metrics. However, in other instances, the communication can be generated using the system by a corporate client or business owner themselves who can generate their owns posts and share them. Hence, any number of users within an organization may be authorized to access the system to generate and/or distribute a communication with the appropriate permissions and/or approvals.

Figure 12A:
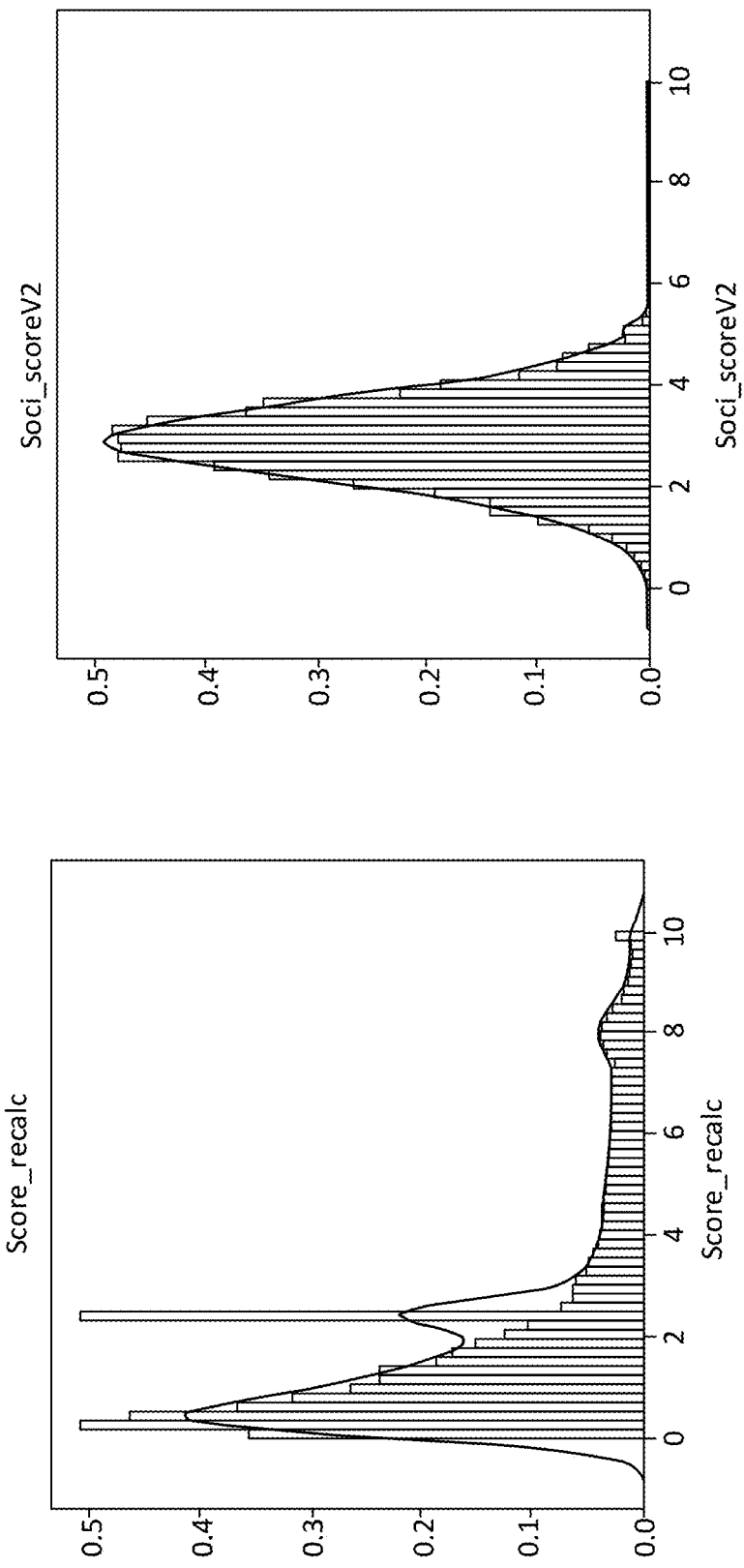
FIG. 12A is a graph of a content scoring regime whereby the results are not dynamically formulated.
Figure 12B:
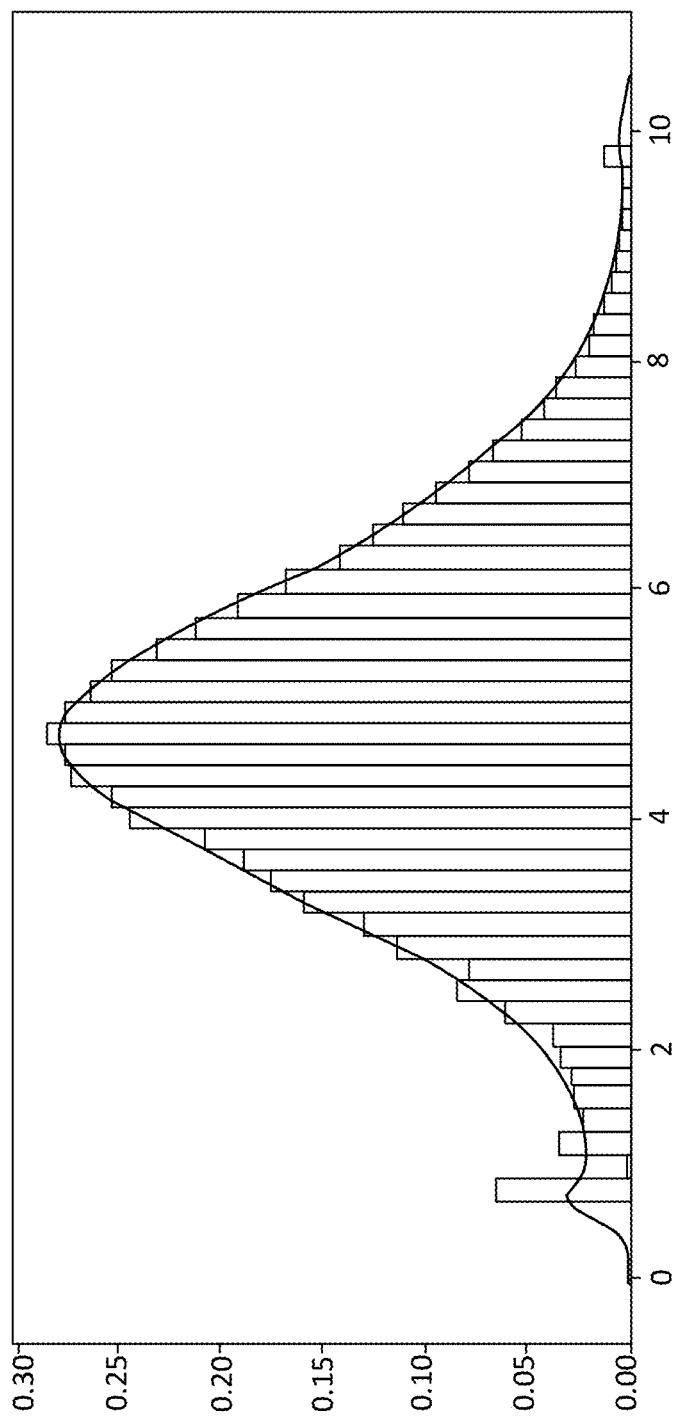
FIG. 12B is a graph of a content scoring regime whereby the results are dynamically formulated so as to center the curve between values of 4 to 6.

Once posted, a number of data can be collected and used as one or more metrics for determining one or more parameters of a posting, such as for scoring effectiveness. In a manner such as this, varying levels of engagement may be determined, metrics may be individually weighted to normalize the relevant factors, and can be used to generate a score for a communication. In various instances, as can be seen with respect to FIG. 12A, dependent on the weighting employed, the scoring may be skewed toward a low or high end of a scale. Scoring, however, can be problematic, e.g., without normalizing, because it may not provide one an ability to clearly distinguish performance between posted communications. Hence, it would be useful to employ a scoring modality that is configured so as to increases the range of results such as in a manner to from a bell curve distribution, such as centered around a score of 5 or 6, as depicted in FIG. 12B, which can be used to quantify effectiveness in a more meaningful manner.

Accordingly, a wide variety of metrics may be used for achieving this goal. For example, a given communication can perform well by receiving a lot of positive feedback, such as likes, upvotes, +1s, shares, re-posts, comments, shares, and the like, whereas a bad posts may receive very little if any of this engagement. These types of metrics can form the boundaries for measuring engagement. Difficulty, however, exists between receiving no engagement and a large amount of engagement, which may be relative to a determined parameter.

One particular performance standard for measuring the effectiveness of an advertisement is virality. Virality can be used as a measurement for how widely a posted communication is seen, viewed, and/or engaged with outside of a given user's defined social network. Virality is a good metric to determine because when generating and posting content, it can be somewhat expected that someone within a given poster's network would see, view, and/or engage with the posted content, which engagement may be more a reflection of the poster, rather than the content. However, engagement with the content from those outside of a poster's given network may be a greater reflection on the effectiveness of the content of the post, rather than the popularity of the poster. Hence, a measurement may be made of people who saw the add and/or engaged with it or not, inside of a network, which may be given a first weight, and then a second measurement may be made of people outside of the network who saw the add and/or engaged with it or not, which may be given a second weight, such as where the second weight is greater, lesser, or equal to the first weight.

In a manner such as this, local, group, and/or global virality may be determined, such as with respect to internal versus external viewing (e.g., in network versus viral impressions), engagement (e.g., in network versus viral conversions), and ultimately virality over all. And as indicated, virality can be measured with respect to the account, group, or local level, and may take account of various different metrics, such as views, likes, upvotes, +1s, sharing, forwarding, reposting, commenting, and the like, so as to give various different measurements of aspects of engagements and/or stories. Additionally, engagement may be measured based on the number of times a post is engaged with, by how many unique users engage with the content, how many engage and then come back for further engagement, and the like.

Accordingly, a measure of a poster's internal (e.g., inner social circle) metrics, e.g., engagements, may be determined, and a further measure of the poster's external (e.g., viral) metrics, e.g., engagements outside of their social circle may be determined, and each measurement may be given a same or different weighting, such as where the measurement of external factors is given increased weighting than those corresponding internal factors. Various of the different metrics, e.g., likes, shares, comments, etc., may be used to perform the measurement, and may also be given greater or lesser individual weight, based on the type of engagements being measured. Such metrics and weighting may be varied, such as based on the various different recipient classes of the communications and the extent of recipient interaction with the communication, such as being classified as an in-network or out-network recipient, and whether the recipient merely view or actually engage with the communication, such as by liking it, voting for it, sharing or reposting it, commenting on it, or simply just viewing it, and the like.

Essentially a number representing a local, non-viral, measurement may be obtained, and a number for an external, viral, measurement may be obtained, and then they may be normalized and weighted, e.g., where the external virality is given a greater weight than local, they may be normalized and then the results may be converted to a log scale, such as by a factor of two to ten, so as to generate a wider, more bell-shaped distribution, where the average peaks out at about 4, 5, or 6, such as depicted in FIG. 12B. With respect to internal and external data used to rate a post, the type of measurements to be used as various metrics may be weighted and normalized so as to generate a rating having defined minimum and maximum values, which weighting and normalization may depend on the type of datasets collected and used in the measurements, and whether the measurements are centered on in circle, e.g., fans, or out of circle, e.g., external virality, recipients. In various instances, various metrics may be given more or less weight based on a determined and/or selected relative degree of increased engagement, such as where a simple view is weighted less than a like, which is less than an upvote, which is less than a repost, which is less than a reply or comment, and the like. Other relative weighting regimes may also be applied.

In various implementations, the scoring regime may be configured to take into account three major factors that are inherent to a social post. One such factor is engagement, where two, three or more metrics are evaluated, such as, likes, comments, and shares. These three types are useful because the measure different aspects of a recipient's interaction with and/or response to a social post, and thus, can be used in combination to determine a level of engagement that depends on what type of interactivity a social post receives. As explained herein, each engagement type may be weighted differently, so that when a final engagement value is calculated, the resultant overall engagement measurement will be higher for social posts that receive more comments and shares than those that receive likes of the same amount. A final engagement score may then be determined by performing a summation of each weighted type, which may then be averaged over all users who engaged with that post.

A second factor may also be determined and employed in performing a scoring regime. For instance, the second factor may be related to how many fans versus unique visitors accessed a poster's social page and viewed a post of interest. Specifically, dependent on the social network, social feeds may be curated based on one or more algorithms. Because of such curating, the identity and the number of times an online user accesses and/or views a post is collected.

However, various online consumers may or may not be online during a given posting schedule, and thus, a poster will only have a portion of potential consumers viewing a post throughout it's timeline. In view of this, a ratio of how many fans or new users viewed a post divided by the number of users that were online that day may be used as a second factor for determining engagement. This data may be determined both for fans and new visitors, and may then be weighted relative to one another and used to score engagement. For instance, in various instances, the weighting attributed to fans who view a post versus new visitors who view the post may be different, because being a fan of a user's page it is more likely that they would engage with a post than a new user would be. In either instances, these two values may be fed into a power function that smoothes the distribution into our desired range of 0-10.

Finally, there are special cases where a post may not have engagement, but was viewed by many followers or external visitors. This may be taken into account because even though no engagement was made, the impact of that post should still be attributed. A logarithm may be taken of different levels of impressions, e.g., based on importance, and a first instance that is non zero may be selected for use. In essence, these factors may be surmised as viral impressions, fan impressions, and all impressions.

This weighting can be manipulated so as to derive the desired shape of the curve, such that the curve's peak centers on around a selected number, such as 4, 5, or 6, and the like. For instance, metrics may be normalized based on the number of instances of views, looks, likes, shares, upvotes, comments, and the like, all of which may be individually and/or collectively weighted so that the engagement score can be a weighted sum of all of the different engagements divided by a determined normalizing factor. In various instances, this engagement score may further be multiplied by the inner circle (local virality) and/or outer circle (external virality) engagement ratio, e.g., of fans and general consumers. The results may then be scaled by a factor of two, ten, or the like so as to produce a log scale distribution, e.g., $\log$, $\log^2$, $\log^{10}$, etc.

Hence, a dynamic bell curve engagement distribution can be determined that ranges in a more evenly spread out bell curve from 0-10, having a maximum around 4, 5, or 6. Likewise, both internal and/or external consumer impressions, conversions, and other engagement ratios may be used and compared one with the other to determine effectiveness of the communications. In this manner, content that can keep consumers fully engaged can be identified, and used to generate new content, such as based on its weighted engagement score.

Additionally, in certain instances, if a suitable amount of metrics and/or engagements have not been collected, then the system may repost the communication, e.g., boost or reboost, so as to generate enough data so as to gather enough feedback to make an appropriate measurement. Specifically, the post can be transmitted to a larger, different number of both fans and consumers, so as to generate an increased number of interactions with which to use to weight engagements with the percentage of fans versus consumers who have been exposed to and/or viewed the post. And sense the values are static, they can be applied regardless of the type of data collected and used in the determination. In various embodiments, the metrics and other data, e.g., engagement data, for any given user with respect to any given content they post or otherwise distribute can be collected over any suitable amount of time so as to generate baseline measurements, such as over a day, a week, a plurality of days and weeks, a month, a plurality of months, such as two, three, four, six, nine, twelve months, and more, which metrics can then be collected, evaluated, and used to score the collected content.

Accordingly, in various embodiments, a dynamic scoring platform is provided, whereby the scoring platform includes a plurality of metrics that may be employed in scoring content. Each metric may be represented by a toggle so as to be adjustable between weights and values in a manner that allows a system user to generate a catered shape of a bell curve. Specifically, due to the selected toggling, a unique bell curve can be generated from the collected data in such a manner as to have a shape that is variable with the toggling and which shape can be catered to the desire of the user, while at the same time being representative of the actual data collected.

In various of these instances, the values to be evaluated may be static or fixed and one or more of these calculations may be performed without any preprocessing. However, in various instances, the values to be measured may be configured so as to be variable, such as where the variables can be adjusted. Particularly, in various instances, the weighting of the variables, e.g., the likes, shares, and comments, may be adaptable such that the value of the weighting may change. Likewise, the power function factor and logarithm value may also be configured to be variable.

Figure 12C:
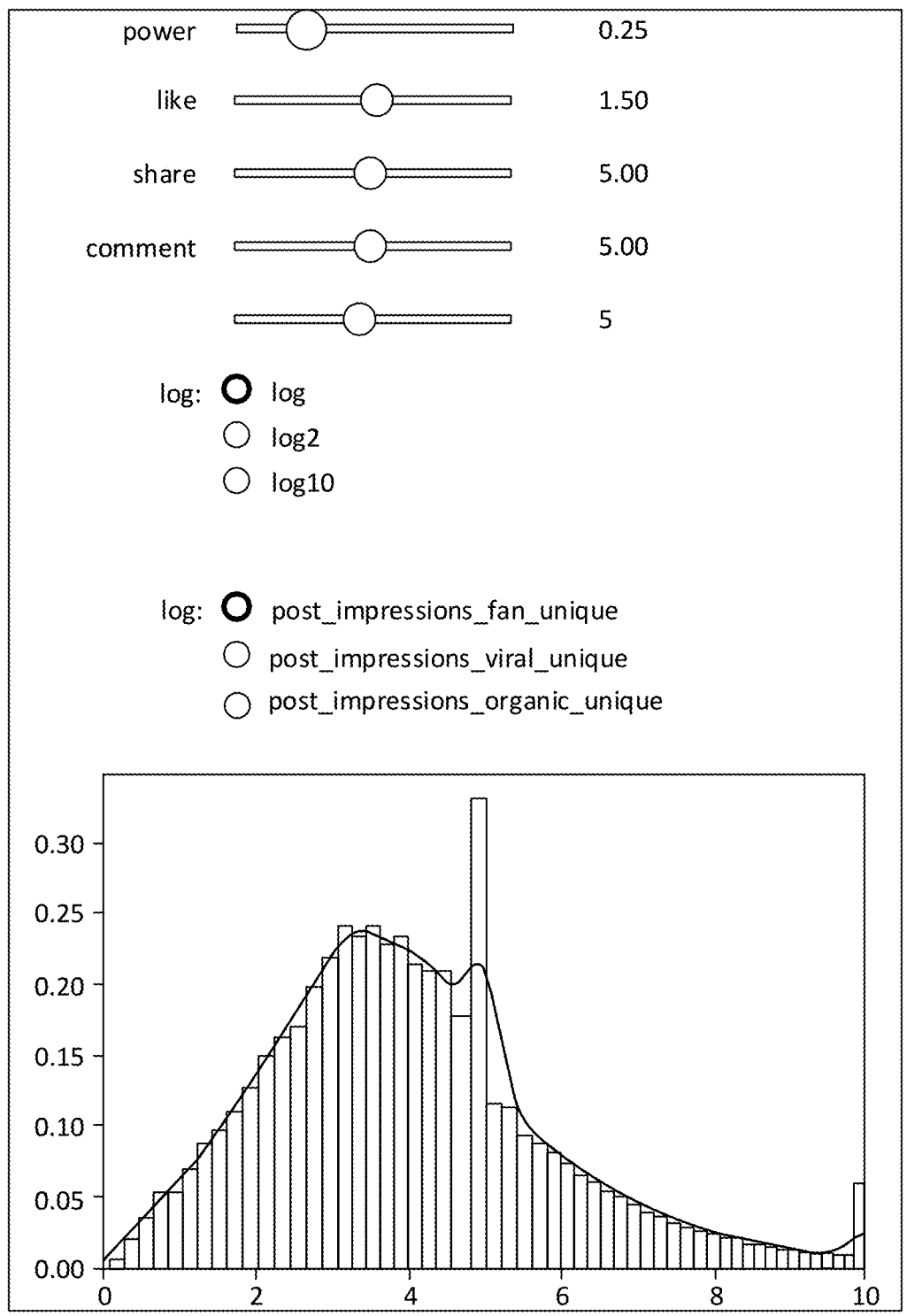
FIG. 12C is an interface for dynamically selecting the rules by which to produce scoring results for display by the system, whereby a change in the rules results in a dynamic change of the presented curve.

Accordingly, as provided herein with respect to FIG. 12C dashboard, a dashboard may be provided wherein the various scoring metrics to be considered in generating and representing a score may be presented, whereby a slider scale is used to determine the value range of the included metrics. Specifically, the dashboard may be configured so that the various values of the metrics can be adjusted, such as toggled from a low or minimum value to a high or maximum value. Furthermore, a graphic representation of the toggling can be provided so that the real time effects of changing the weighting may be readily apparent in the shape of the change in the distribution of all the scores on the curvilinear graph. The functionality of this configuration allows the user to see in real time how the changes in values affect how the scores are being calculated. After adjusting each one and agreeing on the best distribution, the final values can be locked in place.

More particularly, as can be seen with respect to FIG. 12C, a variety of exemplary metrics are provided by which collected content can be evaluated and scored. As depicted, each metric includes a toggle that is configured as a slider bar, which slider bar includes a weighting that can be increased or decreased from a minimal to a maximal value. Likewise, provided is a graphical representation of a scoring matrix that is presented as a bell curve where depending on the configurations of the associated toggles, the shape of the curve will change dynamically as the corresponding toggles are manipulated.

As presented, the representative metrics for scoring include a power factor, which can be selected to range from 0.0 to 1.0, such as by adjusting the slider. Additionally, the metrics include consumer response data such as "likes," "shares", and comments, which may range from 0.0 to 2, 3, 4, 5 or even up to 10. It is understood that with respect to FIG. 12, although only three metrics are used in the exemplified scoring matrix, e.g., likes, shares, comments, however, any number of metrics may be included in the scoring regime, such as one or more of looks, views, likes, upvotes, +1s, sharing, forwarding, reposting, tweeting, re-tweeting, commenting, and the like. Likewise, a minimum and maximum score may also be set, such as from 0 to 10. Additionally, as can be seen, the scoring of the metrics can be toggled between various different log scales. For instance, the results may be scaled so as to produce a log scale distribution, e.g., $\log$, $\log^2$, $\log^{10}$, etc.

Accordingly, presented herein is a dynamic scoring module that overcomes several issues with the manner in which scoring has been performed previously. In many instances, scoring may only take into account either internal or external scoring factors, and/or may weigh them in a manner that does not account for conflicting factors, such as bias. However, in doing so, the results achieved are not efficient and, thus, not particularly useful. For instance, if internal and/or external scores use similar value, such as post virality compared to overall engagement, it becomes difficult to measure the effects of virality. In order to compensate for this deficiency, scoring regimes may use a normalization technique that requires knowledge of all possible virality metrics so as to determine an absolute minimum and maximum for any particular score. However, this is inefficient because it cannot be scaled as each maximum and minimum would have to be recalculated for each individual communication being generated and distributed, e.g., posted. Likewise, such calculations are expensive in costs and resources, and cannot be performed on a regular basis.

However, the present scoring module overcomes these deficiencies by allowing for dynamic scoring, where the metrics are not fixed, but allowed to vary based on the considerations being taken into account when performing a scoring process. Hence, as displayed, the scoring can be modulated based on the type of data being collected and metrics being evaluated. Additionally, the scoring can be modulated based on the type of person engaging with the content and/or evaluating it. Specifically, the scoring can be modulated with respect to whether the commenters on posts are known to the posters, and are thus known fans, those who are heretofore unknown but join the poster's mailing list and are consequently unique fans, e.g., visitors, are not known to the poster, and therefore are unique engagers, e.g., a viral unique engager, and/or are unique organic engagers. Hence, the present scoring modality may account for the extent to which the poster and the commenter are known or otherwise have a relationship to one another, such as by being part of the same, inner social circle (local virality) and/or outer circle (external virality) of the poster. Accordingly, as can be seen with respect to FIG. 12C, a bell curve engagement distribution can be generated and configured as desired so as to produce scores that range in a more evenly spread out bell curve from 0-10, e.g., having a maximum around 4, 5, or 6.

Consequently, in various implementations, provided herein is a multimedia communication method that may include evaluating, by a server or other computer of the system, an advertisement and/or a collection of media components, scoring the advertisement and/or the plurality of media components, such as based on one or more metric data, so as to produce a scored advertisement and/or media component. In certain implementations, the scored advertisement and/or media components can then be tagged and/or transmitted to a memory, such as in a structured library thereof for storage thereby. For instance, in certain embodiments, the scoring may include determining how well a post, or a portion thereof, e.g., an advertisement and/or lead form, performs with respect to a determined advertisement campaign objective and/or with respect to a user, e.g., a consumer, of the system. In particular embodiments, the score may be configured for determining one or more performance metrics, and further for converting that performance into a value proposition.

For example, as indicated above, in various embodiments, the system may include a computer system, such as including a server having one or more CPUs/FPGAs, wherein the computing system is configured for performing one or more evaluations, such as implementing a scoring functionality. Particularly, the scoring functionality may be implemented by one or more processing engines of the computing system. Specifically, a plurality of processing engines may be included, such as implemented by one or more integrated circuits, whereby one or more of the processing engines is configured for evaluating one or more advertisements and/or one or more component parts thereof.

In such an instance, the scoring may be performed so as to produce one or more scored advertisements and/or media components, such as scored with respect to their ability to effectuate a given, e.g., predicted, outcome, such as increased user, e.g., consumer, approval and engagement, increased user activity, increased lift, increased impressions, conversions, views, likes, upvotes, posts, reposts, forwards, new leads, increased reach, and the like. The scoring may be employed so as to facilitate the selecting of one or more scored templates, scored media components, and/or for determining which of the scored media components may be integrated into the template so as to generate the advertisement.

Accordingly, the scoring methodology may be employed so as to determine and/or measure internal and/or external corporate and/or local virality. For instance, one or more factors of virality, such as impressions and/or conversions, may be employed as an external metric. Likewise, one or more unique impressions or engagement factors may be employed as a local metric. Additionally, in performing a scoring operation, one more of these various factors may be scaled, such as where greater weight is given to external virality factors. In particular embodiments, the system may be configured for generating a new engagement value based on one or more weighted impressions, conversions, or other engagements, such as likes, comments, shares and the like.

Particularly, the new engagement value may be weighted with respect to one or more particularities pertaining to one or more consumers that have in some manner engaged with a posted advertisement, such as all, or a subset of consumers, who clicked on a posted advertisement or lead. In one exemplary embodiment, the engagement value may be weighted with regard to the percentage of potential consumers who received and did not view the post versus those who received and in some manner engaged with the post. Specifically, if there were no engagement, the postings may be boosted, such as being sent in a greater range, a larger audience, or for a longer period of time, so as to generate a higher number of impressions, and/or to ensure a wider audience is reached, and impact both within and outside of a direct social interaction may be reached. In certain implementations, the results of the posting and/or boosting thereof may be received and evaluated and a sample set of conditioned results may be generated, whereby the values thereof may be static and, thus, can be applied regardless of the particular dataset employed.

In particular embodiments, one or more external factors may be used when determining an engagement rate for a post. For example, one or more of the factors to be weighed may be normalized so as to produce a normalized engagement rate, such as by employing one or more minimum and/or maximum values for the collected factors used when determining engagement. In various embodiments, the determining and/or weighting may be performed using sample sets on an individual, account, e.g., region, and/or group level. However, regardless of which level, each account may include an individual distribution of metrics. In particular embodiments, engagement may be determined by a number of different, e.g., all, metrics, and the results can be normalized to smooth any oddities, while at the same time also providing a clear measure of engagement.

In one specific embodiment, a plurality of engagement measurements may be performed, e.g., at the individual, account level, project or corporate level, and the like. The results may be ranked so as to determine how various advertisements and/or advertisement components, e.g., media assets such as dynamic text or images, have performed, such as in ranked order. In particular instances, one or more trends may be determined and followed, such as over time, so as to determine the progression of one or more factors, and/or to make a projection for whether the trend is gong to continue over time. For instance, one or more questions as to whether by employing a proposed messaging campaign, engagement will be increased or decreased over time with respect to the continued use of a particular advertisement and/or one of its component parts.

In a manner such as this, distributed advertisements and leads having a small initial engagement can be boosted in a manner that engagement can then be tested and/or determined. This data can further be normalized with those advertisements having a moderate level of engagement, which in turn can be normalized against those advertisements generating a higher level of engagement. Consequently, the sample size can be normalized in a manner that results from different markets can be compared across a variety of different metrics.

As indicated, in various instances, the various devices and systems, as well as their methods of use, as disclosed herein, may be employed so as to collect and evaluate content, e.g., online content. Such collected online content can be classified, categorized with respect to one or more captured characteristics, tagged, and stored, such as in a structured database containing one or more libraries. This evaluated and scored content may then be used to generate a communication, such as an advertisement, which advertisement may be generated in a dynamic manner, where a universal template is employed in the production of a wide variety of advertisements that is adapted to include particularized texts and images. Once generated the dynamically built advertisement can then be transmitted, such as over the internet, to one or more defined target recipients, e.g., consumers, such as online content consumers.

The content to be collected may be from one or more online or social media platforms, whereby once collected the content can be evaluated by the system, using various metrics set forth herein, can be normalized and weighted, and can further be evaluated for its usefulness for inclusion in the development of communications that may be generated so as to achieve one or more selected or system determined objectives. For instance, in a particular embodiment, once dynamically generated, the system may then define one or more audiences, and build a campaign for reaching the defined audiences, such as one or more audiences of various potential online consumers, online business representatives, and/or other market influencers. The communication may be formulated and/or specially crafted in a manner to include one or more parameters determined autonomously by the system to be of specific use or interest to a target or a target group, such as a target demographic or audience, and/or may be specifically crafted for the purpose of keeping the communication provider, e.g., an organization or a business, relevant with respect to one or more parameters of interest to the distribution target.

In certain instances, a user of the communications system may be a corporate communications director, a regional marketing admin, or a simple local business owner or franchisee, or the like, who is responsible for controlling the communications within and outside of an organization, such as where the organization may be a global, national, and/or local business organization. Accordingly, in such instances, it may be useful for the overall system to evaluate web-content and data, such as online data to be evaluated prior to or after collection. The data may be online content or meta-data or other useful data associated therewith, all of which may be beneficial in the building of a communication, such as an advertisement for online distribution to one or more audiences of consumers and consumer groups.

Specifically, prior to collection, or once content has been collected, the content and its associated data may be evaluated, e.g., scored, as set forth above, with respect to its predicted usability as content for use in posting for the purpose of achieving one or more objectives with regard to its use in the generation of an advertisement or other communication. For instance, once content has been collected and/or otherwise retrieved, the content may be analyzed, key words and concepts may be identified, e.g., via one or more applied filters, such as a keyword filter, tagged and categorized, and stored in one or more libraries of a repository of the system, such as with respect to one or more defined categories and classifications based on the various characteristics of the content elements. Likewise, the collected content can be evaluated and scored based on how a user and/or a target recipient might engage with the content, whether the recipient may be a reviewer, so as to review, evaluate the stored content, and then use it to generate a communication, or whether the recipient is an end user, e.g., consumer, who is to receive the generated communication and to act thereupon.

In various instances, the system may be configured so as to generate an advertisement campaign, which campaign may not only include a target demographic but also one or more other objectives, and may further be configured for determining a projected budget for meeting the determined objectives within a determined cost per advertisement generation. The system may further track the response of the communication recipients to the advertisement with regard to its effectiveness for achieving the targeted goals so as to track the predicted effectiveness, as described herein. One or more changes to system parameters may then be made or suggested based on how closely the objectives are achieved.

Further, the collected content can be tagged and be traced throughout its transmission throughout the system, including its use in a communication and its delivery to and engagement by a targeted recipient. For example, the collected data to be stored in the system may include content, such as communication content, as well as potential $3^{rd}$ party data characterizing the collected content. Such data may be related to how one or more users has or is engaging with the collected content, e.g., based on the social media platform from which it was posted and collected. In various instances, the collected content may be scored and evaluated and/or may be made accessible for review by $3^{rd}$ parties of influence, such as social influencers, so as to provide comments or suggestions to the content and communications being employed by the system.

In a manner such as this, various $3^{rd}$ party factors may be identified by the system, evaluated, and the data pertaining thereto may be taken into account when configuring the operations of the system, such as when evaluating and/or generating communications based on that content, whether the communications incorporate that content or is newly generated but modeled on that collected and evaluated content. A third-party factor may be a $3^{rd}$ party that may or may not be using the world wide web or other online community for participating in communications and/or to engage in commerce, but whom the system has determined is relevant to how one or more other consumers of online content is or is likely to engage or otherwise use social media to engage in commerce thereby.

Additionally, such factors and other data, such as objective data, may be used in determining a target audience and/or a target region within which to distribute the content to be generated, which target audience data may then be used to determine communication content. For instance, an audience within one or more geographical regions may be determined, and based on the characteristics of consumers within that geographic location, individual content may be selected to better reach that target demographic. Such demographics may be based on location and/or other factors, such as age, gender, wealth, commercial trends, ideologies, and other such characteristics.

Accordingly, the system may be configured for generating, reviewing, and/or tracking the online activities of the system, those using the system, those engaging with the system and/or its communications, as well as $3^{rd}$ party online influencers who may be commenting on the communications and/or commercial transactions of one or more businesses, e.g., users, of the system. Particularly, in certain instances, the system is configured for evaluating online communications, user engagement with those communications, and based on those engagements determining connections and patterns in the behaviors of the users of various social media platforms in response to those communications. The evaluating may be based on one or more selected or system determined objectives, such as with respect to increasing brand or product awareness, reach, engagement, duration, impressions, conversions, lead generation, and/or audience interests, as well as for determining a budget for running one or more advertisement campaigns.

More particularly, the system may be configured for determining one or more audiences, e.g., dynamically, for receipt of a dynamically generated advertisement, as well as for determining one or more objectives by which to evaluate the effectiveness of that advertisement campaign. These connections and patterns may be directed to how communications and content are being consumed by social media users, how it is being commented or otherwise acted on, and what types of actions are being evoked via user online engagement with the community, the communications thereon, and/or the system as a whole. Specifically, these evaluations may be made with respect to how given messaging, e.g., from a business, is being received and/or acted upon, such as by the sentiments it receives and/or whether or not it trends upwards or downwards or not at all.

The system, therefore, may determine and analyze this data, discern various patterns thereby, and develop one or more rules or objectives therefrom, which rules may then be used to either collect new more pertinent content and/or to craft new more useful communications. Other rules, developed from identified patterns of various relationships between online information consumers and online information providers, such as with respect to goods and services being provided, may also be determined and implemented, such as in evaluating and generating new content and communications.

Hence, one or more patterns may be determined by the system, specifically via a suitably configured AI module thereof, the pattern can be used to derive rules by which the communications system can be configured to generate new content and communications, in a dynamic manner. These patterns can be used to generate communications that can be more tailored to a target demographic and/or distributed to them in a more engaging manner. In such instances, not only one but a multiplicity of advertisements may be generated substantially simultaneously all having the same template and containerized architecture but containing different, e.g., localized, media components, such as localized images and texts that are particularized to local economies, and the like.

Consequently, one or more actions may be taken by the system, in view of the identified relationships and/or determined patterns, so as to make the system more effective and efficient at reaching its determined objectives in a cost effective manner. For instance, the system may determine a relationship between the various agents acting online and/or upon the system. The system may as well identify and/or determine the factors relating thereto, such as with respect to how certain content is being received by the online community and/or is trending online. Once a pattern with respect to how the content is behaving with respect to evoking user engagement, e.g., based on contained content and the determined objectives, has been identified and determined, the system may take one or more actions, e.g., boosting or corrective measures, to generate new content that either boosts successful messaging, or corrects unsuccessful messaging for use in generating and distributing new communications.

Accordingly, in view of the above, the system, e.g., an artificial intelligence module thereof, may be configured for performing one or more analyses on collected content, communications built or to be built on that content, the audience to whom that communication is to be targeted, and the circumstances during which that communication is to be delivered, and one or more patterns may be determined by which an optimal communication content can be determined, an ideal audience for receiving the communication can be determined, and the peak time to deliver the communication, e.g., based on a per market analysis, can also be determined. Likewise, based on these analyses, the system may also be configured for evaluating the various content of the system, and given one or more of the other determined parameters, the AI of the system may recommend ideal content to be included in the communication, recommend who should be included in the target audience, and when the communication should be posted, such as on a region by region and/or target by target basis.

Hence, once one or more patterns or trends have been established, a correlation between the communication and its achieved objectives may be determined. Such objectives may include the maintenance or generation of content interest, engagement with the content, and/or sales, factors affecting the attainment of that objective can be isolated. The content may then be used as a parameter by which other communications can be formulated, composed, and/or otherwise structured and/or recommended for use. High performing data and content, therefore, can then be scored and stored for later use by the system in generating new communications, as disclosed herein. The system may store the content based on the subject matter, categories, and scoring of the identified patterns, based on data derived from how online users are engaging with the communication and/or system as a whole, and/or other information that may be of use and/or applied to the later activities of the company, e.g., or other user, such as when weighting their future scores or other actions they take in generating new communications, interacting online with consumers, and/or with configuring the system.

Accordingly, in various instances, the engagement of the communication target, e.g., the defined consumer audience, with the transmitted online content and/or the system as a whole, may form regular interactions and/or patterns that may be recorded and tracked within the system. These patterns may be recognized and identified by the AI module of the system. In particular instances, the AI module may include a pattern recognition or machine learning platform, as well as a predictions module, together which AI module may be configured to recognize patterns, analyze them, and determine rules by which to re-orientate and/or calibrate the system.

Specifically, from these patterns, the machine learning and/or predictions module of the system may be employed to evaluate content, e.g., online content. One or more social media user's particular pattern(s) of behavior with respect to that content can also be evaluated. And a pattern in relationship between the two may also be determined, so as to then calculate the effectiveness and usefulness of the online content. Such evaluations may be performed for a number of different reasons, such as especially with respect to one or more determined objectives of a determined advertisement campaign.

This process is useful in situations such as where an online user's patterns of engagement with content and/or their use of the system appears to coincide or conflict with the patterns of usage of other users of the system. Specifically, the system may be configured for determining the presence of various factors influencing online engagement behavior, e.g., consumer behavior. In various instances, these may be a number of factors, such as factors pertaining to the ability of communication content to influence a consumer in making a purchase or other determined decision, as well as for determining which factors may be leading to that influencing, and to what degree.

Further, once these influencing factors have been determined, the system, e.g., via the suitably configured learning module, may then be adapted to produce rules or parameters that may be employed in generating a communication that capitalizes on such influences. For example, a predictive intelligence module of the system may determine whether the influencing factors are such that in view of them a weighting scale, as described above, may be increased or decreased, e.g., via a suitably configured toggle, which weighting scale may be used to weight both content and the connections between that content and its effect on the actions of communication recipients. The system can also account for various influencing factors and other user actions that influence the outcomes of those actions that result. For instance, in various embodiments, one or more of these influencing factors may be included within the weighting regime.

Accordingly, in view of the above, when various patterns are formed, the system may learn these patterns, breakdown and learn the factors leading to the pattern, thereby determine the existence of and the reason for the presence of a trend, e.g., in communications, and/or predict a likely manner in which the communication recipients will behave. A level of confidence may be given to the predicted outcome, such as from 0.0, not very likely to 1.0 almost completely certain. Accordingly, when the system makes a correct prediction, e.g., that a given communication will result in a certain percentage increase in achievement toward an objective, such as a sales objective, the connection between the initiating action and the resulting action can be strengthened.

For instance, a first initiating event may be the identification of a target demographic and/or defining an audience, e.g., with respect to one or more locations, and a second initiating event may be the generation and distribution of a communication to that target audience, where the communication dynamically includes elements known to positively influence consumer behavior, e.g., factors affecting sales. A prediction may be made by the AI of the system as to the successfulness of the generated communication to achieve the sales objective with respect to the target audience. This prediction may be based on the strength, e.g., weighting, of the relationships between these various factors. So being, when a prediction is made, with regard to one or more initiating events, and the final outcome occurs, e.g., a communication recipient receiving and acting on that communication to actually make a purchase, the various connections that had led to the successful outcome may be strengthened. In such an instance, when these same or similar conditions occur again, the system will be quicker to from predictions and based on those predictions generate communications and distribute the communications using these same or similar content types, with a higher prediction of their effectiveness. However, if the expected predictive event, e.g., sales percentage increase, is not reached or beaten, the system will then access the various weighted factors to determine why the model did not work, and corrections and/or recalibrations to the system and/or its component parts will be made so that a new predictive model can be developed.

Hence, in a manner such as this, when factors are identified as having a positive predictive correlation to one another, they may be deemed to be connected, and the strength of that connection can be increased. Further, the more the two items occur together, such as where a given communication results in an increased number of sale for a given demographic, the weighting of that association can be further increased. Where the predictive model does not or ceases to work, the system may analyze the various factors and/or metrics, draw new connections, and re-weight the various defined connections so as to come up with a new predictive model. The new predictive model may then be used to generate new communications, with the expectation of increasing the objective outcome, e.g., increased sales or enhanced user sentiment, increased likes, increased engagement, increased consumer retention, increased reach, and the like. Hence, when a pattern is observed, and the predicted result occurs, the weight between the various elements in the predictive chain may be increased, making it more likely for this pattern to be propagated again and again.

However, when a pattern is observed, and the predicted results do not occur, the weight between the various elements in the predictive chain may be decreased and/or reorganized until a new pattern is performed. These predictive analyses are especially useful in determining the messaging and images that are to be weighted, scored, and used for generating communications, e.g., advertisements, dynamically. Particularly, the system can be calibrated such that a universal template, having an architecture that represents messaging, images, and a look and feel that is the same across the communications to be generated, may be employed as a framework, and within one or more layers of the template framework one or more localized containers can be positioned such that unique, individualized text and images can be dynamically called when generating the communication.

In such an instance, the advertisement may, therefore, include both a universal look and feel, such as representative of a national brand, but may also include location specific, geographically relevant images, text, and overall messaging. Likewise, these dynamically selected localized images and texts may be selected not only on the basis of their being relevant to a local audience, but can further be selected based on the scoring and predicted ability of their accomplishing a determined goal of a determined advertising campaign to be implemented by the system.

Accordingly, the connection between the action and a predicted outcome of that action, may be evaluated, such as by giving an estimation of a successful predicted outcome, e.g., an increased engagement, impression, conversion, and the like, and when that estimation is proved out, the predictive model may be strengthened, such as for future implementation, and when they are not proved out, the connection may be weakened. Hence, in such an instance, messaging content, whether it be universal or localized, can be dynamically selected and employed in generating a communication not only on the basis of it having a high score and being relevant to one or more audiences, it can further be selected based on its ability to achieve an evaluated and/or predicted outcome. Particularly, predicted outcomes of messaging content may be made based on the totality of the variables being considered, such as where the same or similar messaging is being proposed to be used in a plurality of the same or substantially similar circumstances.

Thus, when a previous pattern is repeated the various variables identified by the system as leading to the pattern, and the connections between them, may be given more weight. Likewise, when a pattern is broken, less weight may be given to the various connections between the initiating action, e.g., the sending of a communication and various factors leading to the non-predicted outcome, and a new weighting and organization of the elements of the communication may take place until a new positive pattern is re-established. Changes in patterns can also be aggregated along various dimensions to group a plurality of communication content and target demographics together, and/or in the contrary, to group a number of social media users interacting online together, such as in a coalition, which groupings may be used to more precisely define and weight patterns of engagement based on their collective actions and/or interactions.

In a manner such as this, the system may be configured to keep track of the various content, communications, and/or social media users identified by the system, as well as their individual and/or group patterns of behavior, so that the various identified factors that may be influencing the emergence and/or maintenance of such patterns may be identified, predicted, and employed for a plurality of different uses, such as for dynamically selecting and employing universal and/or local images and texts. For instance, the system may be configured for determining and/or selecting the best content to use to form and generate the communications, which communications may be geared towards achieving a pre-defined, desired result, such as the increase in consumer sentiment and/or an increase in product or service sales. Likewise, the system may be configured for selecting and determining a defined target audience, within one or more defined target locations, in accordance with one or more defined target demographics, such as within a multiplicity of target markets, and then uniquely catering generated ads so as to individually appeal to each recipient or recipient group.

In various instances, each advertisement to be generated may have dynamic text and images that are selected for use in generating communications, whereby the selections may be determined based on their ability to effectively achieve an objective, such as where the desired objective may be the increase in target engagement with the communications and/or businesses of the system, to increase reach, generate new leads, and the like. Additionally, in various instances, the system may be configured for tracking effectiveness of the advertisement, and for taking corrective actions, such as to correct for communications and content that is not meeting its objectives. For instance, media elements, such as text and images for dynamically populating various containers of templates to be used in generating communications, can be individually evaluated, and those that work well can be given greater scores, whereas those that do not do well can be given lesser scores.

Specifically, the system may generate and employ one or more data structures that may be queried so as to predict an answer to one or more questions. For example, as described in detail herein, the system may be configured for receiving information with regard to the actions of one or more online, e.g., a plurality of social media, users. Such information may include website of interest information, content of interest information, target consumer identifying information, consumer social circle information, as well as social media engagement information, and the like. In various embodiments, to identify factors of particular interest to an online retailer and/or a consumer thereof, the system may present one or more users to a series of questions, such as via an automated interview process, the responses to which may be used to characterize and/or rank content that may be useful to a user of the system, such as for generating communications and/or for making purchases. Additionally, the system may track how various identified targets, e.g., consumers, engage with the content and/or the system itself, as well as the attendant data pertaining thereto, such as time, place, number of times per day, length of time engaged, who he or she messages or otherwise interacts with through an online social medium platform, who they follow, what events they engage in, what they purchase, what they post online, what they like or dislike, the sentiments they express, and the like.

All of this information may form data points that characterize any given content, message, communication, and/or any given social media user. These data points may then be employed as nodes within a data structure, which data structure may take any suitable form, such as a data tree and/or a knowledge graph, and the like. From these various data points, e.g., nodes, connections or relationships between communication content, users of the system, e.g., business, communication recipients, e.g., consumers, and their actions may be identified. These connections between the identified data points may be weighted based on the number and form of the interactions between them, and the various actions online users take in response to the communications they have sent and received may also be weighted. Hence, the more online user's interact with one another and one or more communications of the system, e.g., in a positive manner, the greater the weighting will be between the various nodes that may be employed to define their relationships and interactions.

Likewise, the more negatively the users interact with one another and the communications of the system, the less (or more negative) weight will be given to define their interactions. In similar manner, the more the user's interactions with the communications of the system are positive and comport with one or more other groups of the system, the more weight those various connections will be given, and the more the user's interactions with the communications of the system do not comport with one or more other groups of the system, the less weight those connections will be given. Further, in various instances, a user or the system may make a prediction as to an outcome that actually occurs, and in other instances, the predicted outcome does not occur, in such instances, more or less weight will be given to the system/user when predicting outcomes for future events, based on the successful prediction of outcomes of past events.

Accordingly, data points between the various nodes of a structured database of the system may be used to generate correlations between the nodes and to weight those correlations so as to build a data structure thereby, such as a knowledge graph or tree, which may then be queried to determine other relationships not previously known and/or to predict the influence of external factors affecting the usage of the system in generating communications, and/or to predict and weight potential outcomes of a conversational campaign based on a collective of usage patterns of how consumers are engaging with the various communications system. For instance, a data structure, such as a knowledge graph, may be generated by the system receiving known data about the various users of the system, e.g., a company, its franchises, and/or its employees and consultants, communications directors or advertisement agencies, and the like. The data structure may further receive data about various online users, who may be in some way related to or interested in the company, such as in a commercial way, e.g., they may be consumers or reviewers or commenters on the company.

Each of these entities may form nodes in the knowledge graph, and their interactions one with the other may be mapped and scored, such as where the interaction is positive, a positive score may be given for that interaction, and the same for the negative. Further, the various interactions may include the sending and receiving of communications, responses to communications, and actions taken, all of which may define lines of interconnectivity between these entities in the knowledge graph. This data may be received by the system such as via a suitably configured API connecting to one or more social media pipelines, and/or may be web or other data collector or crawler or data scrubber.

In a manner such as this, the system may be configured for building stars of data points that together form a constellation of relations, which relations are defined by a multiplicity of interactions that form webs between known business entities as well as their current and potential customers. Together all of these data points and their respective connections, one with the other, form a milieu of online and/or social media interrelatedness that can then be leveraged in forming as well as managing the social interactions of a company, especially with respect to successfully managing their communications within and outside of the organization, e.g., their consumer facing communications. These knowledge graphs and the various data points they represent may be used by the system to dynamically select messaging content, e.g., text and image data, in the generation of communications to be distributed online in a dynamic manner to one or more disparate audiences.

As indicated above, this data may be collected in a variety of ways, such as by system generated interviews of the various communication generators and/or communication recipients, system instigated accessing and review of social media usage by various identified targets of interest, as well as the usage by others of the internet, such as through postings of texts, photos, blogs, comments, searches performed, time spent in web-pages, web-page content, and other associated metadata through which a social media user produces a presence on the global internet, all of which data may then form various nodes of the knowledge graph. Such a procedure may be performed for a number of different user businesses and/or target consumers. Once online users, e.g., business, consumers, and other interested parties (collectively "USERS"), have been defined and entered into the system, the users may be grouped in accordance with one or more system usage parameters, and known relationships may be determined between the various users in a predefined grouping.

The number of relationships between the various users as well as the strength of those correlations may then be determined and used to weight the known or fact based relationships. Likewise, from these known fact based relationships, previously unknown, inferred relationships may be determined, and weighted. In a manner such as this, the knowledge graph, or other data structure may be generated so as to include both known and unknown, inferred, relationships, which may then be leveraged to identify content that might be useful in enhancing engagement between the various businesses of the system with their perspective target consumers. Accordingly, once generated, the knowledge graph may then be queried along a number of lines so as to make one or more determinations with respect to the various relationships between the various nodes of the graph, as well as to leverage those connections so as to predict what actions may be taken to strengthen those relationships.

Essentially, in one implementation, the system can be configured to determine how a relationship between a business owner and its consumer may be strengthened, such as by engagement in a successful communications campaign that is directed to increasing consumer engagement and/or sales and/or the like. For example, the system may be employed to determine the content, both universal and particular, that should be used to generate communications that are particularized to a target demographic and/or configured for achieving a determined campaign objective. Particularly, the system may be configured to automatically be queried to determine if there is a pattern by which one or more users are interacting online with respect to one another and/or with respect to identified content, that may be identified and used to strengthen or weaken their relationships, such as by the messaging being sent from one to the other.

For instance, if one or more unrelated consumers appear to be engaging with the internet and posted content thereon, in the same or opposite manners, e.g., they are both making negative or positive comments about the same company or product, the system may flag their behavior for further analysis, a deeper dive into any possible relationship between the two users, their actions, and why those actions are similar or different, may be initiated, and a source of their possible correlation or dis-correlation, may be determined. From the strength of that relationship between the two users and based on the online sentiments they are expressing, a score may be given so as to weight the possibility the users may be evidencing a common theme, such as an objective or purely subjective experience of a business or product they are both commenting about. Such an interaction could evidence engagement, which may then be identified by the system, flagged for review by a system administrator, and/or the system can initiate corrective measures by which the consumer's engagement may be strengthened, such as by receiving positive communications from the subject company of interest, or they may receive corrective communications meant to correct their negative experience.

In various instances, the system may perform such activities automatically based on its own programming and/or in some instances may be initiated by an administrator of the system, e.g., a system operator, communications director, franchisee, or the like, may initiate such queries, and/or a deeper dive as to how various users are using the system and/or engaging online. Accordingly, in various embodiments, the system may be configured so as to be queried along a number of different parameters to determine and weight a number of different metrics and/or answers, and thereby make a variety of different predictions. These predictions may then be given a weighted score, such as to the probability of being correct, and based on that score, the system can generate communications and/or self-correct communications so as to properly account and/or correct for the predicted behavior of its users, such as with respect to their engagement with generated and distributed communications.

In a typical architecture for performing such functions, such as for performing a search query, e.g., for identifying useable content, the system may include a database of relevant content features. For example, one or more databases may be searched for content such as by employing a filter for one or more keywords, factors evidencing consumer's interests in a given subject business, characteristic data pertaining to the consumers themselves, relational data pertaining to that consumer in relation to other online users, e.g., with respect to the messages they post online, and characteristic data pertaining to how the consumers have interacted with the communications of the system in the past. The system may also identify and/or pinpoint pattern data, as well as predictive outcome data of the past, present, and/or future, so as to narrow the search query and identify other characteristic data the system determines is relevant to the particular question being asked. In such an instance, the relevant data points may be identified and pulled from a general repository or dedicated database, and a localized data structure may be built.

Any data structure may be constructed and employed for performing the search in question. In various instances, however, the data structure may be a relational data structure, such as a Structured Query Language (SQL) database, which may be implemented via a relational database management system. For instance, in one implementation, the SQL database may be a table based data structure, such as where one or more tables form the base structure wherein data, such as media content, may be stored, searched, relations determined, and queries run and answered in a structured manner. Particularly, in various embodiments, a table based database may be presented, searched, and used to determine relationships from which answers to one or more queries may be determined. Typically, in such a data structure, identifiers, such as keys, are used to relate data in one table to that in another table.

For example, typically, SQL databases have a relational architecture. These constructions may be represented by a table structure. A series of tables or the word graph, explained above, for instance, may then be employed by which correlations may be made in an iterative fashion to identify keywords that may be of particular use in building a communication of the system. Specifically, with respect to whether a certain online user is positively or negatively engaging with a selected communication and/or company utilizing the system, such as with regard to a particular messaging campaign, a first correlation may be made between the subject's normal interactions online and those regarding the company and its communications. For instance, a first correlation may determine the nature of engagement with a company's and their messaging, e.g., in the past. This may be reviewed for a period of past engagements or non-engagements, and may be determined over a series of days or events, such as to determine a baseline for how well the consumer's interactions are consistent over time.

Then the results thereof may be compared to others treated in like manner to compare this subject against the mean or average of other consumer interactions overall (or with respect to their past interactions), such as described above with respect to the dynamic scoring and/or analysis module. This data may then be broken down and a first table, or other data structure, may be formed to record this data as a first use model sample set. Then, a second table, or other data structure, may be built whereby the subject consumer or a consumer group's current online use, with respect to a current communication campaign presently being performed, may be tracked and compared against the collective of current online users engaging with or otherwise responding to that campaign. The two data structures can be compared with one another so as to determine if the subject consumer's present interactions comport with their past interactions, and/or how their present use comports against the collective of relevant consumers, and then the different messaging involved with the two campaigns may be compared one to the other.

Where it is determined that a user's present use is outside of what would be their historical or predicted usage average, the system can flag the interaction as worthy of a deeper dive, and if necessary can begin to look for other correlations between this user and this campaign so as to determine possible explanations as to why this user's present interactions are outside of their predicted behavior. Specifically, where the data structure is a series of tables, the user's identifier may be searched and compared through a number of tables for a wide variety of correlations that may be determinative in explaining their present, aberrant experience with a given company's communications. Where a source of positive or negative interaction is determined to be present, the system can implement a corrective regime to enhance or correct for that experience.

Accordingly, a key may be used to correlate the tables, or other data structures, which key may be accessed in response to a question, prompt, or command, such as why the user's present use does not comport with their past use of the system. The key may be any common identifier, such as a name, a number, e.g., a RFID number, cellular identification number, a phone number, and the like, by which one or more of the tables may be accessed, correlated, and/or a question answered. Accordingly, without the key it becomes more difficult to build correlations between the information in one table with that of another. In certain instances, a table may be a hash table and a hash function may be employed in search the table for correlations with other data structures.

As indicated, a further architecture that may be used to structure a database is a data tree, e.g., a suffix or prefix tree, where various data elements may be stored in a compressed, but in correlated fashion, where the various roots and branches form divergent data points with respect to potential correlations. In other instances, a graph based architecture may be structured and used to determine the results for one or more queries. Particularly, a knowledge graph architecture may be employed to structure the media repository, so as to enhance the performance of computational analyses executed using that database. Such analyses may be employed so as to determine whether a given online user's present activities comports with their past use and/or comports with how other users in general have or are presently interacting online, such as with respect to the various communications campaigns being implemented by the company users of the system. Accordingly, the sophisticated algorithms employed herein, are adapted for structuring the infrastructure of a relational database so as to enable more efficient and accurate searching, such as for identifying and evaluating and scoring successful online content, which content can then be collected, graphed, and predictions may be derived therefrom, such as via performing graph based analyses, as well as for performing table or tree based analyses.

Consequently, in one aspect, a device, system, and method of using the same to build a searchable, relational data structure, such as described herein, is provided. Particularly, in one instance, the devices, systems, and methods disclosed herein may be employed so as to generate and/or otherwise collect data, such as data pertaining to various online users and how they respond to various communications, e.g., advertisements, they receive from other online users, such as companies, over a variety of platforms, such as social media platforms. This data may then be used in developing communication content that may more effectively reach a companies target demographic in a more meaningful manner.

Accordingly, in one embodiment, methods for building and structuring a searchable database are provided. For instance, in a first step, data, e.g., online content, may be identified, scored, collected, scored again, cleaned, edited, and then be prepared for analysis. In various embodiments, the data may be labeled and/or categorized, and may then be structured into a searchable data architecture, such as a knowledge graph, table, or tree-like structure. And once the database is structured, it may then be populated with data, e.g., generated content, in accordance with the determined or inferred relationships. Such relationships may be notional, fact, or effect based.

More particularly, in certain instances, a machine learning protocol, as disclosed herein, may be employed so as to determine relationships between data points, e.g., related to communication content as well as those who liked and did not like the content, which may be entered into the database. Such relationships may be determined based on known facts, and as such the learning may be supervised learning, e.g., such as where known factors may be used to label, categorize, and store data, such as location, interaction, social engagement, sentiment, relationship, and/or usage, sales, and other related data. In other instances, the learning may be inferred, such as in an unsupervised learning.

For instance, in certain instances, the data to be stored may not be known, relationships between the data may not have been pre-determined, and the query to be answered may also not have been otherwise identified. In such instances, the data to be stored is unsupervised, and as such, patterns in data to be stored and their relationships, such as commonalities between data points, may be determined notionally, and once determined such patterns may then be used in forming the architecture that structures the searchable data architecture. For example, where a user's interactions with the system, e.g., posting a review or sentiment about a communication, breaks a pattern, the system may explore relational characteristics of the consumer and/or his or her online use so as to determine what pattern was broken and/or to correct for its effects, or to simply determine a new pattern of behavior is emerging, in which instance, a deeper exploration may not be warranted.

Particularly, a known sequence of patterns may be used to infer that if events A and B in a known sequence may be followed by event C such that if event C does not happen as predicted, a flag is set off for initiating a deeper exploration of the nature of the causes of the flagged event. However, where upon a first round of exploration, it is discovered a new pattern of behavior is being established, the flag may be removed and a deeper exploration as to the causes of the new pattern formation can be but need not be explored.

At the heart of the platform, therefore, may be a generated data structure, e.g., a graph based database architecture. The data structure to be generated may be constructed on the fly by the APIs and/or skimmers of the system retrieving data points from a plurality of sources, and populating those data points into a suitable data structure from which relationships and/or correlations between the data points may be made. This is particularly useful when determining consumer response individually or en masse to an advertising campaign of one or more companies.

First, when populating the data structure known facts may be populated, then known relationships may be determined, and from these known facts and known relationships, otherwise unknown facts and/or relationships may then be determined. Such data points may include any user pertinent information, such as: user entered information, user determined information, such as with respect to how the user interacts with the internet, in particular, or how they interact with online companies generally, information derived from the user's social media, user posted information, such as texts they send, commentary they post, photos they upload, comments they respond to about the company, web-pages they visit and for how long, likes they make, up or down votes they make, purchases they make, video's or blogs they view, searches they perform, who they follow or are friends with on social media, and the like. Additionally, user location data may be determined and used to determine how close or far the user is from a given company running an advertising campaign the consumer is interested in, viewing, or otherwise engaging with. The user may be tracked by their online ID, name, handle, avatar, phone number, computer ID, user ID, their cellular ID, RFID, GPS, Cellular tower triangulation, their Internet Protocol ID, etc. In various embodiments, the system may track the user's online interactions, travel, locations visited, whether engaging with a company and/or its competitors, and the like.

Further, friends, associates, and acquaintances of the user may be identified and their online use of the internet may be determined and tracked, such as with respect to one or more companies of the system, and this information may be used as data points in determining one or more consumer's pattern of usage, trends, and sources of possible correlations, relationships, preferences, and the like towards one or more companies of the system may be determined and/or predictions therefrom may be made. Such persons may be identified directly by the user, by the user's online interaction with them, via the application or social media, via tagging, and/or via facial recognition based on being in a posted image in association of the user. In such a manner as this, a consumer's internet presence and/or social network may be leveraged and used as data points in the construction of a data structure, such as a knowledge graph, from which correlations and relationships may be determined, for instance, between various users of the system, and/or third parties, for example, by determining how these various entities interact with one another, with respect to one or more companies of the system and/or their communications. The type, quality, and/or quantity of these relationships may then be determined by the system, likes and dislikes (and/or other metrics) may be evaluated in terms of a company's products and messaging content, and the results may be employed so as to determine a predicted outcome, such as in response to a given query, such as for determining the potential effect an advertisement will have on a consumer's decision to purchase an advertised product or service.

Once the data structure is built, and the known and inferred facts and relationships determined and/or weighted, the data structure may then be queried, such as with respect to identifying content that is useful for building one or more communications of one or more companies of the system. Specifically, the system may be directed, such as by a system administrator or communications director, as to what the query is or should be, such as from a list of known query types, so as to perform a supervised search query, or the system itself may generate a query automatically when it identifies certain patterns that are worthy of greater explanation, and as such an unsupervised query may also be instigated.

More specifically, the various data points entered into the data structure may be labeled and categorized, e.g., based on known patterns, identified metrics and/or parameters, one or more filters, and a given search query may be performed with respect to the identified labels and categories, which have previously been determined to be important to the performance of one or more objectives of a user of the system. This is useful when the system has been primed in such a manner that it knows what it is looking for. In other instances, the predictive A/I module may itself identify patterns, commonalities, and/or other elements that form a relationship from which one or more labels and/or categories may be generated automatically by the system itself, and a query can be performed based on system generated prompting with respect to these unsupervised factors. This is useful when it is not necessarily known what is being looked for.

In particular, in various instances, the machine-learning module, as described herein, may be adapted to recognize how an output was achieved based on the type and characteristics of the inputs received. Specifically, in various instances, the present system may be configured to learn from the inputs it receives, the relationships it determines, and the results it outputs, so as to learn to draw correlations more rapidly and accurately based on the initial input of data received and/or the types, quality, and quantitates of the relationships it is able to correlate. Likewise, once the AI machine learns the behavior, e.g., of one or more users of the system, or one or more third parties with respect thereto, the learned behavior may then be applied to a second type of data, such as an inference engine, that is used to infer other various relationships and/or to predict the answer to one or more unknown variables, or heretofore unknown relationships.

There are several different types of relationships that can be determined. For instance, relationships may be determined based on what is known, e.g., they are fact based, and/or they may be determined based on the known effects of those facts, e.g., they are effect based, e.g., logic based; or they may be determined based on inferences, e.g., relationships that are unknown but determinable. Specifically, a relationship between two subjects, locations, interactions, and/or other relevant conditions of one or more users of the system, or third parties with respect thereto, may be inferred based on various common facts and/or effects observed between them. As described in great detail herein above, these previously unknown but inferred facts and/or relationships may be determined and/or used in predictive models by generating a data structure as disclosed herein.

Other known, e.g., fact, effect based, or inferred data points may also be generated, or otherwise entered into the system, and may be used to generate one or more nodes, e.g. a constellation of nodes, which may then be used in the determination and/or weighting of relationships. Particularly, the various data points of a data structure may be characterized in a plurality of different manners, such as with respect to being a subject, a predicate, and an object. More particularly, each node and the relationship between the various nodes will have properties by which they can be placed into one of these three categories based on a given query to be answered.

Hence, as the nodes are populated, they are also populated with one or more characteristic properties that more fully define and/or classify that node. Known facts, as well as their known properties, are first employed by the machine learning module (ML) to determine known outcomes, during which process the ML module thereby learns the patterns of behavior between the nodes and their relationships to one another, such as in a training process. This training may take place over a wide range of sample sets, until an acceptable accuracy has been established.

Once appropriately trained, e.g., via a deep learning protocol, then the ML module, may be given data points from which unknown relationships need to be determined, and unknown outcomes predicted. Specifically, once the ML module has learned the expected patterns of relationships, e.g., behaviors, with respect to known data points and relationships, it may then develop "inferred" rules by which it may classify and label new or unknown data points so as to determine and account for otherwise unknown relationships, so as to thereby classify and label and/or otherwise define the heretofore unknown data points, their properties, and relationships, which may then be classified and labeled. In such an instance, when the expected results are achieved, such as with respect to the user engagement with the system, the system status quo may be maintained, but when these new data points evoke a breakdown in patterns of relationships and/or expected outcomes, e.g., a user acts in an unexpected way or an unexpected result occurs, then a system alert may be triggered and a deeper exploration may be initiated.

Additionally, once the knowledge graph architecture has been constructed, the AI module may employ that knowledge graph to answer one or more queries of the system, and/or to make one or more predictions with respect thereto. For instance, the AI module may configure the data structure, and implement one or more functions with respect thereto, such as via one or more known or previously unknown facts, e.g., via the machine learning protocols disclosed herein, and thereby predict various consequences with respect thereto. Further, once the data structure is generated, e.g., by a suitably configured API or skimmer, it can continually be updated and grown by adding more and more pertinent data into the knowledge structure, such as data received from any relevant source of information provider pertaining to the subject(s) under examination, and building more and more potential nodes and/or relationships. In such an instance, the user may access the A/I prediction module, e.g., via a suitably configured user interface, upload pertinent information into the system and/or determine the relevant nodes by which to answer an inquiry, e.g., such as is there bias with respect to how a given user is engaging with the system and/or does their behavior with respect thereto fit within an established and/or otherwise expected pattern of behavior.

The ML and inference engines, e.g., predictive modules, of the system have many potential uses. In certain embodiments, the system may be configured for collecting online content that can be evaluated and stored within the system and used to generate a communication that may then be distributed to one or more target recipients. As such, the system may be configured for providing a platform by which a business or market influencer or other user of the system, such as a national sales brand, service provider, manufacturer, and/or the like, may be enabled to more closely monitor and more effectively engage in promoting its products, services and offerings through a multi-tiered nation-wide communications campaign that can be controlled from a single user interface, such as at their desktop or mobile computing device.

Specifically, in one embodiment, a downloadable application is provided, which downloadable application provides a graphical user interface (GUI) through which interface the user may more intimately involve themselves in producing an online advertising or other communications campaign. More specifically, the GUI may be configured to present a dashboard to the display of the computing device, through which display the user may be enabled to interact in the event environment in a more meaningful way. For instance, in one instance, the dashboard may present a display of the communication elements that can be crafted, real-time, into a communication that can immediately be sent out to any number of target recipients.

The real-time generation and display of the communications contents may be for already crafted and approved communications, or may be generated on the fly using approved communication elements, which once generated can be distribute easily, such as by the touch of a button. Such media content may be collected and transmitted to a server of the system, from one or more of various sources, the content may be cleaned, edited, and inserted into a template from which an advertisement may be generated and broadcast, streamed, downloaded, or otherwise provided back to the various targeted consumers for substantially real-time for their viewing. In various instances, the user may select from which content source they wish to view acceptable content for a communication, such as by toggling back and forth between viewing options on a display, such as via the downloadable application or "app."

The dashboard may also provide a platform through which users may message other users of the system, such as through substantially instant messaging, SMS, text messaging, i-messaging, sending of sounds, photos, videos, and/or may allow for the user to instantly send messages, texts, sounds, videos, etc. to one or more, e.g., all of their social media platforms, such as review and approval of the generated communication and/or posting thereof. Such messaging may be sent system wide or to one or more subgroups of the system, such as where the user has selected and formed a sub-group of system users with whom to share messaging and/or media content back and forth with each other. Likewise, the dashboard may allow users to interact with or otherwise respond to the messaging of others using the system, such as through likes or dislikes, up or down voting, or otherwise replying to messages posted across the system.

For instance, as described above, the machine-learning module may be employed so as to generate a profile of a company and/or a follower or consumer or potential consumer of the company. The profile may be a list of properties, qualities, characteristics, and/or metrics that describe the company, their products or services, and/or their engagement with online media and/or the system. As such, the profile may be generated by a plurality of different methods, such as by providing an interview to the user and saving their responses, further characteristics may be determined based on their engagement with the system, specifically, or social media generally, such as by what they post, how and when they comment, the images they upload, and/or the activities surrounding the images they post, and the like.

Further characteristics may be determined based on how the user uses the system particularly, or the internet generally, such as by what searches they perform, who they follow, what pages they visit, the time spent on such pages, purchases they make and the like. Additional characteristics may be defined by where the user is located, the places they visit, such as on a routine basis, and/or the places they or their friends have visited. All of this data may then be collected for the consumers and potential consumers of a company and a knowledge graph may be generated with respect thereto so as to compare the company with its consumers and potential consumer. In various instances, once these characteristics have been determined, the AI module may determine various correlations between these characteristics, such as between the things or products the company and its consumers likes, the location where the company and the consumer is located, so as to generate a real-time advertisement that is generated in a manner to be specifically pertinent to the user, while at the same time generating interest in the event sponsors.

EXAMPLE

For example, a given company may be a nationwide company that has 17,000 advisors working under one brand, but each servicing different regional markets. As a nationwide company servicing a disparate 17,000 local markets, the company desires to run promotions that both apply generally to the national characteristics of the company, while also addressing the specific needs of each of the communities their advisors serve. Hence, the company seeks to build an advertisement includes a generic component, which maintains the nationwide vision of the brand, but also includes specific component that is unique to each local advisor and the community they serve.

Consequently, they want to generate and deploy an advertisement that maintains the company's national vision, but is specific to each advisor's local market concerns. They want a global reach with an individualized feel. Specifically, the advertisement should have a framework that maintains the nationwide image of the brand, but includes the advisor's name, contact information, address, links to pertinent personal information, and further content that is specific to the local environment in which services are provided including their community's name, imagery specific to the community, as well as one or more images of the local advisor, with a call out to come and meet their local advisor.

However, generating 17,000 advertisements that both maintain the brand identity, provide a nationwide promotional, but keep the look and feel of each local community their advisors serve is incredibly expensive. The cost would be too high to manually generate an advertisement for each advisor, and even if the advertisement were generated from a template, its design elements would be basic at best, wouldn't be able to include information relevant to each individual market place, and even then the advertisement would still have a relatively high cost.

For instance, even if the company wanted to keep their advertising spend to $300/mo for each of their unique 17,000 advisors, the advertisement would be very rudimentary, but would still cost the company $510,000/mo, which is over 6 million a year for the most generic of advertising. Particularly, to generate 17,000 advertisements manually, would require each unique element to be individually coded for each independent advertisement for all 17,000 local markets, and to do this 17,000 times a month for 12 months would be so labor intensive as to be practically impossible. What is needed, therefore, is a system whereby a company or individual can generate an advertisement template setting forth general information pertaining to the overall company as a whole, such as on a universal scale, but includes call outs by which the template can be auto-filled with information pertinent to each local company representative and the local market they serve.

Of particular use would be an intuitive computer generated graphical user interface (GUI) that would provide an advertising template that is configured to allow an advertisement designer to set up the various generalities of the advertisement having global appeal, while at the same time as setting out one or more containers that are adapted to be filled real-time with data pulled from a local resource upon distribution to each local environment. It would further be useful if the GUI were so intuitive and simple to use that by a single initiating event, e.g., the click of a button, the system can update the template, fill the containers with respect to all of the local environments, and deploy the advertisement to all locations, substantially simultaneously. In such an instance, upon deployment user entered data will fill the requisite fields of the template, and the system crawler will pull data from each local resource so as to auto-generate the containers with location specific data thereby generating a global advertisement that is unique to each particular locality. Accordingly, with respect to this example, it would be useful to have a system whereby once configured and initiated, e.g., by the click of a button advertisements are created, and when deployed each name, office location, local website, personal profile, including local images, will be pulled into the containers to create a unique geofence for each advertisement as the advertisement is transmitted to all 17,000 unique locations, substantially simultaneously. Particularly, a communication, such as a webpage or posting may be generated, where the posting includes 17,000 different images and details of 17,000 local environments with individual profiles from 17,000 individuals.

In this manner, 17,000 unique advertisements, postings, and/or webpages are created using a single template, and broadcast to 17,000 unique locations, where all advertisements retain a common look and feel. Hence, in essence, only one general advertisement need be generated, but because of the containerized call outs and the initialized data collector, upon deployment 17,000 unique advertisements will be broadcast, each having the look and feel of the global brand but catered to each individual market, including each unique city name, name and photo for each local adviser, as well as their office address, personalized message therefrom, and the like.

In particular instances, it would be useful to have a system where one or more of the steps of identifying, collecting, and scoring content, as well as the use of that content to generate and distribute a communication is intelligently automated. For instance, it would be useful for the system to include a suitably configured artificial intelligence (AI) module. For instance, the system may include a content collector, such as a web-crawler, which is configured for collecting data, such as data relevant to how particular content, for example, content that is part of an advertisement or other communication is performing. Such data may be directed to one or more customer reviews of a retailer, which reviews may be either good, bad, or indifferent, consequently, it would be useful to have a system that once such data is collected, it can be categorized as to being positive or negative, can be pooled with other such collected data, one or more negative trends may be identified, and where positive, those aspects of the data that are determined to contribute to the positive trends can be enhanced and amplified, whereas if the identified trend is negative one or more corrective procedures can be initiated. In various embodiments, the AI module of the system may form a platform that includes a machine learning unit, having one or more processing engines configured for generating one or more predictive models, and further includes a predictive inference unit, also having one or more processors configured for applying the generated predictive model to collected data so as to make one or more predictions with respect thereto.

Accordingly, in various instances, it would be useful to have a system that can pool data, evaluate the data for content, recognize trends with respect thereto, make one or more predictions based on those trends, and then in view of the same take one or more responsive actions. In this manner, when certain online content to be evaluated evokes a negative response with targeted consumers, this negative trend can be identified, the cause of the negative reaction can be inferred, a list of corrective measures can be generated, and one or more corrective measures from the generated list may be implemented until the negative trend has been corrected. If need be, the list of corrective measures to be enacted may be prioritized as to their predicted impact for correcting the trend, and the corrective measures may be implemented, e.g., system wide, such as sequentially starting with the corrective actions predicted as having the greatest impact in the shortest amount of time for correcting the negative trend.

In this manner, a number of corrective actions may be implemented until the downward trend is reversed and/or corrected. A similar implementation can be engaged with respect to enhancing an upwards trend until the progress has substantially slowed or stopped. Hence, provided herein is a workflow system that can scan, collect, and evaluate content for positive and negative trends, and one or more actions in response thereto can be suggested and/or implemented. For instance, where a positive trend is identified as being the result of a particular content factor, the system may make the suggestion that future communications contain more of that positively trending factor. Likewise, where a negative trend is identified as being the result of a particular content item, the system may make the suggestion that future communications do not contain more of that negatively trending factor.

For example, where a company is associated with one or more market influencers, who produce online content, the system may identify talking points to and to not be engaged with, such as by determining the percentage positive or negative reach various online content has, and can then make a recommendation to the market influencer to talk more or less about a given subject so as to enhance or correct for any given trend. More particularly, where a market influencer has thousands of conversations being engaged in at any given point in time, the system may indicate a small number of conversations and/or content items that are providing the greatest percentage of reach, and may, therefore, suggest to the market influencer which conversations and content to focus on to maximize their influence in a manner that has its predicted greatest value to the influencer and/or to the brand(s) they represent, e.g., these three conversation streams represent 60% of reach, therefore, the system may be configured to focus more time and content generation that is directed to these conversational topics.

In particular instances, to facilitate one or more of the implementations disclosed herein, a software and/or hardware application may be present and executed by one or more of the system controlling and/or analyses devices and may provide a user interface that can display information from or about a communication to generated and/or an audience to be targeted and/or an objective to be achieved. The interface may further provide input portions that permit the user to enter information and/or commands. For example, to provide for interaction with a user, the subject matter described herein can be implemented on a computer having a display device, such as for example a cathode ray tube (CRT), or a liquid crystal display (LCD), or light emitting diode (LED) or (OLED) monitor for displaying information to the user and a keyboard and a pointing device, such as for example a mouse or a trackball, by which the user may provide input to the computer. In various instances, the display screen may be a capacitive sensing interactive touch-screen display. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), WiFi, and the Internet.

The computing system may include clients and servers. A client and server are generally remote from each other and typically interact through a communication network. The relationship of client and server arises by virtue of computer programs running on the respective computers and having a client-server relationship to each other. In various instances, the methods herein disclosed may be preformed in software and/or hardware implementations. For instance, a software application may be provided in the form of a "mobile app" for use on or execution by a mobile smartphone or dedicated device or processor thereof, or may be in the form of a software application for execution in a conventional personal computer (e.g., desktop or laptop or tablet) or enterprise computer system.

An exemplary software application may present a user with a one or more menus or screens configured at least for permitting viewing and/or selection of user preferences or settings, for viewing data received from or related to one or more treatment modalities and/or system component configurations and for controlling said functions and/or determining the positioning of the various components of the system. In addition to such control and presentation of wireless (or wired) communications, communication features may include transmission of commands and settings, receipt of sensor data, feedback data, and/or historical use data, alarm/warning notifications (e.g., at loss or attainment of proximity), etc., all of which may be collected by the system, be stored within a database, and be retrieved and analyzed by the system to suggest future use protocols.

Hence, in various instances, implementations of various aspects of the disclosure may include, but are not limited to: apparatuses, systems, and methods including one or more features as described in detail herein, as well as articles that comprise a tangibly embodied machine-readable medium operable to cause one or more machines (e.g., computers, etc.) to result in operations described herein. Similarly, computer systems are also described that may include one or more processors and/or one or more memories coupled to the one or more processors. Accordingly, computer implemented methods consistent with one or more implementations of the current subject matter can be implemented by one or more data processors residing in a single computing system or multiple computing systems containing multiple computers, such as in a computing or supercomputing bank.

Such multiple computing systems can be connected and can exchange data and/or commands or other instructions or the like via one or more connections, including but not limited to a connection over a network (e.g. the Internet, a wireless wide area network, a local area network, a wide area network, a wired network, a physical electrical interconnect, or the like), via a direct connection between one or more of the multiple computing systems, etc. A memory, which can include a computer-readable storage medium, may include, encode, store, or the like one or more programs that cause one or more processors to perform one or more of the operations associated with one or more of the algorithms described herein.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

The methods illustratively described herein may suitably be practiced in the absence of any element or elements, limitation or limitations, not specifically disclosed herein. Thus, for example, the terms "comprising", "including," "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the invention claimed. Thus, it should be understood that although the present disclosed embodiments have been specifically disclosed by representative configurations and optional features, modification and variation of the embodiments herein disclosed may be resorted to by those skilled in the art, and that such modifications and variations are considered to be within the scope of this disclosure.

Any of the features or attributes of the above the above described embodiments and variations can be used in combination with any of the other features and attributes of the above described embodiments and variations as desired. From the foregoing disclosure and detailed description of certain disclosed embodiments, it is also apparent that various modifications, additions and other alternative embodiments are possible without departing from the true scope and spirit.

The embodiments discussed were chosen and described to provide the best illustration of the principles of the present invention and its practical application to thereby enable one of ordinary skill in the art to utilize the invention in various embodiments and with various modifications as are suited to the particular use contemplated.

All such modifications and variations are within the scope of the present invention as determined by the appended claims when interpreted in accordance with the benefit to which they are fairly, legally, and equitably entitled.

Specific embodiments have been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein.

Other embodiments are within the following claims. In addition, where features or aspects of the methods are described in terms of Markush groups, those skilled in the art will recognize that the invention is also thereby described in terms of any individual member or subgroup of members of the Markush group.

What is claimed is:

1. A system for executing a communication generation platform for generating a communication from one or more collected media elements, and for distributing the generated communication to a characterized target recipient, the system comprising:
   a database having a memory configured for storing a plurality of media assets and target recipient interests data characterizing the target recipient, the memory further storing instructions, which when executed by a processing unit result in an implementation of one or more operations, the database being configured to be queried in a manner to effectuate rapid access to the plurality of media elements;

a server having one or more processing units and a memory interface to access the instructions stored in the memory, at least one of the processing units including a set of processing engines, each processing engine configured for executing the stored instructions, the set of processing engines comprising:
  a data collection module configured for executing a set of instructions for collecting one or more media assets and target recipient interest data, so as to produce a set of collected media assets and target recipient interest data, the set of collected media assets each having one or more characteristics and the target recipient interest data characterizing one or more interests of the target recipient;
  a media asset evaluation module configured for executing a set of instructions for evaluating at least one of the set of collected media assets based on the target recipient interest data so as to produce one or more evaluated media assets, and for transmitting the one or more evaluated media assets to the memory for storage thereby, the evaluating being based on a correspondence between one or more of the target recipient interest data and one or more characteristics of the evaluated media assets so as to efficiently identify evaluated media assets of interest to reach the target recipient with more relevant communication;
  an advertisement generation module configured for executing a set of instructions for accessing the memory and selecting an evaluated media asset for the generation of the communication, the advertisement generation module comprising:
    a project builder for accessing the memory and for executing a set of instructions for selecting an evaluated media asset for building the advertisement, the selecting being based on the correspondence of the target recipient interest data and at least one of the characteristics of the evaluated media asset;
    a formatter for executing a set of instructions for formatting the advertisement for display at a graphical user interface of either or both of a stationary and a mobile computing device; and
    a distributor, for executing a set of instructions for distributing the formatted advertisement to one or more social media modalities in a format capable of being viewed by the target recipient.

2. The system according to claim 1, wherein the set of collected media assets include both a text element and an image element.

3. The system according to claim 2, wherein the target recipient interest data comprises data pertaining to online content engaged with by the target recipient.

4. The system according to claim 3, wherein the data collection module includes one or more collection processing engines configured for collecting parameter data from one or more web pages of a website, wherein one or both of the target recipient interest data and the parameter data correspond to the one or more text element and image element.

5. The system according to claim 4, wherein the media asset evaluation module is further configured for evaluating the at least one of the set of collected media assets further based on the collected parameter data, wherein the further evaluating is based on a correspondence between the target recipient interest data, the parameter data, and the one or more characteristics of the media asset.

6. The system according to claim 5, wherein the parameter data further includes data comprising one or more of: a character value, a numerical value, and a symbol value, the symbol value including one or more of a "like," "dislike," "tweet," "retweet," "favorite," "+1," "upvote," "downvote," "view," "unique view," "fan," "follow," "forward," "viral posting," "paid posting," "storyteller posting," "click," "hit," "hide," "comment," and "share".

7. The system according to claim 6, wherein the data collection module is further configured for collecting one or both of target recipient interest data or parameter data from one or more web pages of a website, wherein the one or both of target recipient interest data and parameter data correspond to the at least one text element and image element.

8. The system according to claim 6, wherein the set of collected media assets include both a text element and an image element.

9. The system according to claim 8, wherein the text element is collected from a corporate webpage and the image element is collected from a local webpage.

10. The system according to claim 6, wherein the media element evaluation module further includes one or more evaluation processing engines configured for determining an effectiveness of one or more of the evaluated media assets collected, and the evaluation is further based on the effectiveness determination.

11. The system according to claim 10, wherein the effectiveness is determined by evaluating one or more of a user engagement, a user review, a user commentary, results of a user questionnaire, an impression, a conversion, a user action, a user view, a user like or dislike, a user up vote or down vote that is associated with the media asset.

12. A system for executing a communication generation platform for generating a communication from one or more collected media assets, and for autonomously distributing the generated advertisement on behalf of an organization to a characterized target recipient, the system comprising:
  a database having a memory configured for storing a plurality of media assets, and further configured for storing target recipient interests data characterizing the target recipient, the memory further storing instructions and a plurality of models, which instructions and models when implemented by a processing unit results in an implementation of one or more operations;
  a server having one or more processing units and a memory interface to access the instructions and models stored in the memory, each processing unit including a set of processing engines, one or more of which processing engines may be configured for executing the stored instructions or implementing the stored models, the set of processing engines comprising:
  a data collection module configured for executing a set of instructions for collecting target recipient interest data, the target recipient interest data characterizing one or more interests of the target recipient, and one or more media assets, the one or more media assets being selected for collection based on its correlation to at least one interest of the target recipient;
  a media asset prediction module configured for accessing and implementing at least a first model, the first model for making a prediction of an ability of each of the one or more media assets to effectuate engagement of the target recipient with respective collected media assets, the prediction being based on a correspondence between one or more of the target recipient interest data, one or more characteristics of each respective media asset, and one or more objectives of the business organization, as determined by the first model;

a media asset evaluation module configured for accessing and implementing at least a second model for evaluating at least one of the one or more media assets based on the target recipient interest data so as to produce one or more evaluated media assets, and for transmitting the evaluated media assets to the memory for storage thereby, the evaluating being based on a correspondence between one or more of the predictions, the target recipient interest data, and one or more objectives of the organization on whose behalf the communication is to be distributed, as determined by the second model, so as to efficiently identify evaluated media assets that are predicted to be relevant to that target recipient as well as effective for accomplishing an objective of the business organization;

an advertisement generation module configured for executing a set of instructions for accessing the memory and selecting a evaluated media asset for generation of the communication, the advertisement generation module comprising:

an advertisement builder for accessing the memory and for executing a set of instructions for selecting a media template and the evaluated media asset for building the advertisement;

a formatter for executing a set of instructions for formatting the advertisement for display at a graphical user interface of either or both of a stationary and a mobile computing device; and a distributor, for executing a set of instructions for distributing the formatted advertisement to one or more social media modalities in a format capable of being viewed by the target recipient.

13. The system according to claim 12, wherein the target recipient interest data comprises data pertaining to online content engaged with by the target recipient.

14. The system according to claim 13, wherein the data collection module includes one or more collection processing engines configured for collecting parameter data from one or more web pages of a website, wherein one or both of the target recipient interest data and the parameter data correspond to the one or more text element and image element.

15. The system according to claim 14, wherein the evaluating is further based on the collected parameter data, additionally wherein the evaluating is further based on a correspondence between the target recipient interest data, the parameter data, the one or more characteristics of the media asset, and prediction data.

16. A system for generating a communication from a plurality of collected media assets, the system comprising:

a database having a memory configured for storing a set of media assets and target recipient interest data, the memory further storing instructions and at least one model, which instructions and at least one model when implemented by a processing unit results in an implementation of one or more operations, the database being configured to be queried in a manner to effectuate rapid access to one or more media assets having one or more characteristics that are evaluated and determined to correspond with the target recipient interest data;

a server having a processing unit and a memory interface to access the instructions and at least one model stored in the memory, the processing unit including a set of processing engines, one or more of which processing engines may be configured for executing the stored instructions or implementing the stored at least one model, the set of processing engines comprising:

a media asset evaluation module configured for accessing and implementing at least a first model for evaluating at least one of the set of media assets based on the target recipient interest data so as to produce one or more evaluated media assets, and for transmitting the one or more evaluated media assets to the memory for storage thereby, the evaluating being based on a correspondence between one or more of the target recipient interest data and one or more of the characteristics of the media asset, as determined by the first model, so as to efficiently identify evaluated media assets of interest to reach the target recipient with a more relevant communication;

an advertisement generation module configured for accessing and implementing a second model, the implementing of the second model for accessing the memory and for:

making a prediction of effectiveness with regard to a selectable evaluated media asset effecting one or more actions of the target recipient upon receipt of a generated advertisement including an evaluated media asset, and for:

selecting an evaluated media asset for generation of the advertisement, the selecting of the evaluated media asset being based on a relationship between the score evaluation of the evaluated media asset and the prediction of effectiveness for that evaluated media asset based on the second model;

a formatter for formatting the selected evaluated media asset into a form suitable for display at a display of a mobile computing device; and a distribution engine for distributing the advertisement to a plurality of social media modalities in a format capable of being viewed by the target recipient.

17. The system according to claim 16, further including a data collection module configured for executing a set of instructions for collecting the target recipient interest data characterizing one or more interests of the target recipient, and for collecting one or more media assets, the one or more media assets being selected based on a correlation between one or more characteristics of the media asset and at least one interest of the target recipient.

18. The system according to claim 17, wherein the prediction of effectiveness comprises a probability that the advertisement will be effective in provoking an impression, an engagement, or a conversion of the target recipient, and the one or more media assets is further selected based on the probability.

19. The system according to claim 13, wherein one or more of the first model and the second model is initiated by a prompt.

20. The system according to claim 18, wherein one or more of the first model and the second model is initiated by a prompt.

* * * * *